(12) United States Patent
Kobayashi

(10) Patent No.: US 9,494,288 B2
(45) Date of Patent: Nov. 15, 2016

(54) AUTOMOTIVE HEADLAMP APPARATUS

(71) Applicant: KOITO MANUFACTURING CO., LTD., Minato-ku (JP)

(72) Inventor: Shoji Kobayashi, Shizuoka (JP)

(73) Assignee: KOITO MANUFACTURING CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 14/193,572

(22) Filed: Feb. 28, 2014

(65) Prior Publication Data

US 2014/0175978 A1    Jun. 26, 2014

Related U.S. Application Data

(63) Continuation of application No. PCT/JP2012/005439, filed on Aug. 29, 2012.

(30) Foreign Application Priority Data

| Sep. 1, 2011 | (JP) | 2011-190677 |
| Sep. 5, 2011 | (JP) | 2011-193014 |
| Sep. 5, 2011 | (JP) | 2011-193226 |

(51) Int. Cl.
*F21S 8/10* (2006.01)
*B60Q 1/14* (2006.01)
*B60Q 1/04* (2006.01)

(52) U.S. Cl.
CPC ............... *F21S 48/115* (2013.01); *B60Q 1/04* (2013.01); *B60Q 1/1423* (2013.01);
(Continued)

(58) Field of Classification Search
CPC ..................................................... B60Q 1/143

USPC ....... 315/76–80, 82; 362/475, 476, 464, 465
See application file for complete search history.

(56) References Cited

U.S. PATENT DOCUMENTS 6,459,919 B1 * 10/2002 Lys et al. ...................... 600/407
7,128,453 B2 * 10/2006 Tatsukawa ............... B60Q 1/04
257/E25.02
(Continued)

FOREIGN PATENT DOCUMENTS

| CN | 1573206 A | 2/2005 |
| DE | 10005795 A1 | 8/2001 |

(Continued)

OTHER PUBLICATIONS

International Search Report (Form PCT/ISA/210) issued on Dec. 4, 2012, by Japanese Patent Office in corresponding international Application No. PCT/JP2012/005439. (9 pages).
(Continued)

*Primary Examiner* — Minh D A
(74) *Attorney, Agent, or Firm* — Buchanan Ingersoll & Rooney PC

(57) ABSTRACT

An automotive headlamp apparatus includes a light source, in which a plurality of LED chips are arranged at intervals from each other, and a projection lens for projecting the light, emitted from the light source, toward a front area of a vehicle as a light source image. The semiconductor light-emitting elements may be located within than a focal point of the projection lens. The LED chip is arranged such that the light emitting surface of the LED chip faces the front area of the vehicle. The light emitting surface of the LED chip may be of a rectangular shape and the LED chip may be arranged such that a side of the light emitting surface is at a slant with respect to the vehicle width direction.

18 Claims, 41 Drawing Sheets

(52) U.S. Cl.
CPC ....... *F21S 48/1154* (2013.01); *F21S 48/1721* (2013.01); *F21S 48/1742* (2013.01); *F21S 48/1747* (2013.01); *B60Q 2300/056* (2013.01); *B60Q 2300/112* (2013.01); *B60Q 2300/122* (2013.01); *B60Q 2300/32* (2013.01); *B60Q 2300/41* (2013.01); *B60Q 2300/42* (2013.01)

(56) References Cited

U.S. PATENT DOCUMENTS

| | | | |
|---|---|---|---|
| 2001/0019486 | A1 | 9/2001 | Thominet |
| 2002/0080618 | A1* | 6/2002 | Kobayashi et al. ........... 362/466 |
| 2004/0027834 | A1 | 2/2004 | Chigusa et al. |
| 2004/0085779 | A1* | 5/2004 | Pond et al. ................... 362/516 |
| 2004/0196663 | A1 | 10/2004 | Ishida et al. |
| 2005/0018443 | A1* | 1/2005 | Tsukamoto .......... F21S 48/1154 362/539 |
| 2008/0285297 | A1* | 11/2008 | Ishida .................. F21S 48/1154 362/539 |
| 2009/0073706 | A1* | 3/2009 | Tatara et al. ................... 362/487 |
| 2009/0190323 | A1* | 7/2009 | Watanabe et al. .............. 362/37 |
| 2010/0172542 | A1* | 7/2010 | Stein et al. .................... 382/103 |
| 2010/0315012 | A1* | 12/2010 | Kim et al. ................. 315/185 R |
| 2011/0012510 | A1* | 1/2011 | Tani et al. ........................ 315/82 |

FOREIGN PATENT DOCUMENTS

| | | |
|---|---|---|
| DE | 102005032128 A1 | 1/2007 |
| DE | 102008044967 A1 | 7/2009 |
| DE | 102008044968 A1 | 7/2009 |
| EP | 1403135 A2 | 3/2004 |
| EP | 1 515 368 A2 | 3/2005 |
| EP | 1686308 A1 | 8/2006 |
| EP | 2187114 A1 | 5/2010 |
| EP | 2 357 398 A2 | 2/2011 |
| EP | 2 357 676 A1 | 8/2011 |
| EP | 2 559 936 A1 | 2/2013 |
| EP | 2677232 A1 | 12/2013 |
| JP | 2001-266620 A | 9/2001 |
| JP | 2004-71409 A | 3/2004 |
| JP | 2004-311101 A | 11/2004 |
| JP | 2005-294166 A | 10/2005 |
| JP | 2006-509263 A | 3/2006 |
| JP | 2006-164743 A | 6/2006 |
| JP | 2007-234562 A | 9/2007 |
| JP | 2010-40528 A | 2/2010 |
| JP | 2011-90903 A | 5/2011 |
| JP | 2011-91056 A | 5/2011 |
| WO | 2004/051323 A1 | 6/2004 |
| WO | 2009/144024 A1 | 12/2009 |
| WO | 2010/006614 A1 | 1/2010 |
| WO | 2012/156121 A1 | 11/2012 |

OTHER PUBLICATIONS

International Preliminary Report on Patentability (Form PCT/IB/373) and the Written Opinion of International Searching Authority (Form PCT/ISA/237) issued on Mar. 4, 2014, by the International Bureau of WIPO in corresponding International Application No. PCT/JP2012/005439. (17 pages).

European Communication Pursuant to Rule 114(2) EPC dated Mar. 4, 2015 issued in corresponding European Patent Appln. No. 12828970.9-1756 (3 pages).

Office Action issued by the Japanese Patent Office in corresponding Japanese Patent Application No. 2011-190677 on May 26, 2015 (5 pages).

Office Action issued by the Japanese Patent Office in corresponding Japanese Patent Application No. 2011-193014 on May 26, 2015 (9 pages).

Office Action issued by the Japanese Patent Office in corresponding Japanese Patent Application No. 2011-193226 on May 26, 2015 (4 pages).

Extended Search Report issued by the European Patent Office in corresponding European Patent Application No. 12828970.9 on Jun. 9, 2015 (7 pages).

Second Office Action issued by the Chinese Patent Office in corresponding Chinese Patent Application No. 201280042836.7 on Dec. 18, 2015 and English translation (12 pages).

Communication dated Jul. 19, 2016 and European Search Report dated Jul. 7, 2016 issued by the European Patent Office in corresponding European Patent Application No. 16160946.6-1756 (8 pages).

Communication dated Jul. 19, 2016 arid European Search Report dated Nov. 7, 2016 issued by the European Patent Office in corresponding European Patent Application No. 16160950.8-1756 (9 pages).

* cited by examiner

1012    R2

AUTOMOTIVE HEADLAMP APPARATUS

CROSS-REFERENCE TO RELATED APPLICATIONS

This application is based upon and claims the benefit of priority from the prior Japanese Patent Application No. 2011-190677, filed on Sep. 1, 2011, Japanese Patent Application No. 2011-193014, filed on Sep. 5, 2011, Japanese Patent Application No. 2011-193226, filed on Sep. 5, 2011, and International Patent Application No. PCT/JP 2012/005439, filed on Aug. 29, 2012, the entire content of each of which is incorporated herein by reference.

BACKGROUND OF THE INVENTION

1. Field of the Invention

The present invention relates to an automotive headlamp apparatus.

2. Description of the Related Art

An illumination device for a vehicle comprised of a light source, where a plurality of semiconductor light-emitting elements are arranged in a matrix, and a condensing lens is proposed in the conventional practice (see Patent Document 1, for instance). Such an illumination device is configured in such a manner as to irradiate an area in front of the vehicle using predetermined light distribution patterns.

Also, an illumination device capable of generating different illuminance distributions using a light source equipped with a plurality of light-emitting diodes arranged, in matrix, adjacently in the vertical and horizontal directions is disclosed in the conventional practice (see Patent Document 1, for instance).

Also, such illumination devices as described above achieve a various types of light distribution patterns by selectively lighting up a part of the plurality of semiconductor light-emitting elements and controlling the electric conduction amount of them during the lighting.

RELATED ART DOCUMENT

[Patent Document 1] Japanese Unexamined Patent Application Publication (Kokai) No. 2001-266620.

However, suppose that there are gaps between adjacent semiconductor light-emitting elements. Then an unwanted figure or pattern may appear on the light distribution pattern when a dark region between the semiconductor light-emitting elements is projected thereonto. This causes an uncomfortable feeling in a driver of the vehicle.

If the current to be supplied is monitored for each light-emitting diode so that each one of the light-emitting diodes disposed in a matrix can have a predetermined luminance and if a control is performed so that a predetermined current can flow therethrough, a drive circuit will be required for each light-emitting diode. Thus, the cost of the apparatus as a whole increases.

Also, it is desired that the automotive headlamp apparatus forms a light distribution pattern, either condensed or diffused, depending on the situation.

SUMMARY OF THE INVENTION

The present invention has been made in view of the foregoing circumstances, and one purpose thereof is to provide a technology for suppressing the uncomfortable feeling toward a light source image.

Another purpose of the present invention is to provide an automotive headlamp apparatus that is simple in structure and reduced in cost.

Still another purpose of the present invention is to provide an automotive headlamp apparatus capable of forming condensed and diffused light distribution patterns.

In order to resolve the above-described problems, an automotive headlamp apparatus according to one embodiment of the present invention includes: a light source in which a plurality of semiconductor light-emitting elements are arranged at intervals from each other; and a projection lens configured to project light, emitted from the light source, toward a front area of a vehicle as a light source image. The semiconductor light-emitting elements are located within a focal point of the projection lens, namely located between the projection lens and the focal point thereof.

Optional combinations of the aforementioned constituting elements, and implementations of the invention in the form of methods, apparatuses, systems, and so forth may also be effective as additional modes of the present invention.

DETAILED DESCRIPTION OF THE INVENTION

Figure 1:
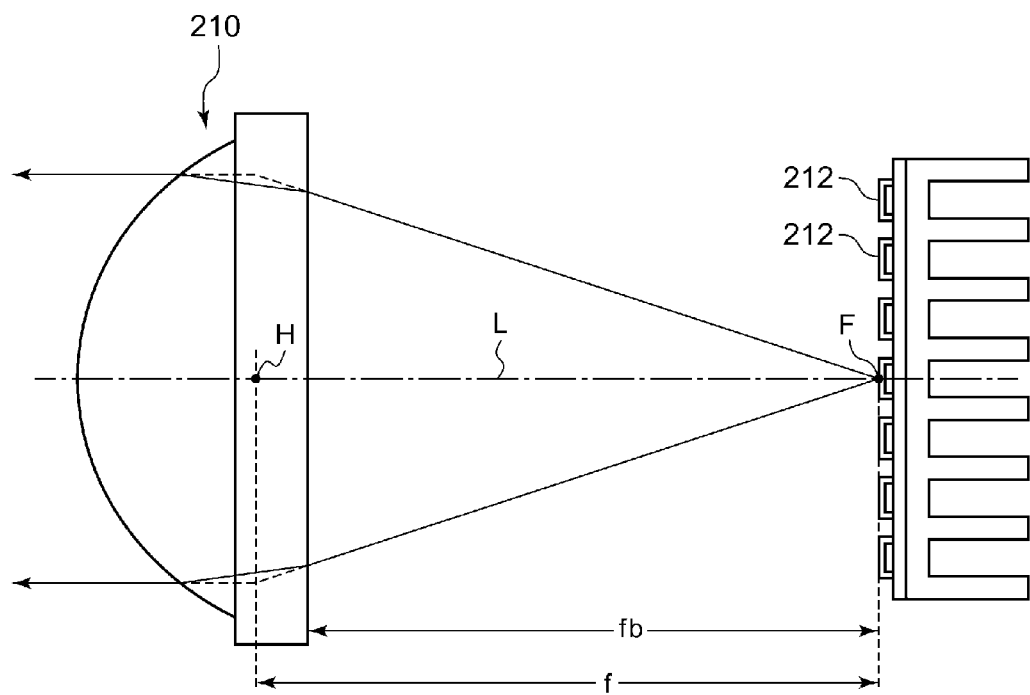
FIG. 1 is a side view showing essential parts of a headlamp where a plurality of semiconductor light-emitting elements are arranged in a matrix.

The preferred embodiments for carrying out the present invention will now be hereinbelow described in detail with reference to the accompanying drawing. Note that the identical components are given the identical reference numerals in all accompanying figures and that the repeated description thereof will be omitted as appropriate.

An automotive headlamp apparatus according to one embodiment of the present invention includes: a light source in which a plurality of semiconductor light-emitting elements are arranged at intervals from each other; and a projection lens configured to project light, emitted from the light source, toward a front area of a vehicle as a light source image. The semiconductor light-emitting elements are located within a focal point of the projection lens, namely located between the projection lens and the focal point thereof.

By employing this embodiment, the dark region between adjacent semiconductor light-emitting elements is visually inconspicuous in a projected light source image.

The semiconductor light-emitting elements may be arranged such that a light emitting surface of the semiconductor light-emitting element faces the front area of the vehicle. This eliminates provision of a reflective member such as a reflector.

The light emitting surface of the semiconductor light-emitting element may be of a rectangular shape, and the semiconductor light-emitting element may be arranged such that a side thereof is tilted with respect to a vehicle width direction. This facilitates the formation of an oblique cutoff line. Also, this can shade off the cutoff line in the horizontal direction.

The semiconductor light-emitting element and the projection lens may be positioned such that a distance between the semiconductor light-emitting element and the projection lens is less than or equal to 0.98f, where f [mm] denotes a focal length of the projection lens.

The semiconductor light-emitting element and the projection lens may be positioned such that a distance between the semiconductor light-emitting element and the projection lens is greater than or equal to $((P-W)/P) \times f$, where f [mm] denotes a focal length of the projection lens, W [mm] denotes a side length of a light emitting surface of the semiconductor light-emitting element, and P [mm] denotes a pitch between the adjacent semiconductor light-emitting elements.

Another embodiment of the present invention relates also to an automotive headlamp apparatus. The automotive headlamp apparatus includes: a light source in which a plurality of semiconductor light-emitting elements are arranged in a matrix, the light source being configured to irradiate light toward a front area of a vehicle; and a control unit configured to control the turning on and off of the plurality of semiconductor light-emitting elements included in the light source. The plurality of semiconductor light-emitting elements includes: a plurality of first semiconductor light-emitting elements for emitting light to a first section contained in an illumination region in the front area of the vehicle; and a plurality of second semiconductor light-emitting elements for emitting light to a second section, which is different from the first section, contained in the illumination region, wherein the second semiconductor light-emitting element has a characteristic different from that of the first semiconductor light-emitting element. The control unit includes: a first drive unit for driving, per group, the plurality of first semiconductor light-emitting elements, which are divided into groups, wherein the number of groups is smaller than the number of first semiconductor light-emitting elements; and a second drive unit for driving, per group, the plurality of second semiconductor light-emitting elements, which are divided into groups, wherein the number of groups is smaller than the number of second semiconductor light-emitting elements.

By employing this embodiment, the number of groups to be driven is smaller than the number of semiconductor light-emitting elements. Thus, the structure of the drive units can be simplified. Also, the semiconductor light-emitting elements, having a suitable characteristic, corresponding to each section contained in the illumination region are selected. Thus, the cost of the light source can be reduced.

The first semiconductor light-emitting element may be constituted by an element whose luminance differs from that of the second semiconductor light-emitting element when the same current is supplied thereto. As a result, the brightness can be easily varied by each section contained in the illumination region.

The first semiconductor light-emitting element may be constituted by an element whose maximum forward current rating differs from that of the second semiconductor light-emitting element. Thereby, the brightness can be easily varied by each section contained in the illumination region.

The first semiconductor light-emitting elements may be arranged such that the first section contains a central portion of the illumination region, and a control unit may control the turning on and off of the first semiconductor light-emitting elements and the second semiconductor light-emitting elements such that the luminance of the first semiconductor light-emitting elements is higher than that of the second semiconductor light-emitting elements. Thereby, the central portion of the illumination region can be made much brighter.

The plurality of semiconductor light-emitting elements may be arranged such that light emitting surfaces of the semiconductor light-emitting elements face the front area of the vehicle. This eliminates provision of the reflective member such as a reflector.

A light emitting surface of each of the plurality of semiconductor light-emitting elements may be of a rectangular shape, and each of the plurality of semiconductor light-emitting elements may be arranged such that a side thereof is tilted with respect to a vehicle width direction. Thereby, the formation of an oblique cutoff line is facilitated. Also, the cutoff line in the horizontal direction can be shaded off.

Still another embodiment of the present invention relates also to an automotive headlamp apparatus. The automotive headlamp apparatus includes: a light source in which a plurality of semiconductor light-emitting elements are arranged in a matrix, the light source being configured to irradiate light toward a front area of a vehicle; and a control unit configured to control the turning on and off of the plurality of semiconductor light-emitting elements included in the light source. The plurality of semiconductor light-emitting elements includes: a plurality of first semiconductor light-emitting elements arranged in a first block of a region where the semiconductor light-emitting elements are arranged in a matrix; and a plurality of second semiconductor light-emitting elements arranged in a second block of the region where the semiconductor light-emitting elements are arranged in a matrix, the second block being different from the first block, wherein the second semiconductor light-emitting element has a characteristic different from that of the first semiconductor light-emitting element. The control unit includes: a first drive unit for driving, per group, the plurality of first semiconductor light-emitting elements, which are divided into groups, wherein the number of groups is smaller than the number of first semiconductor light-emitting elements; and a second drive unit for driving, per group, the plurality of second semiconductor light-emitting elements, which are divided into groups, wherein the number of groups is smaller than the number of second semiconductor light-emitting elements.

By employing this embodiment, the number of groups to be driven is smaller than the number of semiconductor light-emitting elements. Thus, the structure of the drive units can be simplified. Also, the semiconductor light-emitting elements, having a suitable characteristic, corresponding to each block contained in a region where the semiconductor light-emitting elements are arranged in a matrix are selected. Thus, the cost of the light source can be reduced.

Still another embodiment of the present invention relates also to an automotive headlamp apparatus. The automotive headlamp apparatus includes: a light source in which a plurality of semiconductor light-emitting elements are arranged at intervals from each other; a projection lens configured to project light, emitted from the light source, toward a front area of a vehicle as a light source image; and a magnification varying mechanism configured to vary a magnifying power of the light source image, the magnification varying mechanism being provided on the projection lens at a front side of the vehicle.

By employing this embodiment, the magnifying power of the light source image can be varied without having to changing the positions of the projection lens and the light source.

The plurality of semiconductor light-emitting elements may be located within a focal point of the projection lens. Thereby, the dark region between adjacent semiconductor light-emitting elements is visually inconspicuous in the projected light source image.

The semiconductor light-emitting elements may be arranged such that a light emitting surface of the semiconductor light-emitting element faces the front area of the vehicle. As a result, the reflective member such as a reflector is no longer necessary.

The light emitting surface of the semiconductor light-emitting element may be of a rectangular shape, and the semiconductor light-emitting element may be arranged such that a side thereof is tilted with respect to a vehicle width direction. Thereby, the formation of an oblique cutoff line is facilitated. Also, the cutoff line in the horizontal direction can be shaded off.

The magnification varying mechanism may be an optical system configured such that a magnifying power change in the vehicle width direction of the light source image is larger than a magnifying power change in a vertical direction thereof. This allows the formation of condensing/diffusion light distribution patterns used to cover a wide range along the width direction.

The optical system may be an anamorphic lens system. This allows the formation of light distribution patterns condensed and diffused by use of the optical system having a simple structure.

[First Embodiment]

Recent years have seen continuing development of apparatuses using a plurality of semiconductor light-emitting elements, such as LEDs, as a light source for a headlamp unit (headlight or headlamp) of a vehicle and the like. FIG. 1 shows essential parts of a headlamp, where a plurality of semiconductor light-emitting elements are arranged in a matrix, viewed laterally. In FIG. 1, a plurality of LED chips 212 are arranged on a plane perpendicular to a light axis L, and one of the LED chips 212 contains a focal point F of a projection lens 210. In FIG. 1, "H" denotes a principal point of the projection lens, "f" a focal length, and "fb" a back focal length.

Figure 2:
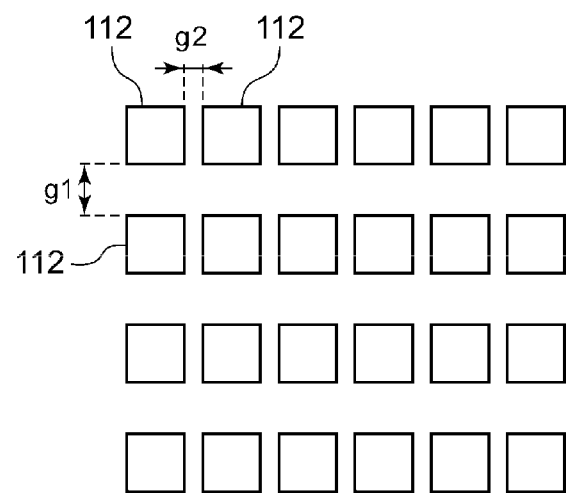
FIG. 2 is a front view of a plurality of LED chips arranged in a matrix.

FIG. 2 is a front view of a plurality of LED chips arranged in a matrix. The light source comprised of a plurality of LED chips (hereinafter referred to as "matrix LEDs" or "matrix LED"), which are arranged in a matrix as illustrated in FIG. 2, faces a front area of the vehicle. An optical system, having the aforementioned light source, in which the projection lens is provided in front of this light source, is configured such that the luminance of the LED chips on the plane containing the focal point F is distributed and projected in a frontward direction. Thus, the luminance distribution of a group of LED chips is projected onto a screen if the LED chips are provided in plurality. However, the headlamp using such matrix LEDs still has room for improvement in the following respects (1) and (2).

(1) Dark regions between the LED chips, which correspond to gaps g1 and g2 shown in FIG. 2, are visually conspicuous on the screen. These dark regions partially deteriorate a driver's visibility. If, for example, there is a panel or screen in a road ahead, a rectangular pattern may appear on the panel or screen. Also, there may be cases where a striped pattern appears on the road surface.

(2) It is difficult to form a Z-shape light distribution of a sloping (45 degrees) cutoff line required for a low beam distribution pattern. Also, a region near the cutoff line cannot be shaded off or made obscure.

Figure 3A:
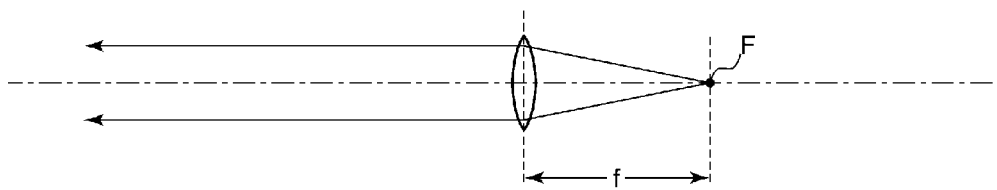
FIG. 3A shows light paths in a case where rays emanating from a focal point enters a projection lens.
Figure 3B:
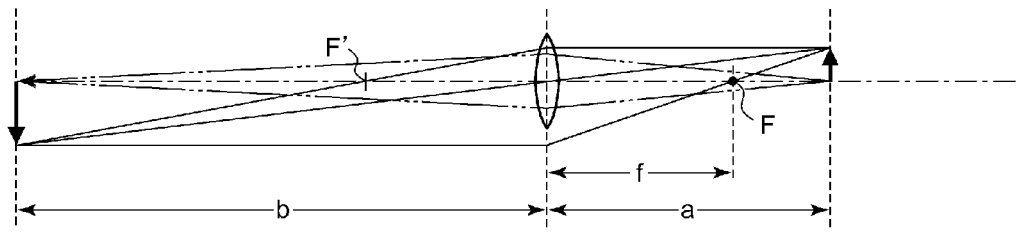
FIG. 3B shows light paths in a case where rays emanating from behind a focal point enters a projection lens.
Figure 3C:
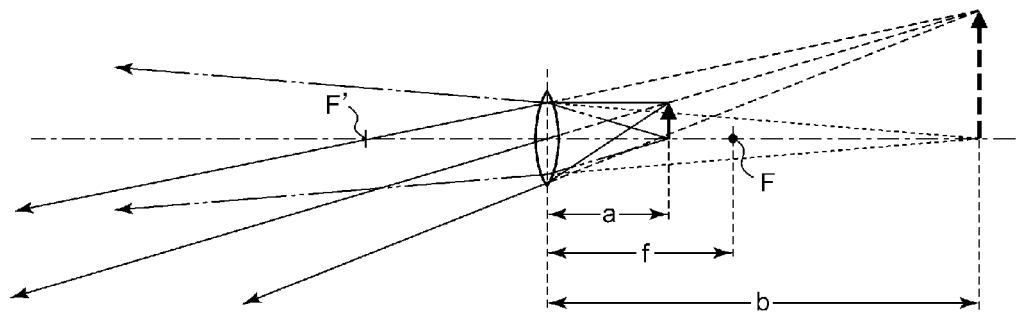
FIG. 3C shows light paths in a case where rays emanating from within a focal point enters a projection lens.

A description is now given of an image formation by the projection lens. FIG. 3A shows light paths in a case where rays emanating from a focal point enters the projection lens. FIG. 3B shows light paths in a case where rays emanating from behind the focal point enters the projection lens. FIG. 3C shows light paths in a case where rays emanating from within the focal point enters the projection lens.

As illustrated in FIG. 3A, when a light source (object) is placed at a focal point F, the image of the light source or the object is formed at infinity. The focal length of the actual projection lens is in a range of about 30 mm to about 50 mm. As compared to such a focal length, the distance to an image forming screen, namely 10 m or 25 m, is said to be infinity. Accordingly, the luminance distribution of the light source is almost directly projected onto the screen and therefore the dark regions between the LED chips are visually conspicuous on the screen.

As illustrated in FIG. 3B, when the light source is placed behind the focal point F, the image of the light source is a real image whose magnification is b/a and therefore the dark regions between the LED chips are still visually conspicuous on the screen.

As illustrated in FIG. 3C, when, on the other hand, the light source is placed within the focal point F (namely, placed between the projection lens 210 and its focal point F), the image of the light source is a virtual image and therefore the image thereof is not formed on the screen. If the light source is placed too close to the projection lens, the projection lens will not function as such, thereby making it difficult to form a desired light distribution.

Through his diligent investigations, the inventor of the present invention had come to recognize the following points, based on the above knowledge. That is, it is preferable that, for the purposes of preventing the luminance nonuniformity from becoming visually conspicuous, the LED chips be positioned within the focal point and as close to the focal point as possible so that the image of the light source can be a virtual image. The inventor had also come to recognize that the magnification of the virtual image be preferably as large as possible.

As shown in FIG. 3C, if the distance between an object (light source) and the projection lens is denoted by "a" and if the focal length is denoted by "f", an image location (image distance "b") will be expressed by the following Equation (1) that is an image formation equation for paraxial optical system.

$$1/f = 1/a - 1/b \qquad \text{Equation (1)}$$

Table 1 shows the image distances "b" of a virtual image and the magnifications b/a, when the distances "a" are f/2, 2f/3, 3f/4, 4f/5, 9f/10, and 19f/20, respectively.

TABLE 1

| OBJECT DISTANCE a | IMAGING DISTANCE b | MAGNIFICATION RATIO b/a |
|---|---|---|
| f/2 | f | 2 |
| 2f/3 | 2f | 3 |
| 3f/4 | 3f | 4 |
| 4f/5 | 4f | 5 |
| 9f/10 | 9f | 10 |
| 19f/20 | 19f | 20 |

As illustrated in FIG. 3C, rays emitting from the light source advance and travel in such a manner that as if the rays were emitted from a virtual image position. Thus, the luminance distribution on the screen is such that a plurality of semiconductor light-emitting elements (LED chips) are overlapped with each other as the magnification gets larger. As a result, the luminance nonuniformity or luminance unevenness on the screen will be visually inconspicuous.

Figure 4:
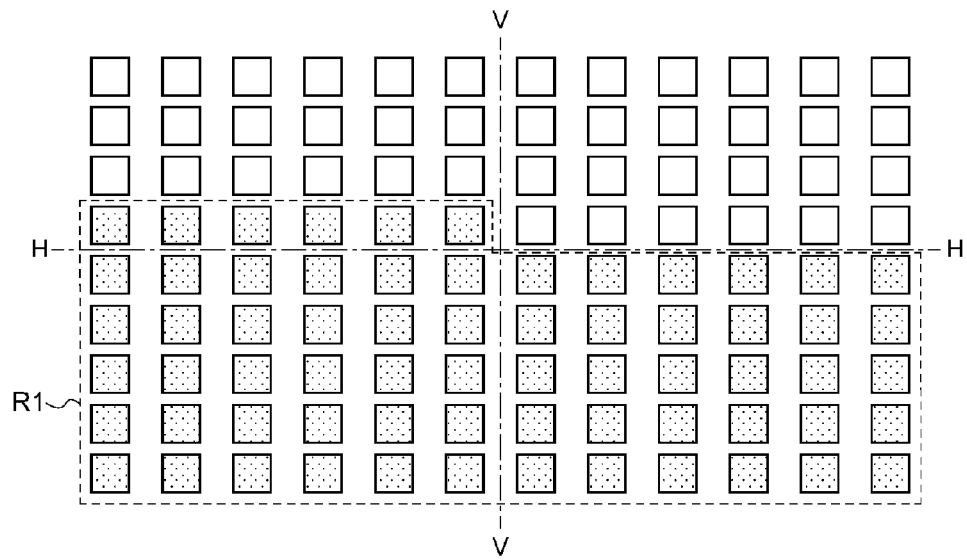
FIG. 4 is a schematic diagram showing an arrangement of matrix LEDs where each side of rectangular LED chips is placed parallel to a horizontal direction.

A description is next given why it is difficult to form the light distribution of a sloping cutoff line required for a low beam distribution pattern and why a region near the cutoff line cannot be shaded off. FIG. 4 is a schematic diagram showing an arrangement of matrix LEDs where each side of rectangular LED chips is placed parallel to the horizontal direction.

In the case of the matrix LEDs as shown in FIG. 4, the Z-shape light distribution having the 45-degree sloping cutoff line cannot be formed even if LED chips in a region R1 enclosed by dotted lines are turned on and LED chips in the region other than the region R1 are turned off. In order to achieve the Z-shape light distribution in the arrangement of LED chips as shown in FIG. 4, the sloping cutoff line needs to be artificially achieved by further increasing the number of LED chips. In this case, however, the size of the matrix LEDs increases and therefore the focal length of the projection lens must be made longer with the result that the lamp size is enlarged. In the light of this, the inventor of the present invention had come to recognize, through his diligent investigations into these problems, that matrix LEDs described later be used.

Figure 5:
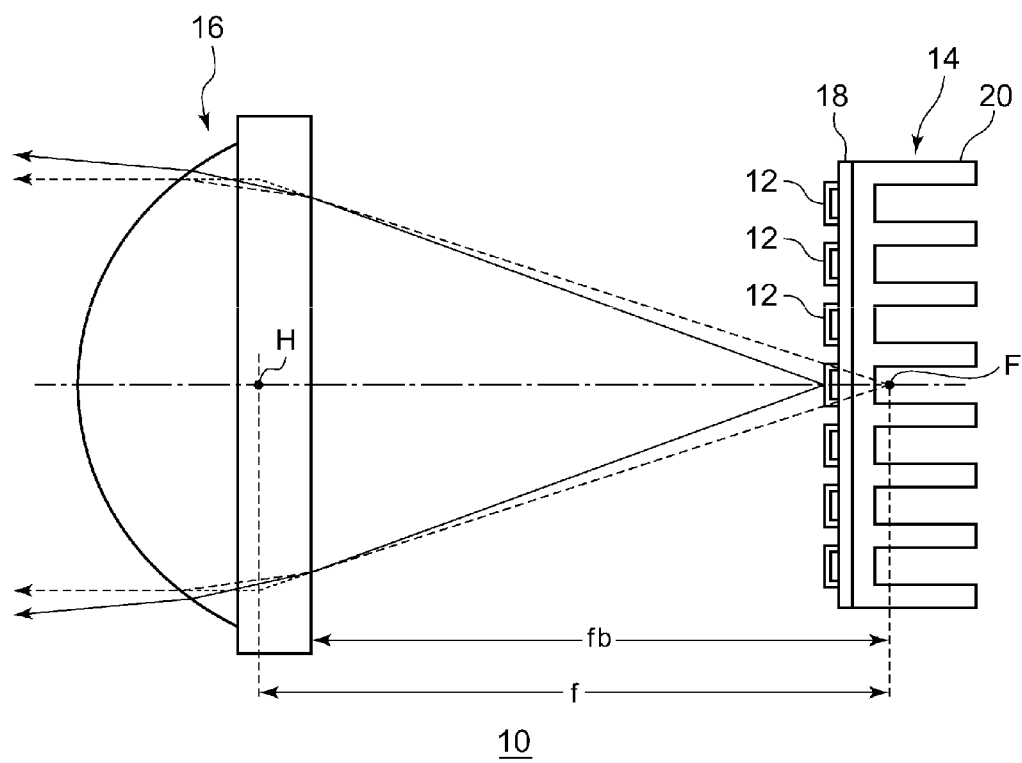
FIG. 5 schematically shows a structure of an automotive headlamp apparatus, according to a first embodiment, viewed laterally.

FIG. 5 schematically shows a structure of an automotive headlamp apparatus, according to a first embodiment, viewed laterally. An automotive headlamp apparatus 10 is comprised of a light source 14 in which the LED chips 12, which are a plurality of semiconductor light-emitting elements, are arranged at intervals from each other, and a projection lens 16 that projects light, emitted from the light source 14, toward a front area of the vehicle as a light source image. The light source 14 has an LED circuit board 18 and a heatsink 20. The plurality of LED chips 12 are located within the focal point F of the projection lens 16.

Thus, as described earlier, in the automotive headlamp apparatus 10 according to the present embodiment, the light source image is projected as a virtual image in a front area of the automotive headlamp apparatus 10. As a result, the dark region between adjacent LED chips 12 is visually inconspicuous in the projected light source image. Note that the plurality of LED chips 12 are arranged such that a light emitting surface of each of the LED chips 12 faces the front area of the vehicle. This eliminates provision of a reflective member such as a reflector.

Figure 6:
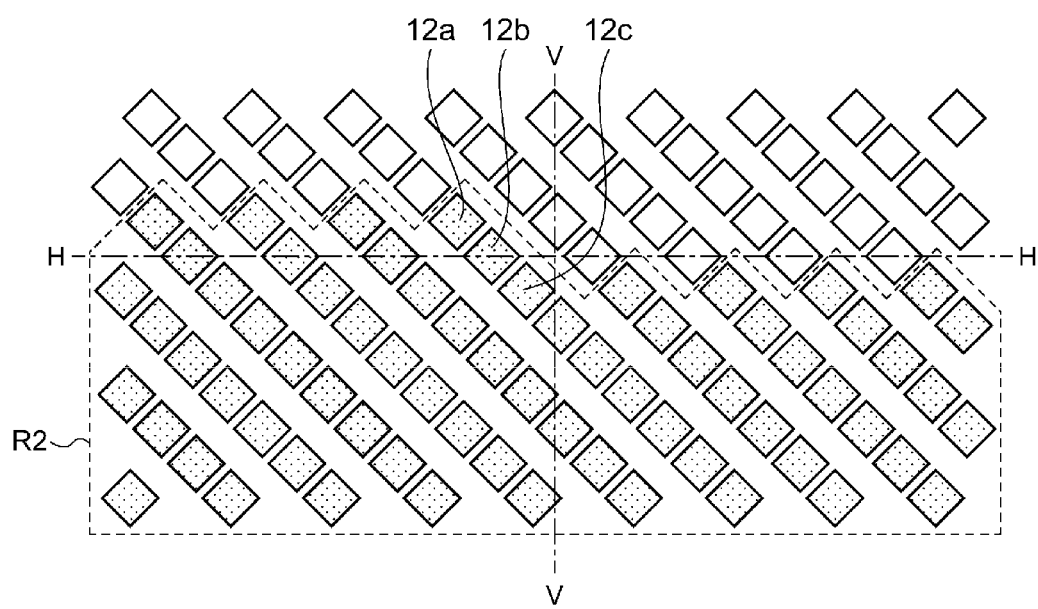
FIG. 6 is a schematic diagram showing an arrangement of matrix LEDs and is a front view of the light source shown in FIG. 5.

FIG. 6 is a schematic diagram showing an arrangement of matrix LEDs and is a front view of the light source shown in FIG. 5. In the matrix LEDs shown in FIG. 6, each LED chip, whose light emitting surface is of a rectangular shape, is arranged such that the light emitting surface thereof is tilted (by 45 degrees relative to a horizontal direction) relative to the horizontal direction (vehicle width direction).

In the case of the matrix LEDs as shown in FIG. 6, a clear 45-degree sloping cutoff line is formed by LED chips 12a to 12c, which are being lit, when LED chips in a region R2 enclosed by dotted lines are turned on and LED chips in the region other than the region R2 are turned off. An upper edge of the region R2 of the LED chips, which are being lit, has a sawtooth shape, so that a horizontal cutoff line can be shaded off.

Figure 7A:
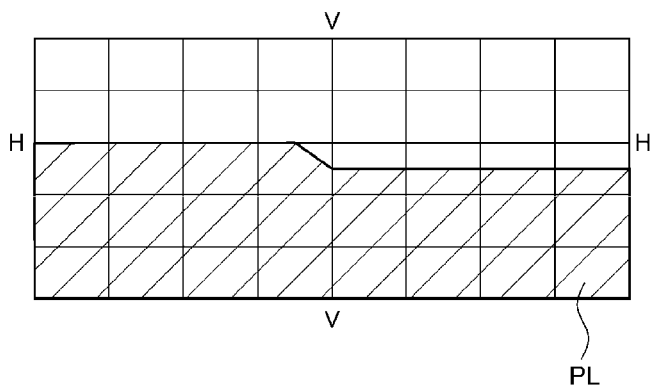
FIG. 7A shows a low beam distribution pattern formed by an automotive headlamp apparatus according to a first embodiment.
Figure 7B:
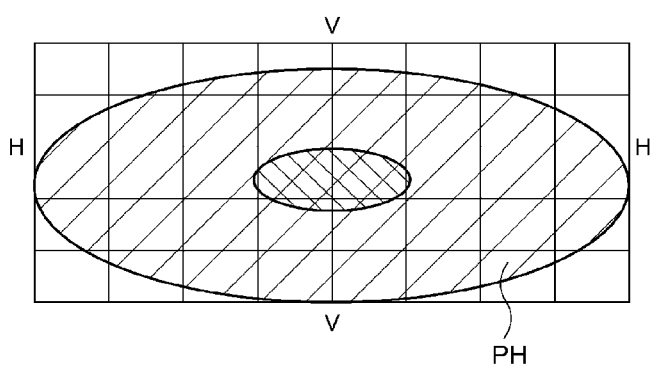
FIG. 7B shows a high beam distribution pattern formed by an automotive headlamp apparatus according to a first embodiment.

FIG. 7A shows a low beam distribution pattern formed by the automotive headlamp apparatus according to the first embodiment. FIG. 7B shows a high beam distribution pattern formed by the automotive headlamp apparatus according to the first embodiment. When the LED chips arranged in the region R2 among the matrix LEDs shown in FIG. 6 are turned on, a low beam distribution pattern PL of Z-shape light distribution is formed as shown in FIG. FIG. 7A. When all of the matrix LEDs shown in FIG. 6 are turned on, a high beam distribution pattern PH as shown in FIG. FIG. 7B is formed.

Figure 8:
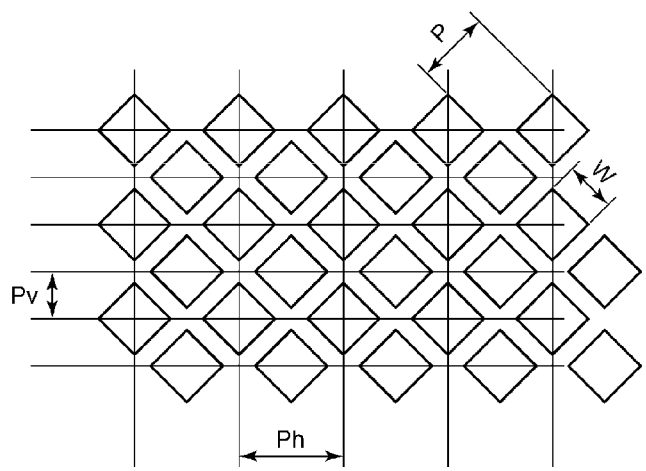
FIG. 8 is an enlarged view of part of matrix LEDs according to a first embodiment.

A description is next given of an appropriate magnification of a virtual image according to the size of LED chips and gaps between each LED chip. FIG. 8 is an enlarged view of part of matrix LEDs according to the first embodiment. In FIG. 8, "W" denotes the size of each LED chip, "P" a pitch interval between adjacent LED chips, "Ph" a pitch interval between LED chips in a horizontal direction, and "Pv" a pitch interval between LED chips in a vertical direction.

In this case, the magnification of a virtual image must be at least a factor of P/W. If, for example, the chip size W is a 1-mm square and the pitch is 3 mm, then P/W will be "3" and therefore the image forming magnification of the projection lens must be at least a factor of "3". According to Table 1, an object location (distance) to achieve this is "2f/3".

Thus, the LED chips need to be installed in between ⅔ of the focal length f and the focal point F, away from the projection lens. However, when the LED chip is placed on the focal point F, the luminance nonuniformity starts to become conspicuous on the screen.

In the light of this, the LED chips are preferably arranged such that the distance between the LED chips and the projection lens 16 is greater than or equal to $((P-W)/P) \times f$. Here, the focal length of the projection lens 16 is denoted by f [mm], a side length of the light emitting surface of an LED chip is denoted by W [mm], and the pitch between one LED chip and another LED chip adjacent to said one LED chip is denoted by P [mm].

If, in the case of P/W being 3, an installation error S of the LED chips is taken into consideration, the LED chips will be preferably installed at any position between 2f/3 and f−S, away from the projection lens. Practically, the light source is preferably installed in a position such that the magnification is greater than the actual factor of P/W, in consideration of mass production. Also, the installation error S may be set appropriately in consideration of a standard deviation σ of production accuracy.

As described above, the matrix LEDs are preferably installed such that the matrix LEDs are located closer to a front than a focal position F, namely located on a projection lens side. The matrix LEDs are preferably installed in a positional range such that the magnification of a virtual image by the projection lens is greater than a factor of P/W and less than a factor of 50. Here, the size of each LED chip is denoted by "W" and the pitch (the installation interval of the chips) is denoted by "P". Note that when f=50, a=49.

To be more specific, the LED chips are preferably arranged such that the distance between the LED chips 12 and the projection lens 16 is less than or equal to 0.98f where f [mm] denotes the focal length of the projection lens 16. As a result, the dark regions between the matrix LED chips can be made visually inconspicuous. If, in the matrix LEDs, the interval between adjacent LED chips differs in the vertical direction and in the horizon direction, the pitch interval P will be the larger of the two different ones in the vertical direction and in the horizon direction.

The matrix LEDs are preferably arranged such that the pitch interval Ph between the LED chips in the horizontal direction is greater than or equal to the pitch interval Pv between the LED chips in the vertical direction. This allows the Z-shape light distribution to be made clearer. Also, since the luminous flux density can be enhanced in the vertical direction, a horizontally-long light distribution pattern suitable for the headlamps is easily formed.

In this manner, the automotive headlamp apparatus 10 according to the present embodiment is a projection-type headlamp using the matrix LEDs as the light source. In this automotive headlamp apparatus 10 according to the present embodiment, specific locations of the matrix LEDs, which are to be lit, or the lighting current can be set based on the presence status of a vehicle-in-front detected by a front monitoring sensor. Also, various types of light distribution patterns described later can be achieved in addition to the commonly-used low beam distribution pattern and high beam distribution pattern.

Figure 9A:
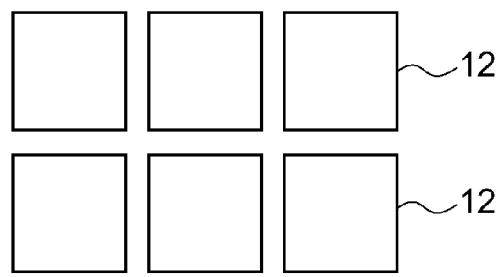
FIGS. 9A and 9B are illustrations to describe a modification of matrix LEDs according to a first embodiment.
Figure 9B:
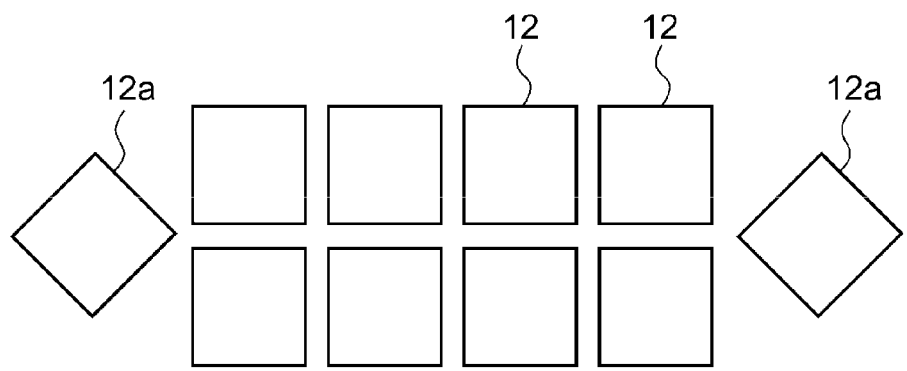
Figure 10A:
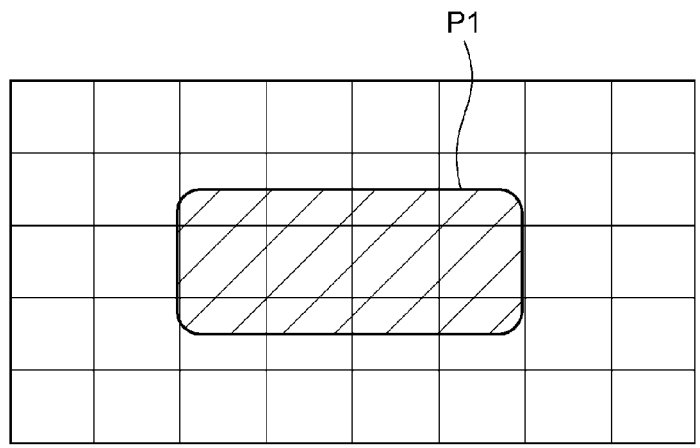
FIG. 10A to FIG. 10C show spot-beam-like light distribution patterns formed by the matrix LEDs.
Figure 10B:
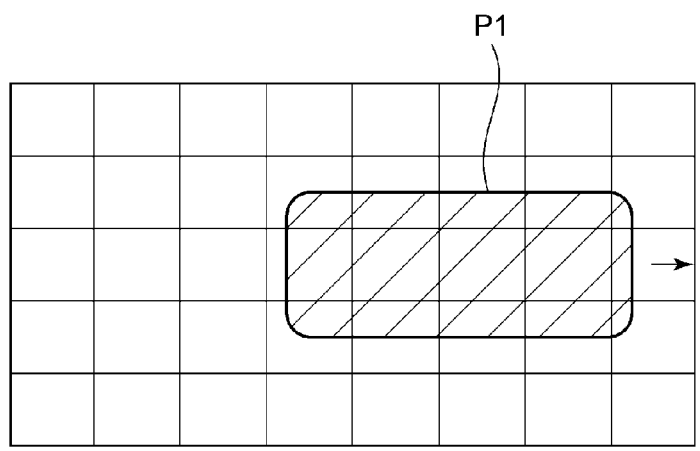
Figure 10C:
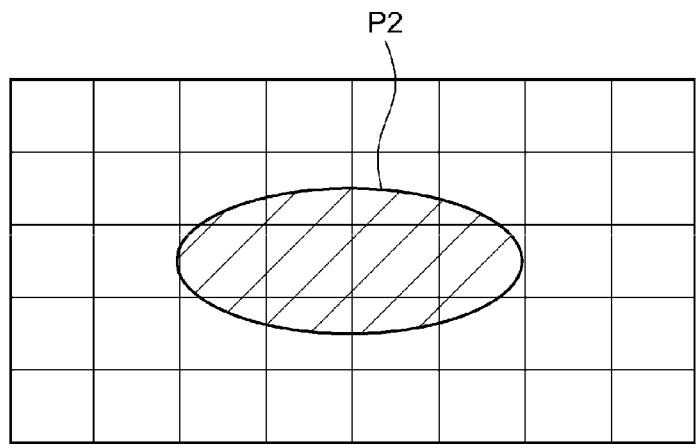

A description is now given of modifications of a head lamp system of variable light distribution type using the matrix LEDs. FIGS. 9A and 9B are illustrations to describe a modification of the matrix LEDs according to the first embodiment. FIG. 10A to FIG. 10C show spot-beam-like light distribution patterns formed by the matrix LEDs.

As illustrated in FIGS. 9A and 9B, the matrix LEDs according to the modification use about four to about ten LED chips. For example, the matrix LEDs are arranged as illustrated in FIG. 9A and is so configured as to form a spot-beam-like light distribution pattern. In this case, a rectangular spot-beam-like light distribution pattern P1 as shown in FIG. 10A is formed. As illustrated in FIG. 10B, this light pattern P1 may be moved to a horizontal direction along a winding road.

As illustrated in FIG. 9B, the matrix LEDs may be arranged such that part of the LED chips 12d are disposed in a rhomboidal formation and may be so configured as to form a spot-beam-like light distribution pattern. In this case, a spot-beam-like light distribution pattern P2 of a horizontally long elliptic shape as illustrated in FIG. 10C is easily formed.

Figure 11:
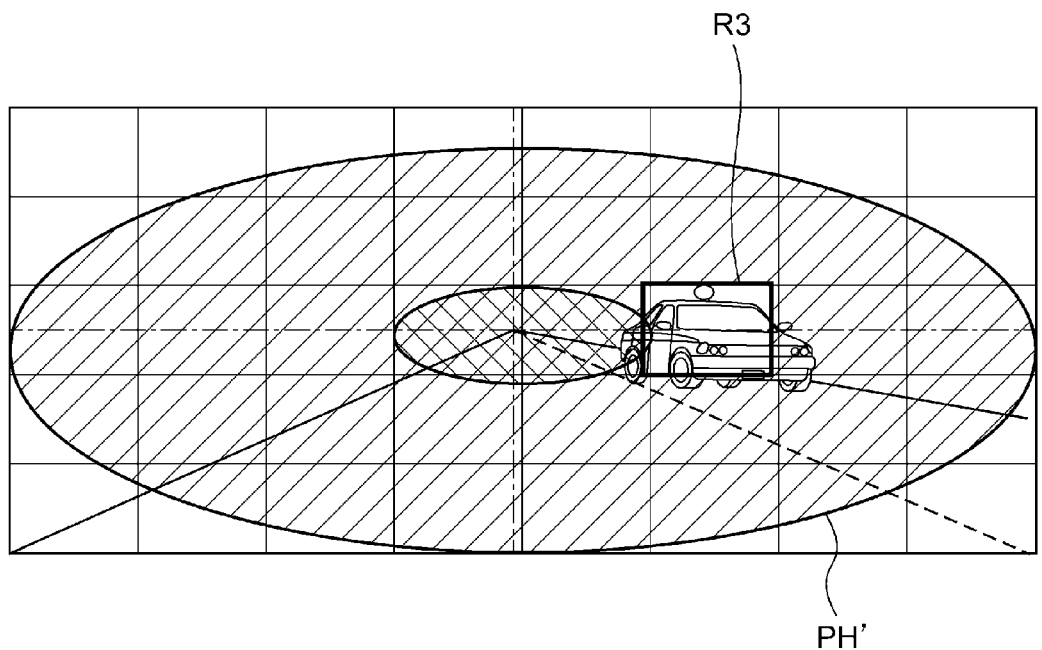
FIG. 11 shows an exemplary light distribution pattern formed by an automotive headlamp apparatus according to a first embodiment.

FIG. 11 shows an exemplary light distribution pattern formed by the automotive headlamp apparatus according to the first embodiment. As illustrated in FIG. 11, the automotive headlamp apparatus 10 according to the first embodiment can form a light distribution pattern PH′ where a partial region is not illuminated. This can ensure a visibility of the road ahead of the vehicle while avoiding glare as experienced by oncoming vehicles and forerunning vehicles.

(Structure of Control System)

Figure 12:
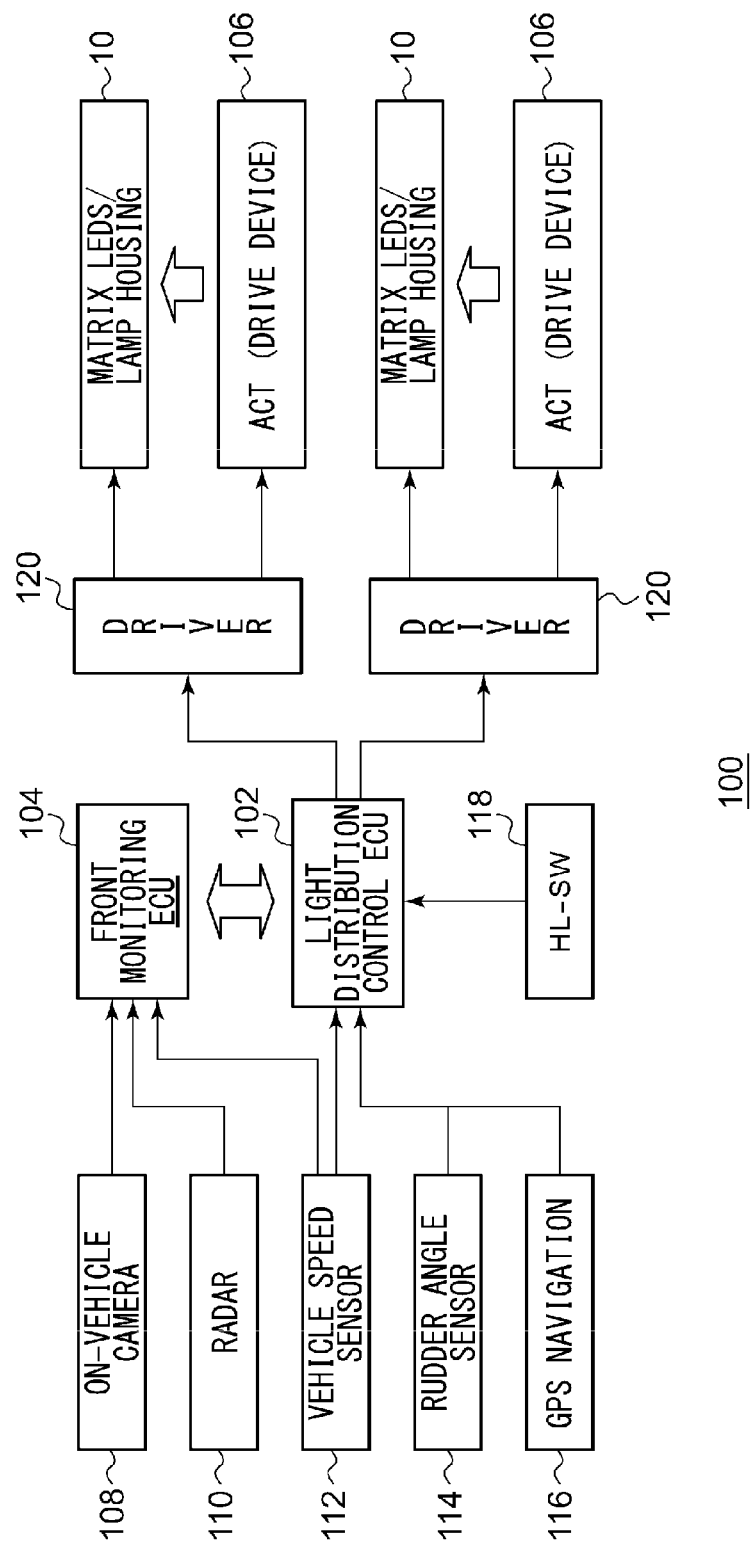
FIG. 12 is a block diagram showing schematically a structure of a headlamp system.

A description is now given of a structure of a control system for headlamps. FIG. 12 is a block diagram showing schematically a structure of a headlamp system.

A headlamp system 100 is comprised of a pair of left and right automotive headlamp apparatuses 10, a light distribution control ECU (electronic control units) 102, a front monitoring ECU 104 and so forth. As described earlier, the automotive headlamp apparatus 10 has the light source 14, constituted by the matrix LEDs, the projection lens 16, and a lamp housing that houses the light source 14 and the projection lens 16. Also, a drive device or actuator (ACT) 106 that swivels the matrix LEDs and the lamp housing is connected to each automotive headlamp apparatus 10.

Various sensors, such as an on-vehicle camera 108, a radar 110 and a vehicle speed sensor 112, are connected to the front monitoring ECU 104. The front monitoring ECU 104 performs image processing on the image-captured data acquired from the sensors, then detects vehicles-in-front (oncoming vehicles and forerunning vehicles), other bright objects on the road and lane marks, and thereby calculates data, such as their attributes and positions, required for the light distribution control. The thus calculated data is transmitted to the light distribution control ECU 102 and various on-vehicles units via an in-vehicle LAN and the like.

Connected to the light distribution control ECU 102 are a vehicle speed sensor 112, a rudder angle sensor 114, a GPS navigation 116, a headlamp switch 118 and so forth. The light distribution control ECU 102 determines a light distribution pattern associated with the then traveling scene and/or condition, based on the attributes (oncoming vehicle, forerunning vehicle, reflector, or road illumination) of the bright objects on the road, their positions (frontward or lateral), and the vehicle speed sent out from the front monitoring ECU 104. Then the light distribution control ECU 102 determines a control amount (controlled variables) of a headlamp of variable light distribution type required for the achievement of the light distribution pattern. Here, the control amount (controlled variables) represents an amount of beam movement in the vertical and horizontal directions and the position and range of a masked portion (shaded region), for instance.

Also, the light distribution control ECU 102 determines control contents of the drive device 106 and each LED chip of the matrix LEDs. Here, the control contents represent the turning on/off of each LED chip, the electric power to be applied to each LED chip, and so forth. Note here that a mechanical type drive device, which drives the lamp unit of variable light distribution type in the vertical and horizontal directions, for example, can be used for the drive device 106. A driver 120 converts the information regarding the control amount fed from the light distribution control ECU 102 into instructions corresponding to operations of the drive device 106 and light distribution control elements, and controls said instructions.

(Control Flowchart)

Figure 13:
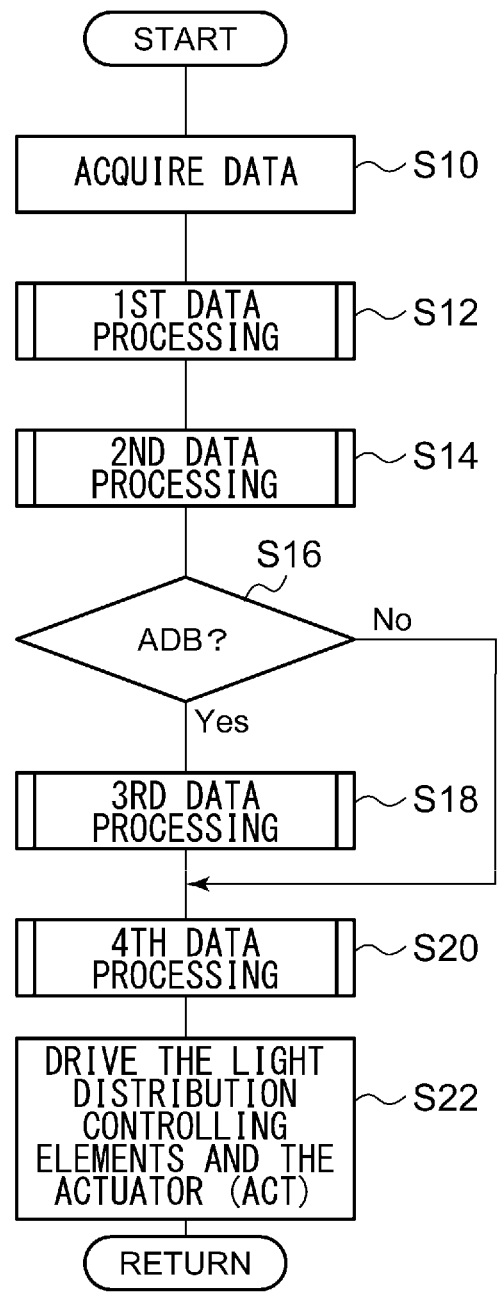
FIG. 13 is a flowchart showing an exemplary control performed by a headlamp system according to a first embodiment.

FIG. 13 is a flowchart showing an exemplary control performed by a headlamp system according to the first embodiment.

When a selection is made by the headlamp switch or when a predetermined condition (night ride or traveling in a tunnel) is recognized based on the information sent from various sensors, the processing shown in FIG. 13 is repeatedly carried out at predetermined intervals.

First, the light distribution control ECU 102 and/or the front monitoring ECU 104 acquires/acquire necessary data from a camera, various sensors, switches and the like (S10). The data may be data regarding an image of a front area of the vehicle, the vehicle speed, an inter-vehicular distance, the shape of a road, the rudder angle of a steering wheel, and a light distribution pattern selected by the headlamp switch, for instance.

The front monitoring ECU 104 carries out a first data processing, based on the acquired data (S12). The first data processing calculates or figures out the data regarding the attributes of bright objects in a front area of the vehicle (signal lamps, illuminating lamps, delineators, etc.), the attributes of vehicles (oncoming vehicle, forerunning vehicle), the inter-vehicular distance, the brightness of bright objects, the shape of a road (lane width, straight road, winding road), and so forth.

Then, the light distribution control ECU 102 carries out a second data processing, based on the data calculated in the first data processing (S14), and selects an appropriate light distribution pattern. A control light distribution pattern to be selected is a low beam distribution pattern, a high beam distribution pattern or an adaptive driving beam (ADB), for instance. Also, the turning on/off of each LED chip and the control amount of the electric power to be applied thereto are determined according to the selected light distribution pattern.

If the ADB is selected (Yes of S16), a third data processing will be carried out by the light distribution control ECU 102 (S18). For example, an illumination area, a shaded area, an illumination light quantity and an illumination direction by an ADB control are determined in the third data processing. Also, an AFS (Adaptive Front-Lighting System) control can be performed, based on the data calculated in the first data processing in addition to these items of information. The AFS control is a control whereby the light distribution is controlled according to a winding road, a traveling area (city streets, suburbs, expressway) and the weather. If the ADB is not selected (No of S16), Step S18 will be skipped.

Then, in a fourth data processing, the light distribution control ECU 102 converts the data into another data for use by a driver (S20) and drives the light distribution control elements and the actuator (ACT) (S22) and thereby controls the ADB and the swiveling.

(Various Light Distribution Patterns)

Figure 14A:
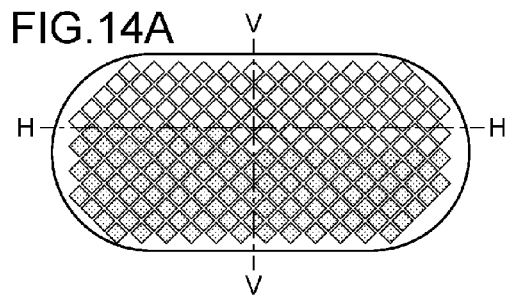
FIG. 14A is a diagram indicating that the matrix LEDs are lit when forming a basic beam (BL)
Figure 14B:
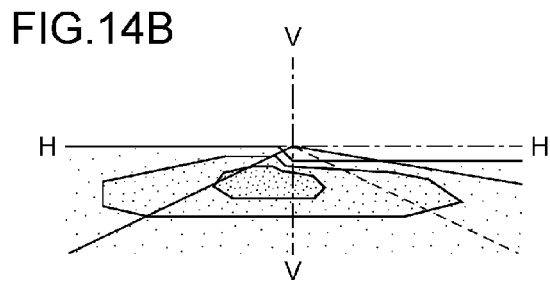
FIG. 14B shows a light distribution pattern formed by the matrix LEDs that are in the lighting status shown in FIG. 14A.
Figure 14C:
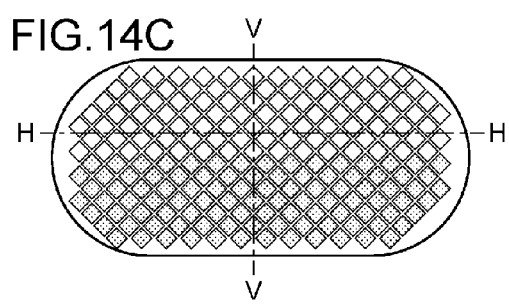
FIG. 14C is a diagram indicating that the matrix LEDs are lit when forming a town beam (TL)
Figure 14D:
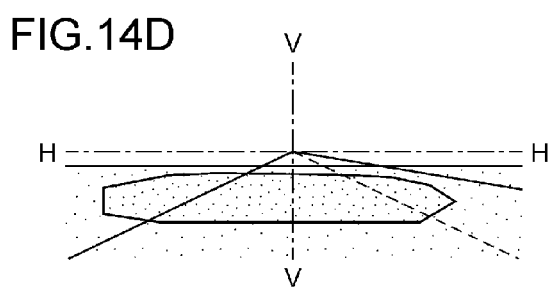
FIG. 14D shows a light distribution pattern formed by the matrix LEDs that are in the lighting status shown in FIG. 14C.
Figure 14E:
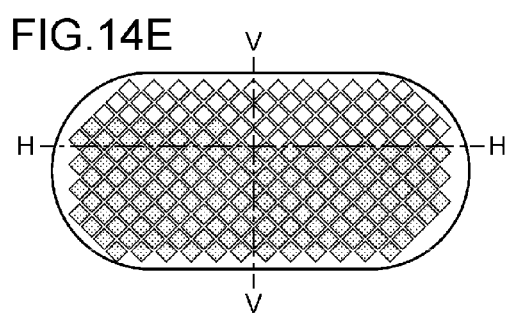
FIG. 14E is a diagram indicating that the matrix LEDs are lit when forming a motorway beam (ML)
Figure 14F:
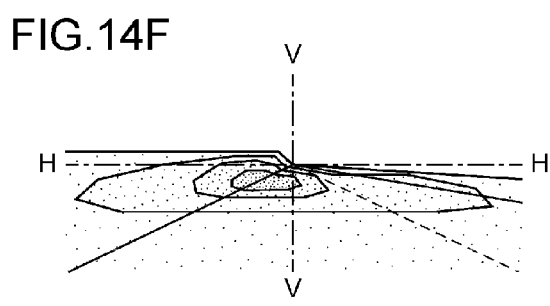
FIG. 14F shows a light distribution pattern formed by the matrix LEDs that are in the lighting status shown in FIG. 14E.
Figure 14G:
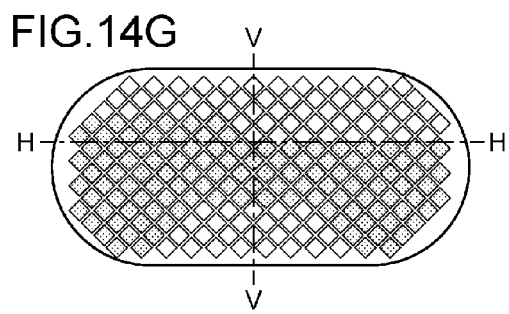
FIG. 14G is a diagram indicating that the matrix LEDs are lit when forming a wet beam (WL)
Figure 14H:
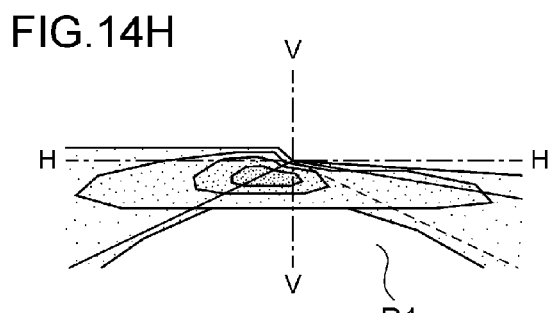
FIG. 14H shows a light distribution pattern formed by the matrix LEDs that are in the lighting status shown in FIG. 14G.
Figure 14I:
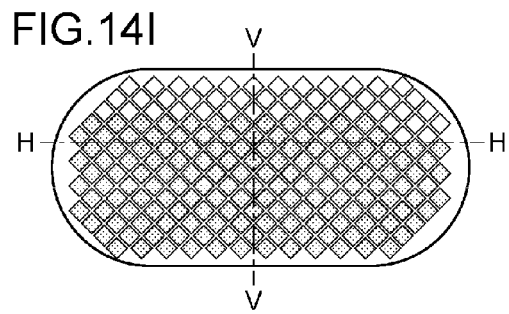
FIG. 14I is a diagram indicating that the matrix LEDs are lit when the motorway beam (ML) is swiveled.
Figure 14J:
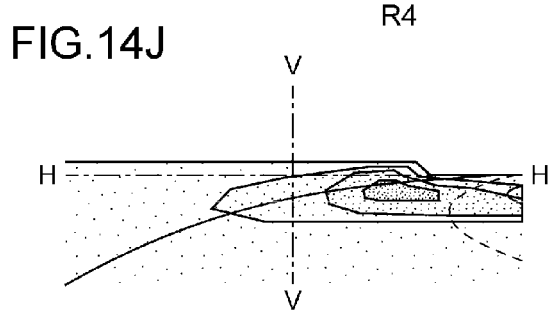
FIG. 14J shows a light distribution pattern formed by the matrix LEDs that are in the lighting status shown in FIG. 14I.

FIG. 14A is a diagram indicating that the matrix LEDs are lit when forming a basic beam (BL). FIG. 14B shows a light distribution pattern formed by the matrix LEDs that are in the lighting status shown in FIG. 14A. FIG. 14C is a diagram indicating that the matrix LEDs are lit when forming a town beam (TL). FIG. 14D shows a light distribution pattern formed by the matrix LEDs that are in the lighting status shown in FIG. 14C. FIG. 14E is a diagram indicating that the matrix LEDs are lit when forming a motorway beam (ML). FIG. 14F shows a light distribution pattern formed by the matrix LEDs that are in the lighting status shown in FIG. 14E. FIG. 14G is a diagram indicating that the matrix LEDs are lit when forming a wet beam (WL). FIG. 14H shows a light distribution pattern formed by the matrix LEDs that are in the lighting status shown in FIG. 14G. FIG. 14I is a diagram indicating that the matrix LEDs are lit when the motorway beam (ML) is swiveled. FIG. 14J shows a light distribution pattern formed by the matrix LEDs that are in the lighting status shown in FIG. 14I.

The light distribution pattern shown in FIG. 14B is a light distribution pattern like a presently used low beam and is used when one's own vehicle passes the oncoming vehicle in a suburban road. The light distribution pattern shown in FIG. 14D is used in a city street where there are road illuminations. In this light distribution pattern shown in FIG. 14D, the illumination performance is lower than that of the presently-used low beam because of the presence of road illuminations. At the same time, this light distribution pattern is a beam where the glare light quantity is also low.

The light distribution pattern shown in FIG. 14F is used when the vehicle is running on an expressway with anti-glare fences. The cutoff line of the presently-used low beam is shifted upward, and the intensity of light in the center is raised. The light distribution pattern shown in FIG. 14H is used when it is raining. In this light distribution pattern shown in FIG. 14H, the light quantity on a road surface region R4 in front of one's own vehicle is lowered to suppress the glare as experienced by the oncoming vehicle. That is, in the light distribution pattern of the motorway beam (ML) shown in FIG. 14F, the light quantity on a part of road ahead corresponding to the road surface in front of one's own vehicle is lowered.

In the light distribution pattern shown in FIG. 14J, the visibility of road in a traveling direction can be improved as the AFS control when the road ahead of the driver is a winding road.

Though, in the above description of the aforementioned various light distribution patterns, only the specific locations of the matrix LEDs to be lit are indicated, the lighting current to be supplied to those specific locations thereof may be adjusted as appropriate in a practical application.

[Second Embodiment]

Figure 15:
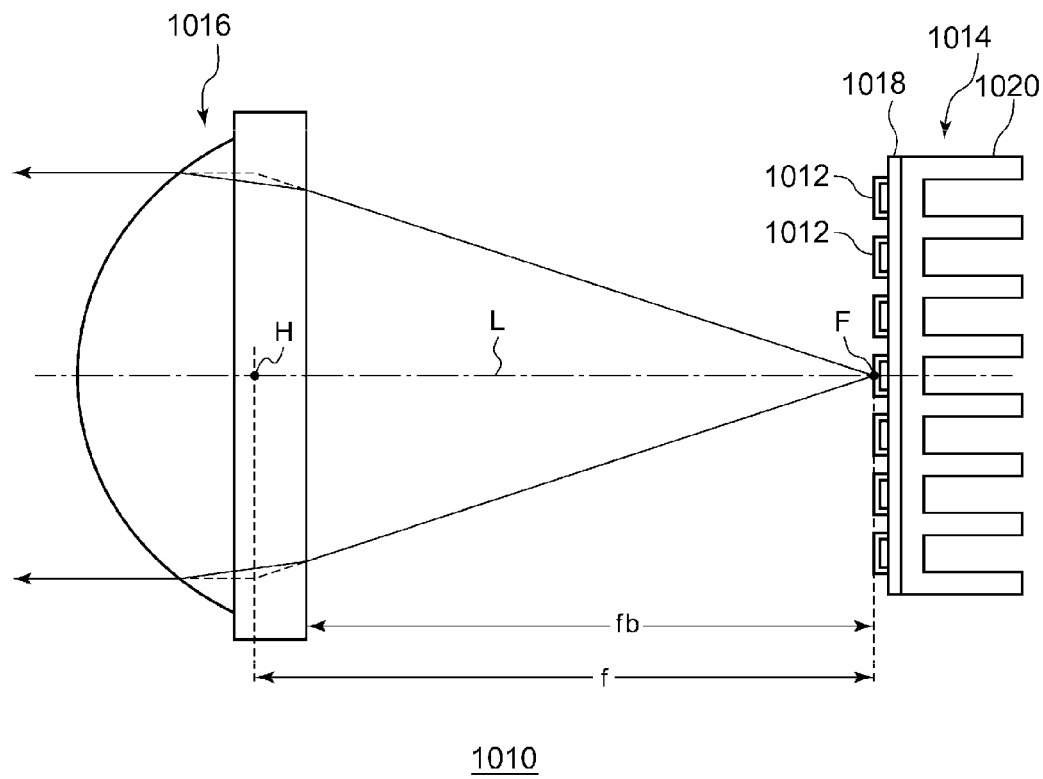
FIG. 15 schematically shows a structure of an automotive headlamp apparatus, according to a second embodiment, viewed laterally.

FIG. 15 schematically shows a structure of an automotive headlamp apparatus, according to a second embodiment, viewed laterally. An automotive headlamp apparatus 1010 is comprised of a light source 1014 in which LED chips 1012, which are a plurality of semiconductor light-emitting elements, are arranged at intervals from each other, and a projection lens 1016 that projects light, emitted from the light source 1014, toward a front area of the vehicle as a light source image. The light source 1014 has an LED circuit board 1018 and a heatsink 1020. In FIG. 15, "F" denotes a focal point, "H" denotes a principal point of the projection lens, "f" denotes a focal length, and "fb" denotes a back focal length. Note that the plurality of LED chips 1012 are arranged such that the light emitting surface of each of the LED chips 1012 faces the front area of the vehicle. This eliminates provision of a reflective member such as a reflector.

Figure 16:
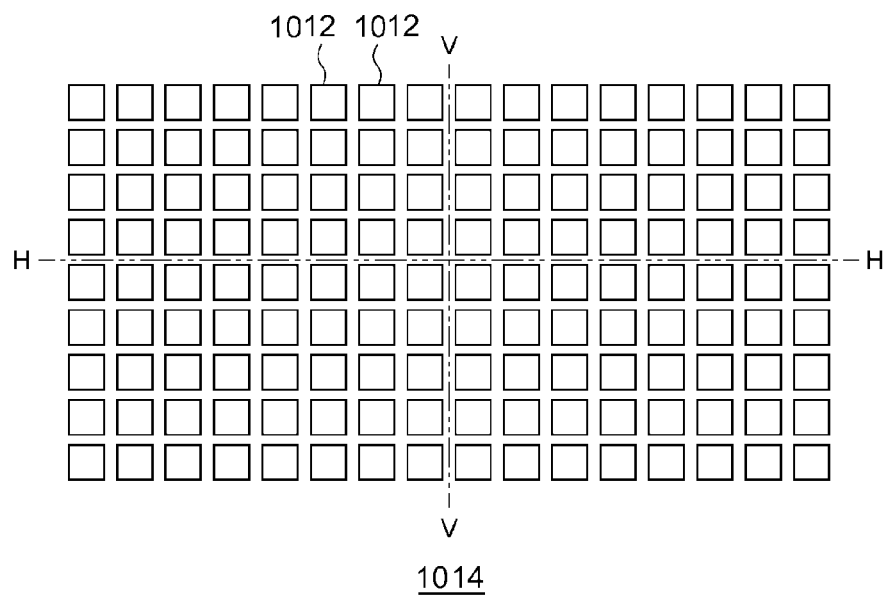
FIG. 16 schematically shows an exemplary light source where a plurality of LED chips shown in FIG. 15 are arranged in a matrix.
Figure 17:
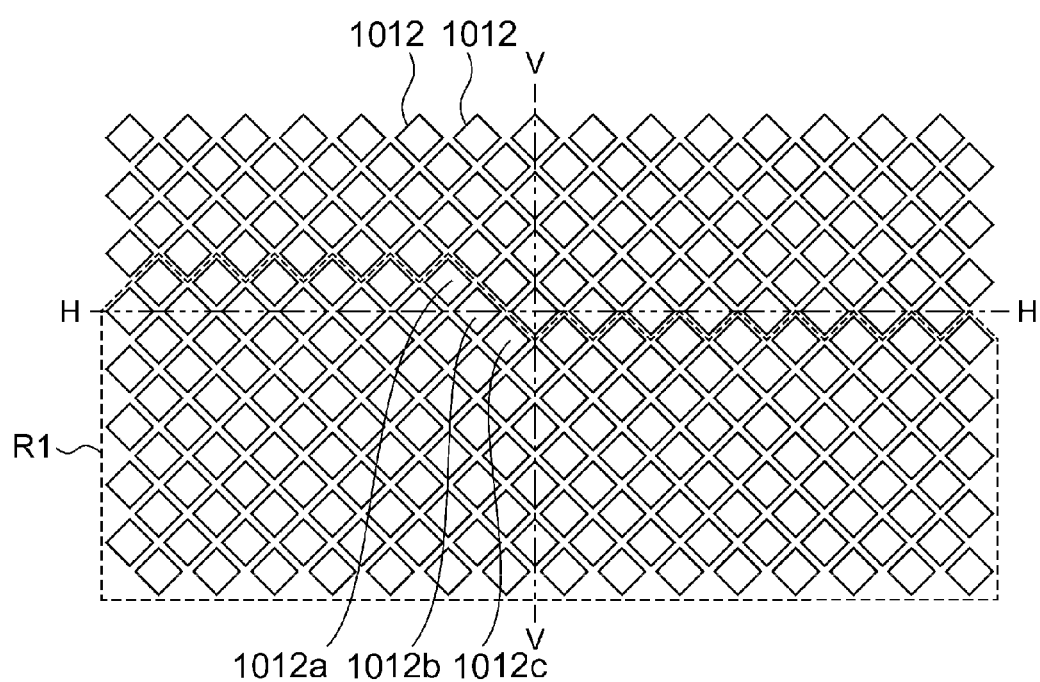
FIG. 17 schematically shows another exemplary light source where a plurality of LED chips shown in FIG. 15 are arranged in a matrix.

FIG. 16 schematically shows an exemplary light source where the plurality of LED chips shown in FIG. 15 are arranged in a matrix. FIG. 17 schematically shows another exemplary light source where the plurality of LED chips shown in FIG. 15 are arranged in a matrix. The light source comprised of a plurality of LED chips (hereinafter referred to as "matrix LEDs" or "matrix LED"), which are arranged in a matrix as illustrated in FIG. 16 and FIG. 17, faces a front area of the vehicle. An optical system, having the aforementioned light source, in which the projection lens is provided in front of this light source, is configured such that the luminance of the LED chips on the plane containing the focal point F is distributed and projected in a frontward direction.

In the matrix LEDs shown in FIG. 16, each LED chip 1012 is arranged such that each side of the LED chips, whose light emitting surface is rectangular, is placed parallel to the horizontal direction (H-H line).

In the matrix LEDs shown in FIG. 17, each LED chip, whose light emitting surface is of a rectangular shape, is arranged such that the light emitting surface thereof is tilted (by 45 degrees relative to the horizontal direction) relative to the horizontal direction (vehicle width direction). In the case of the matrix LEDs as shown in FIG. 17, a clear 45-degree sloping cutoff line is formed by LED chips 1012*a* to 1012*c*, which are being lit, when LED chips in a region R1 enclosed by dotted lines are turned on and LED chips in the region other than the region R1 are turned off. An upper edge of the region R1 of the LED chips, which are being lit, has a sawtooth shape, so that a horizontal cutoff line can be shaded off.

In order to form a predetermined light distribution pattern in the headlamp using the matrix LEDs, it is conceivable that a control can be performed such that a predetermined current flows through the headlamp by monitoring the current to be supplied for each LED chip. The same number of channels for a driver circuit (driver) as the number of LED chips is required in this case. Thus there is room for further improvements in terms of cost.

There is a phenomenon that it is difficult for the vehicle's driver to drive the vehicle using a light distribution pattern when the road surface in front of one's own vehicle or the shoulder of the road is too bright. In such a case, it is therefore necessary to make brighter a region near an HV region where the H-H line and V-V line intersects with each other. However, it is preferable that the peripheral region of the HV region be illuminated with less light quantity than the quantity of light illuminating said region near the HV region. However, in the conventional matrix LEDs, high-performance and expensive LED chips are used for every LED chip and all of the LED chips arranged have the same specifications. This may cause an increase in cost.

In the light of this, through his diligent investigations for the purpose of reducing the cost of the light source that uses the matrix LEDs, the inventor of the present invention had conceived of the following structures (1) to (3).

(1) Cost Reduction by a Zone Division and the Use of LED Chips Having Different Performance Levels The matrix LEDs are divided into a plurality of zones and then chips having a predetermined performance are placed in each of the zones. High-luminance (high-current specifications, namely, expensive) LED chips are arranged in a zone corresponding to a high-luminosity light distribution. And low-luminance (low-current specifications, namely, inexpensive) LED chips are arranged in a zone corresponding to a low-luminosity light distribution. This helps reduce the overall cost.

(2) Cost Reduction by Reducing the Number of Channels

The cost is reduced by simultaneously controlling a plurality of LED chips in each zone, namely, by controlling a plurality of chips with a single channel of the driver circuit (driver).

(3) Cost Reduction by Sharing with a Multifunctional Lamp (by Combining Different Light Distributions)

It suffices that an area outside a region within 4 degrees from the line of sight near the HV region in the vertical direction and a peripheral visual field portion outside a region within 10 degrees in the horizontal direction are illuminated with a moderate luminance. Thus, it is possible to achieve a desired light distribution by combining or superimposing the light distribution of a DRL (Daytime Running Lamp), a fog lamp, a clearance lamp or the like, where the luminous intensities of the clearance lamp have been increased, and the light distribution of the matrix LEDs. By employing such a configuration as described above, the number of LED chips, particularly the number of low-luminance LED chips in the peripheral visual field portion, can be reduced. This can reduce the cost of the matrix LEDs and their driver circuits.

Figure 18:
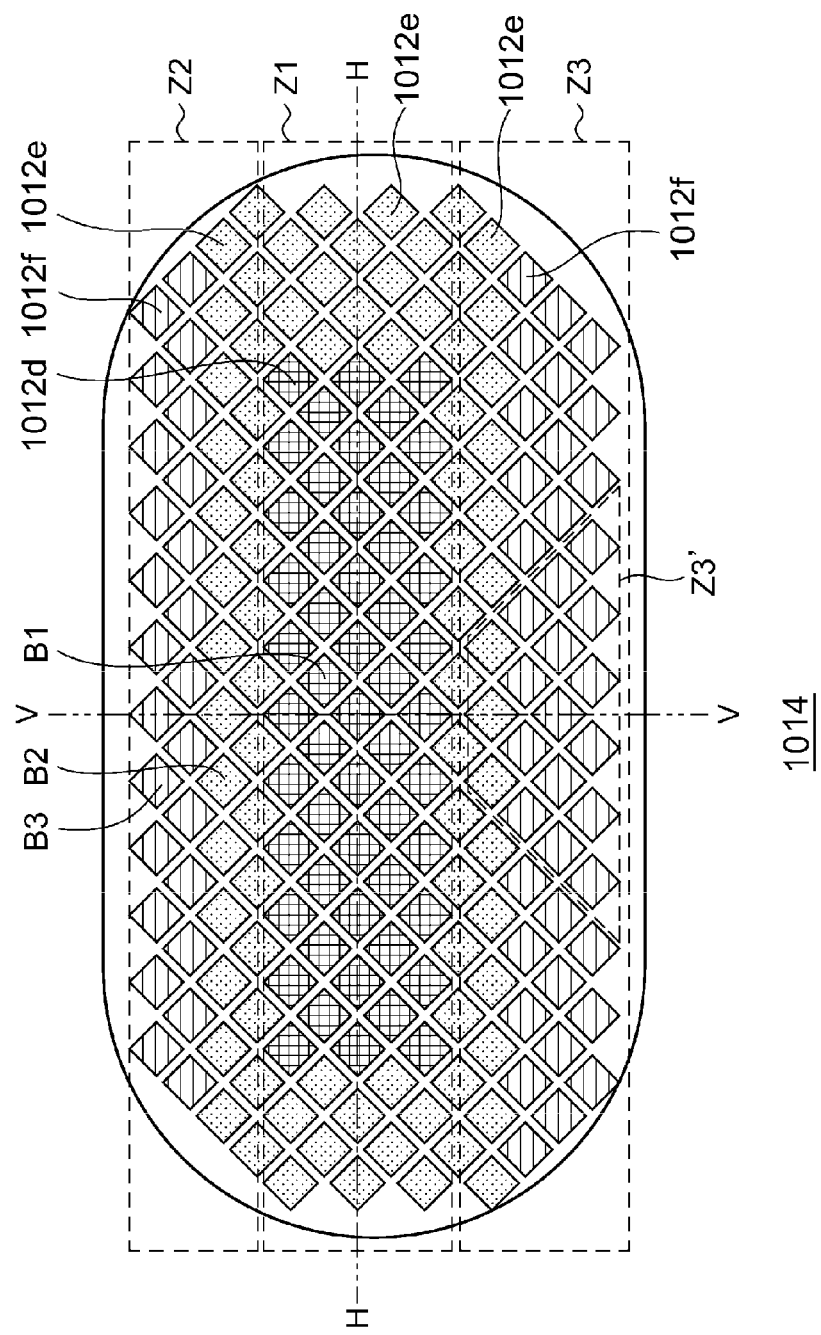
FIG. 18 is an illustration to describe an arrangement of various types of LED chips in matrix LEDs according to a second embodiment.

FIG. 18 is an illustration to describe an arrangement of various types of LED chips in the matrix LEDs according to the second embodiment.

In the matrix LEDs in a light source 1014 shown in FIG. 18, the high-luminance LED chips (level I) are arranged in a block B1 corresponding to a central visual field of a road ahead of one's own vehicle. And this high-luminance LED chips illuminate a range that covers a region within about 2 degrees in the vertical direction and a region within about 5 degrees in the horizontal direction on a screen in a front area of the vehicle. Also, medium-luminance LED chips (level II) are arranged in a block B2 corresponding to an effective visual field of the road ahead of the vehicle, and illuminate a range that covers a region within about 4 degrees in the vertical direction and a region within about 10 degrees in the horizontal direction on the screen in the front area of the vehicle. Also, the low-luminance LED chips (level III) are arranged in a block B3 corresponding to a peripheral visual field of the road ahead of the vehicle, and illuminate a range that covers a region within about 10 degrees in the vertical direction and a region within about 30 degrees in the horizontal direction on the screen in the front area of the vehicle.

In other words, the high-luminance LED chips of level I is located in the central visual field of the block B1 near the HV region. The medium-luminance LED chips of level II is located in the effective visual field of the block B2, which is located outside the block B1. The low-luminance LED chips of level III is located in the peripheral visual field of the block B3, which is located outside the block B2.

A description is now given of the three zones into which the matrix LEDs according to the second embodiment are divided.

A zone Z1 is a range that contains both the central visual field of the block B1 and a part of the effective visual field of the block B2, wherein said part of the block B2 corresponds to partial regions of the block B2 that are located lateral to the block B1. Thus, the zone Z1 contains the high-luminance LED chips of level I and a part of the medium-luminance LED chips. Each LED chip contained in the zone Z1 is involved in many light distribution controls. Such many light distribution controls include the following three controls, for instance. Here, the first one included in the light distribution controls is the 45-degree Z-cutting (light-dark boundary lines), such as BL (basic beam), ML (motorway beam) and WL (wet beam) in an AFS (Adaptive Front-Lighting System) light distribution, and the changing of the position of said light-dark boundary lines. The second one is to adjust the light quantity (luminosity) associated with the change in the position of the light distribution of high beam, BL, ML, WL or the like. The third one is a partial masking of an illumination region such as ADB (Adaptive Driving Beam) and the changing of the position of said partial masking thereof.

The LED chips contained in the zone Z1 are simply turned on or off, and the lighting of the LED chips contained therein is controlled. The number of channels corresponding to this portion, namely the zone Z1, is preferably achieved by use of the minimum number of channels, which corresponds to the number of types of the light distribution controls in use plus a small additional number. Though the detailed circuit configurations of individual channels of the driver circuits necessary for the achievement of this will be discussed later, the configuration is such that the lighting of a plurality of LED chips at the same level are simultaneously controlled.

The LED chips contained in a zone Z2, which is located directly above the zone Z1, are simply turned on or off during a high beam mode and an ADB operation. In the zone 2, a plurality of LED chips at the same level are gathered as a single unit and are turned on and off with a single channel by using a predetermined value of electric current. If, for example, five LED chips are turned on and off with a single channel, the number of channels can be reduced to ⅕.

The LED chips contained in a zone Z3, which is located directly below the zone Z1, illuminate the road surface in front of the vehicle. The zone Z3 has a zone Z3' in a central part of the zone Z3. The LED chips arranged in the zone Z3' are turned off, depending on a condition, for the purpose of suppressing the glare as experienced by the oncoming vehicle as a result of the illumination mirror-reflected on the road surface in the rain. And the LED chips arranged in the zone Z3' are simply turned off or dimmed by following the instructions regarding the WL in the AFS light distribution. In the zone Z3, too, a plurality of LED chips at the same level are gathered as a single unit and are turned on and off with a single channel by using a predetermined value of electric current. Such a circuit configuration as this can reduced the number of channels for the driver circuit.

(Structure of Control System)

Figure 19:
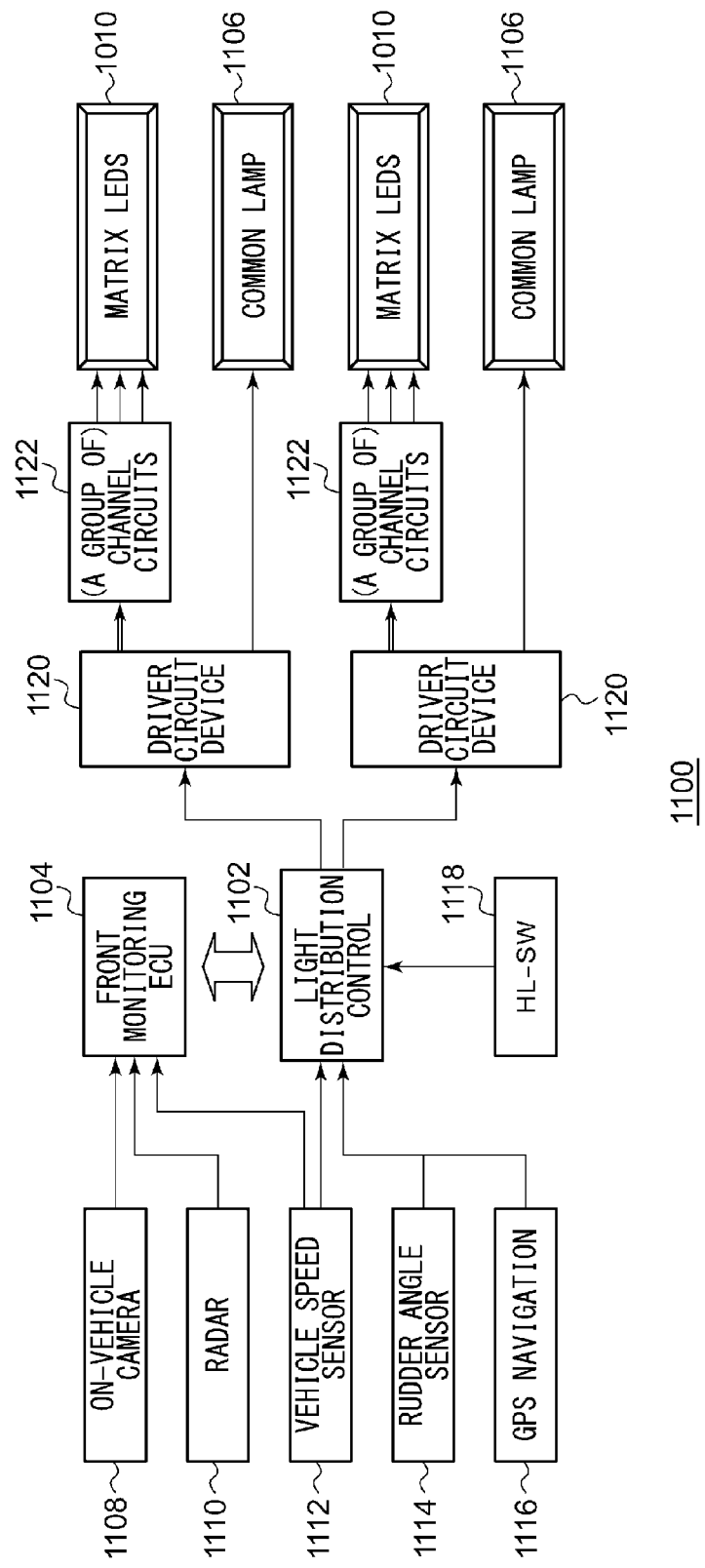
FIG. 19 is a block diagram showing schematically a structure of a headlamp system.
Figure 20:
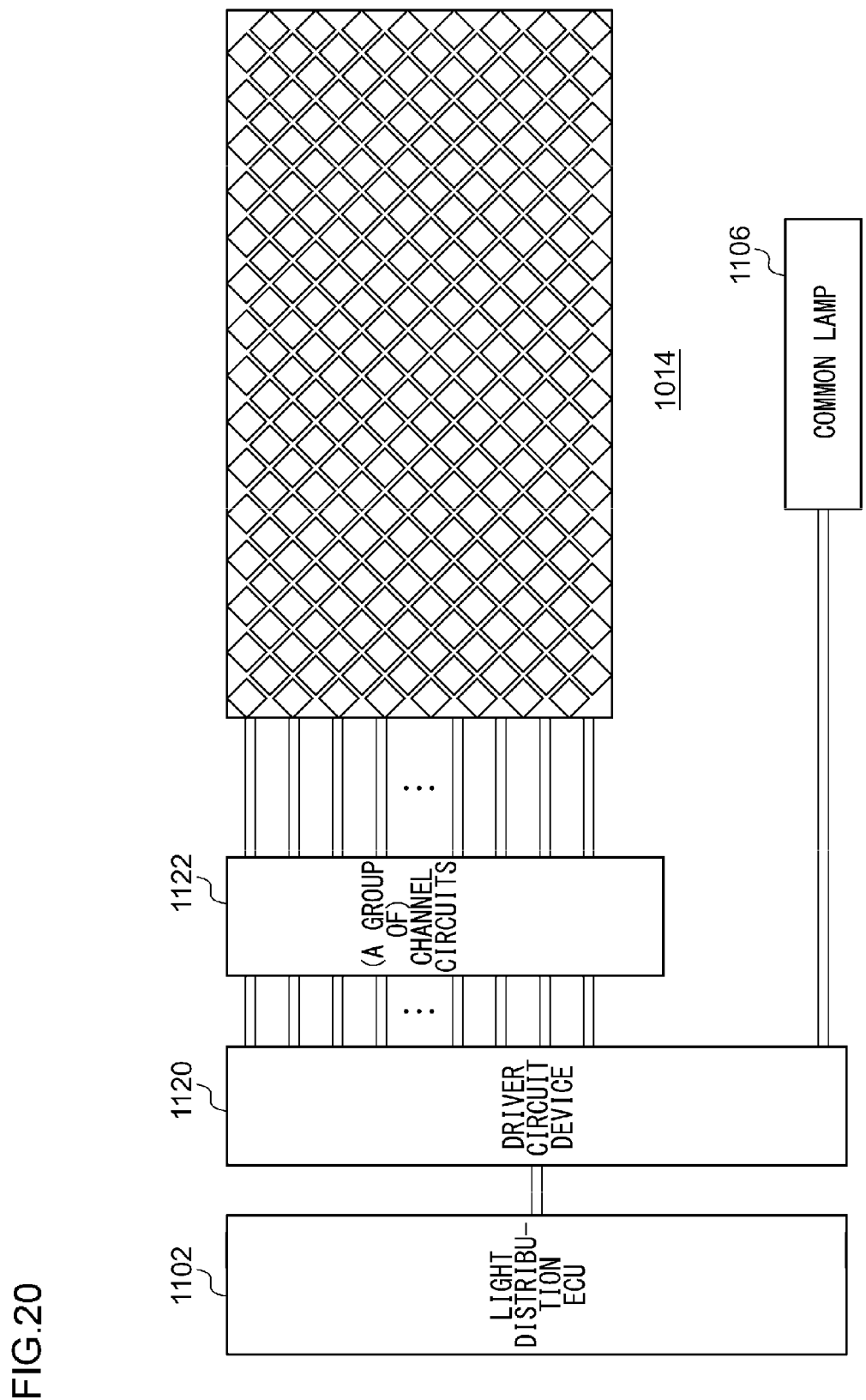
FIG. 20 is a block diagram showing an outline of a driver circuit device and (a group of) channel circuits.

A description is now given of a structure of a control system for headlamps. FIG. 19 is a block diagram showing schematically a structure of a headlamp system. FIG. 20 is a block diagram showing an outline of a driver circuit device and (a group of) channel circuits.

A headlamp system 1100 is comprised of a pair of left and right automotive headlamp apparatuses 1010, a light distribution control ECU 1102, a front monitoring ECU 1104 and so forth. As described earlier, the automotive headlamp apparatus 1010 has the light source 1014, constituted by the matrix LEDs, the projection lens 1016, and a lamp housing that houses the light source 1014 and the projection lens 1016. Also, an actuator (not-shown) that swivels the matrix LEDs and the lamp housing is connected to each automotive headlamp apparatus 1010.

Various sensors, such as an on-vehicle camera 1108, a radar 1110 and a vehicle speed sensor 1112, are connected to the front monitoring ECU 1104. The front monitoring ECU 1104 performs image processing on the image-captured data acquired from the sensors, then detects vehicles-in-front (oncoming vehicles and forerunning vehicles), other bright objects on the road and lane marks, and thereby calculates data, such as their attributes and positions, the shape of a road and a wet state of a road surface, required for the light distribution control. The thus calculated data is transmitted to the light distribution control ECU 1102 and various on-vehicles units via the in-vehicle LAN and the like.

Connected to the light distribution control ECU 1102 are a vehicle speed sensor 1112, a rudder angle sensor 1114, a GPS navigation 1116, a headlamp switch (HL-SW) 1118 and so forth. The light distribution control ECU 1102 determines a light distribution pattern associated with the then traveling scene and/or condition, based on the information, such as a road surface condition, the attributes (oncoming vehicle, forerunning vehicle, reflector, or road illumination) of the bright objects on the road, their positions (frontward or lateral), and the vehicle speed, sent out from the front monitoring ECU 1104. Also, the light distribution control ECU 1102 may determine a light distribution pattern associated with the then traveling scene, based further on the information, such as the road shape and lanes and a traffic volume, calculated based on the data acquired from the rudder angle sensor 1114 and the GPS navigation 1116. Also, the light distribution control ECU 1102 may determine a light distribution pattern associated with the then traveling scene, based further on the information on the headlamp switch 1118.

In this manner, the light distribution control ECU 1102 determines the selection of a predetermined beam by AFS and an ADB light distribution associated with the then traveling scene, based on the above-described various items of information. And the light distribution control ECU 1102 determines the control of the turning on of a common lamp 1106 and a control amount of the headlamp of variable light distribution type, which are required for the achievement of the light distribution pattern. Here, the control amount indicates the selection of LED chips, for which the matrix LEDs are to be lit, and conducting channels, an amount of beam movement in the vertical and horizontal directions, the position and range of a masked portion (shaded region), and the electric power to be applied to the selected LED chips, for instance.

A driver circuit device 1120 not only selects a channel or channels (LED chips in the matrix LEDs) to be controlled, based on a light distribution content fed from the light distribution control ECU 1102, but also determines a control amount (the electric conduction amount, etc.) of said channel or channels selected.

(A group of) channel circuits 1122 are a group of circuits that have selected the LED chips, whose lighting is to be controlled, in the matrix LEDs; a plurality of chips having the same performance level are connected in each channel.

The common lamp 1106 is a DRL, a fog lamp or the like. The common lamp 1106 constitutes a part of beam assisting the projection-type headlamp, which uses the matrix LEDs. And the common lamp 1106 forms various light distributions of AFS, high beams and so forth in cooperation with the headlamp. This auxiliary beam can suppress the light distribution performance required for the matrix LEDs and therefore contributes to the cost reduction of the circuits and the LED chips.

Figure 21:
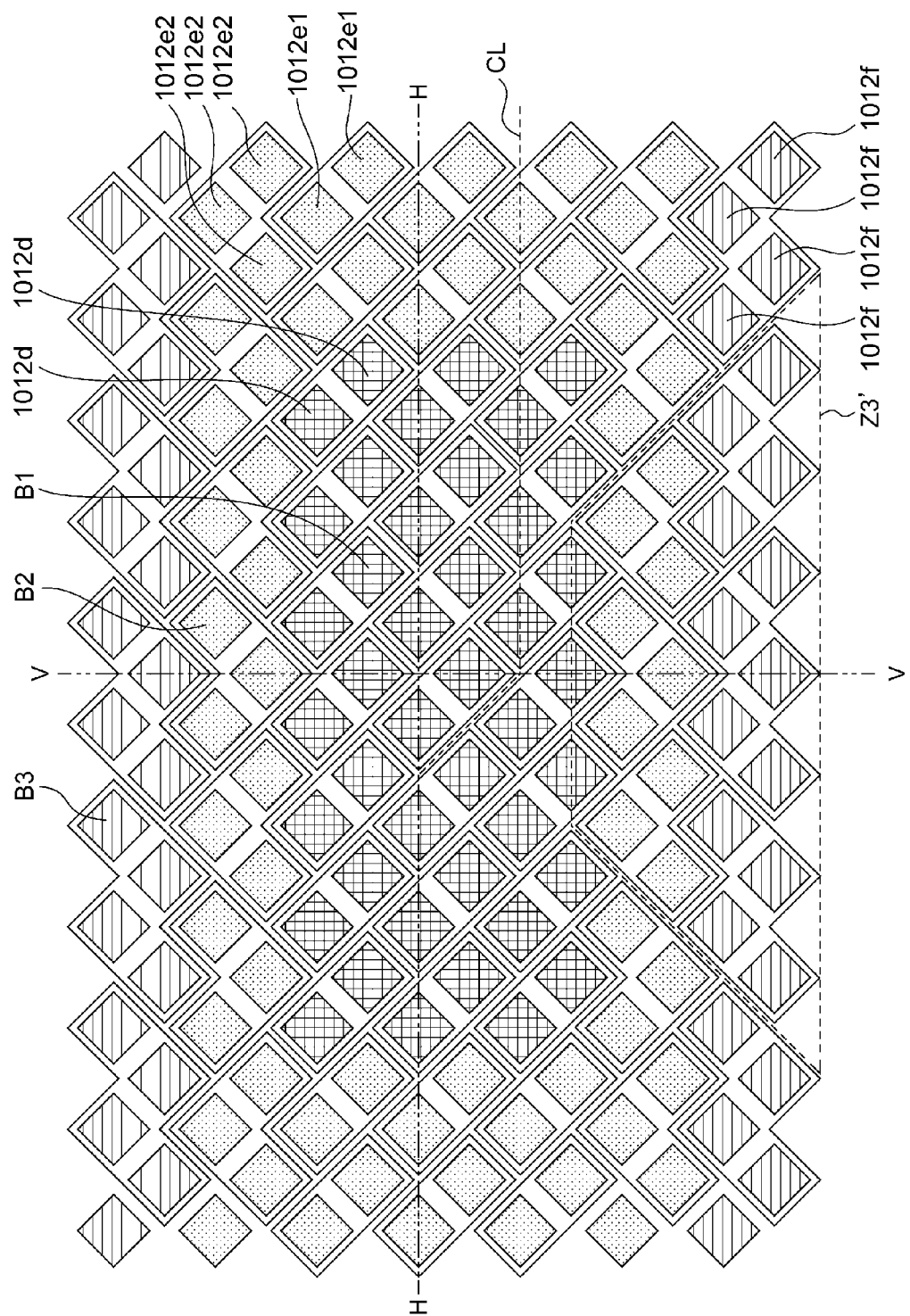
FIG. 21 schematically shows an exemplary connection of LED chips for each channel in the matrix LEDs.

A description is now given of a plurality of LED chips connected to each channel. FIG. 21 schematically shows an exemplary connection of LED chips for each channel in the matrix LEDs. The dotted line indicated by "CL" in FIG. 21 corresponds to a cutoff line of a light distribution pattern.

High-luminance LED chips 1012d arranged in a block B1 are configured such that a pair of high-luminance LED chips 1012d makes a set and therefore the lighting of the high-luminance LED chips 1012d is controlled in units of two high-luminance LED chips 1012d. In order to enable the LED chips to be combined (paired) to be suited to a 45-degree cutoff line shape, the LED chips to be paired are, for example, either a pair of a given LED chip and an LED chip adjacent obliquely in an upper-left direction of said given LED or a pair of a given LED chip and an LED chip adjacent obliquely in a lower right direction thereof. The illumination of such a pair of high-luminance LED chips 1012d forms a high-luminosity portion in a center of high beam. Also, moving the blinking of a pair of LED chips in a horizontal direction allows the masking of ADB to be controlled.

Of the medium-luminance LED chips arranged in a block B2, LED chips 1012e1 near an H line are configured such that a pair of high-luminance LED chips 1012e1 makes a set and therefore the lighting of the medium-luminance LED chips 1012e1 is controlled in units of two medium-luminance LED chips 1012e1. Of the medium-luminance LED chips, LED chips 1012e2 arranged above or below an LED chip 1012e1 are configured such that three of medium-luminance LED chips 1012e2 make a set and therefore the lighting of the medium-luminance LED chips 1012e2 is controlled in units of three medium-luminance LED chips 1012e2. The illumination of the medium-luminance LED chips 1012e1 in units of two or those LED chips 1012e2 in units of three forms a light distribution required for the effective visual field.

Low-luminance LED chips 1012f arranged in a block B3 are configured such that the lighting of the low-luminance LED chips 1012f is controlled in units of four low-luminance LED chips 1012f, except for a part of the low-luminance LED chips 1012f (namely, a road surface shielding zone Z3' of WL in AFS).

Placing the LED chips of various luminances in such positions as illustrated in FIG. 21 can achieve not only an ADB light distribution but also all light distributions by AFS.

Figure 22A:
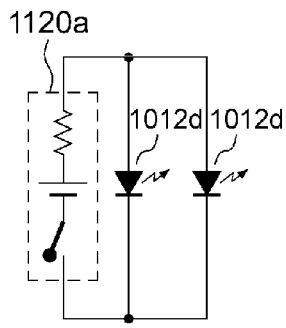
FIG. 22A to FIG. 22C are circuit diagrams each showing that a channel circuit and a plurality of LED chips are connected in parallel with each other.
Figure 22B:
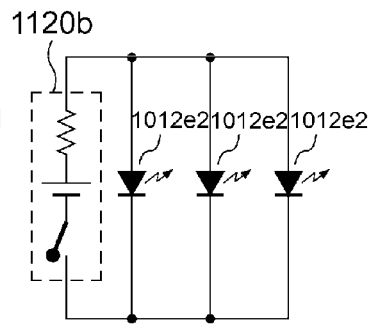
Figure 22C:
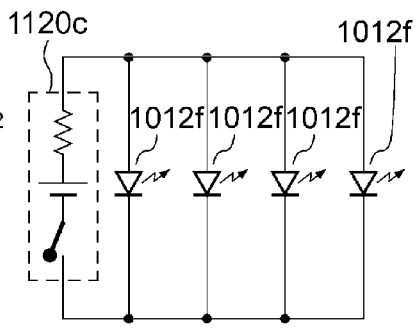
Figure 23A:
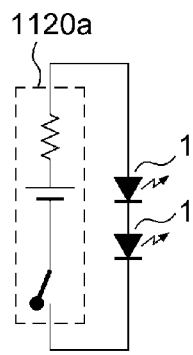
FIG. 23A to FIG. 23C are circuit diagrams each showing that a channel circuit and a plurality of LED chips are connected in series with each other.
Figure 23B:
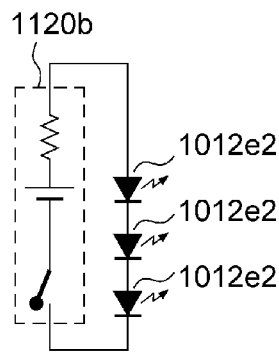
Figure 23C:
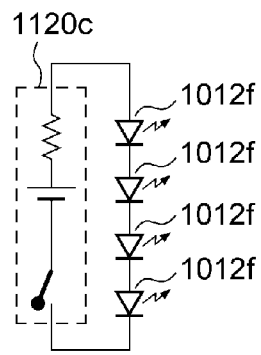

A description is now given of an exemplary circuit connection between a channel circuit and an LED chip in the matrix LEDs. FIG. 22A to FIG. 22C are circuit diagrams each showing that a channel circuit and a plurality of LED chips are connected in parallel with each other. FIG. 23A to FIG. 23C are circuit diagrams each showing that a channel circuit and a plurality of LED chips are connected in series with each other.

As illustrated in FIG. 22A to FIG. 22C and FIG. 23A to FIG. 23C, it is conceivable that a connection circuit may be a parallel circuit or a series circuit. Each of driver circuit devices 1120a, 1120b and 1120c in such connection circuits normally includes a circuit group comprised of a power supply, a switch, a resistor and so forth. A channel circuit connects the driver circuit devices 1120a, 1120b and 1120c to each LED chip in the matrix LEDs. A channel circuit group is normally a group of circuit lines.

The number of LED chips connected within a channel circuit is set such that the number of low-luminance LED chips 1012f is larger than the number of high-luminance LED chips 1012d. In the present embodiment, the low-luminance LED chips are installed in such a manner as to correspond to a peripheral portion (peripheral visual field) of the light distribution. This peripheral light distribution portion has a wide allowable range of light distribution values. The low-luminance LED chips are generally inexpensive and therefore has higher performance variations. In view of this, the circuitry for each LED chip arranged in each block of the matrix LEDs is configured such that the LED chips and the driver circuit devices are configured as shown in FIG. 22A to FIG. 22C and FIG. 23A to FIG. 23C. As a result, the number of channels is reduced and the cost of the circuits is also reduced, thereby contributing to a reduction in cost of the matrix LEDs.

As described above, the automotive headlamp apparatus 1010 according to the second embodiment is configured such that, as shown in FIG. 15 and FIG. 19, the LED chips 1012 are arranged in a matrix as a plurality of semiconductor light-emitting elements. And the automotive headlamp apparatus 1010 is comprised of the light source 1014 capable of irradiating light toward a front area of the vehicle and a control unit for controlling the turning on and off of the plurality of LED chips 1012 included in the light source 1014. The control unit is constituted by the light distribution control ECU 1102, the driver circuit device 1120, the channel circuit (group) 1122, and so forth.

The plurality of LED chips 1012 includes a plurality of high-luminance LED chips 1012d for emitting light to a first section (e.g., the central visual field) contained in an illumination region in the front area of the vehicle and a plurality of medium-luminance LED chips 1012e1 and 1012e2 and low-luminance LED chips 1012f for emitting light to a second section (e.g., effective visual field and peripheral visual field), which is different from the first section, contained in the illumination region. Here, the medium-luminance LED chips 1012e1 and 1012e2 and the low-luminance LED chips 1012f have characteristics different from the characteristic of the high-luminance LED chips 1012d.

As described above, the lighting of the high-luminance LED chips 1012d is controlled in units of two high-luminance LED chips. Thus the high-luminance LED chips 1012d controlled in units of two are divided into groups the number of which is smaller than the number of high-luminance LED chips contained in the matrix LEDs. Then, the high-luminance LED chips 1012d are driven, per group, by the driver circuit device 1120a (see FIG. 22A or FIG. 23A). Also, since the medium-luminance LED chips 1012e1 and 1012e2 are controlled in units of two or three medium-luminance LED chips, the medium-luminance LED chips 1012e1 and 1012e2 controlled in units of two or three are divided into groups the number of which is smaller than the number of medium-luminance LED chips. Then, the medium-luminance LED chips 1012e1 and 1012e2 are driven, per group, by the driver circuit device 1120b (see FIG. 22B or FIG. 23B). Also, since the low-luminance LED chips 1012f are controlled in units of four medium-luminance LED chips, the low-luminance LED chips 1012f controlled in units of four are divided into groups the number of which is smaller than the number of low-luminance LED chips. Then, the low-luminance LED chips 1012f are driven, per group, by the driver circuit device 1120c (see FIG. 22C or FIG. 23C).

As described above, in the automotive headlamp apparatus 1010, the number of groups is smaller than the number of LED chips. Thus, the structures of the driver circuit device 1120 and the channel circuit (group) 1122 can be simplified. Also, the LED chips, having a suitable characteristic, corresponding to each section (the central visual field, the effective visual field and peripheral visual field) contained in the illumination region are selected. Thus, the cost of the light source can be reduced.

In the present embodiment, the luminance of the high-luminance LED chips is higher than that of the medium-luminance LED chips and/or the low-luminance LED chips, when the same current is supplied thereto. Also, the maximum forward current rating of the high-luminance LED chips is larger than that of the medium-luminance LED chips and/or the low-luminance LED chips. As a result, the brightness can be easily varied by each section contained in the illumination region.

Also, the high-luminance LED chips are arranged such that the illumination region thereof contains the central visual field, which is a central part of the light distribution pattern. Also, the control unit controls the turning on and off of the high-luminance LED chips, the medium-luminance LED chips and the low-luminance LED chips in a manner such that the luminance of the high-luminance LED chips is higher than that of the medium-luminance LED chips and the low-luminance LED chips. Thereby, a central part of the illumination region can be made much brighter.

Each LED chip, whose light emitting surface is of a rectangular shape, is arranged such that the light emitting surface thereof is tilted (by 45 degrees relative, in the present embodiment) relative to the vehicle width direction. This facilitates the formation of an oblique cutoff line. Also, this can shade off the cutoff line in the horizontal direction.

In other words, the automotive headlamp apparatus according to the second embodiment is configured as follows. As shown in FIG. 18, in the automotive headlamp apparatus 1010, the matrix LEDs include a plurality of high-luminance LED chips 1012d arranged in the block B1, a plurality of medium-luminance LED chips 1012e arranged in the block B2, and a plurality of low-luminance LED chips 1012f arranged in the block B3.

As described earlier, the high-luminance LED chips 1012d are driven, per group, by the driver circuit device 1120a. Similarly, the medium-luminance LED chips 1012e are driven, per group, by the driver circuit device 1120b. The low-luminance LED chips 1012f are driven, per group, by the driver circuit device 1120c.

In this manner, in the automotive headlamp apparatus 1010, the number of groups driven is smaller than that of LED chips. Thus, the structure of the driver circuit devices 1120 and the channel circuit (group) 1122 can be simplified. Also, the LED chips, having a suitable characteristic, corresponding to each block contained in the matrix LEDs are selected, so that the cost of the light source can be reduced.

(Various Light Distribution Patterns)

Exemplary light distribution patterns of AFS and ADB utilizing the matrix LEDs shown in FIG. 18 are now described. In each of the Figures showing the following light distribution patterns, each scale (square) in those Figures corresponds to 0.5 degrees. The division of the matrix LEDs into blocks and the arrangement of the blocks after the division are shown in the same directions to facilitate the correspondence between them and the light distribution pattern. However, in the actual setting, they are vertically and horizontally inverted by a lens system and then image-formed. As a result, the actual division thereof and arrangement thereof are a vertically-and-horizontally inverted version of each Figure shown.

Figure 24A:
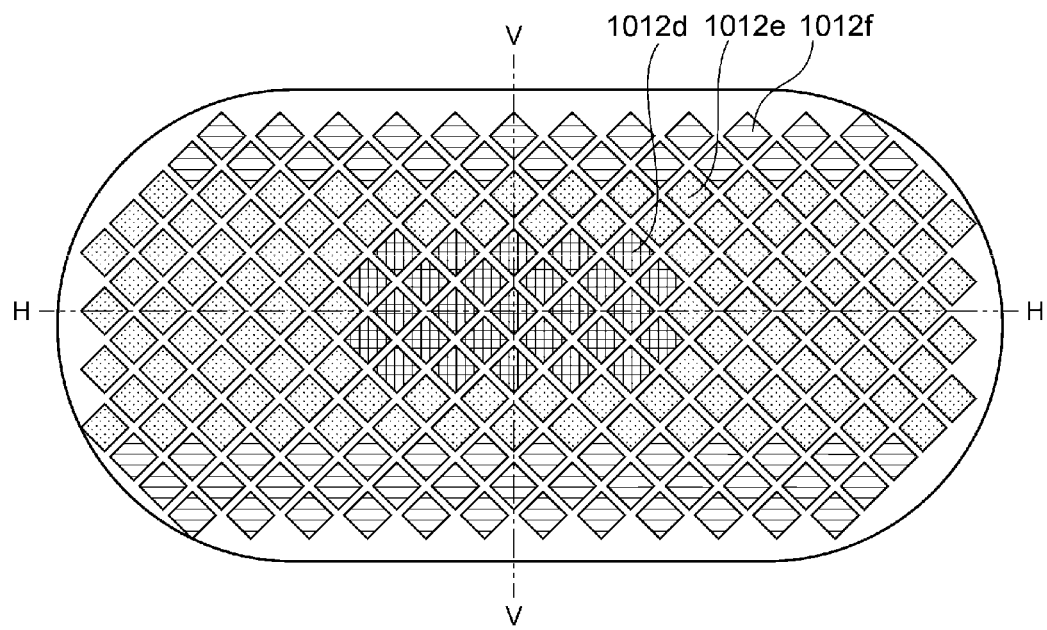
FIG. 24A is a diagram indicating that the matrix LEDs are lit when forming a high beam.
Figure 24B:
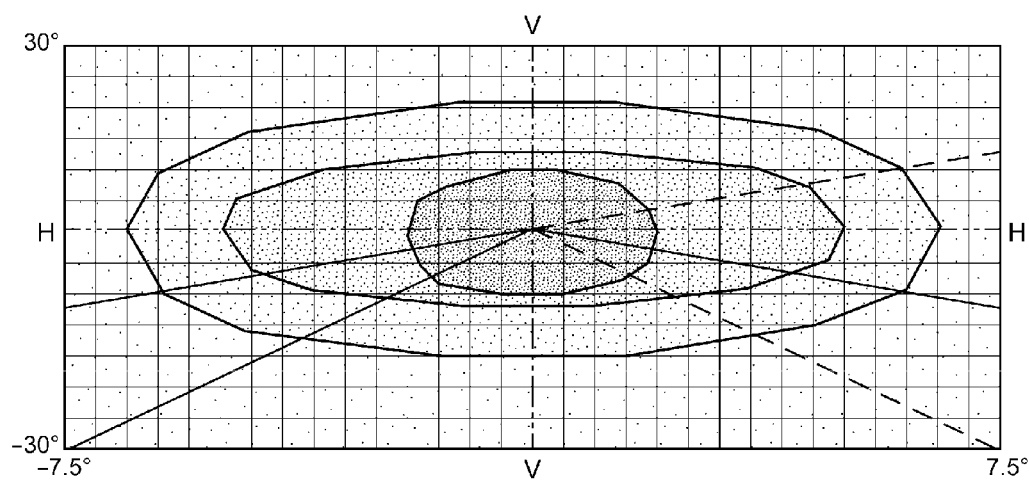
FIG. 24B shows a light distribution pattern formed by the matrix LEDs that are in the lighting status shown in FIG. 24A.

FIG. 24A is a diagram indicating that the matrix LEDs are lit when forming a high beam. FIG. 24B shows a light distribution pattern formed by the matrix LEDs that are in the lighting status shown in FIG. 24A. In this case, the high-luminance LED chips 1012d, the medium-luminance LED chips 1012e and the low-luminance LED chips 1012f are all turned on. In order to make the road alignment and visual objects in the distance more visible, the high-luminance LED chips 1012d are located near the HV region and are turned on under maximum power.

Figure 25A:
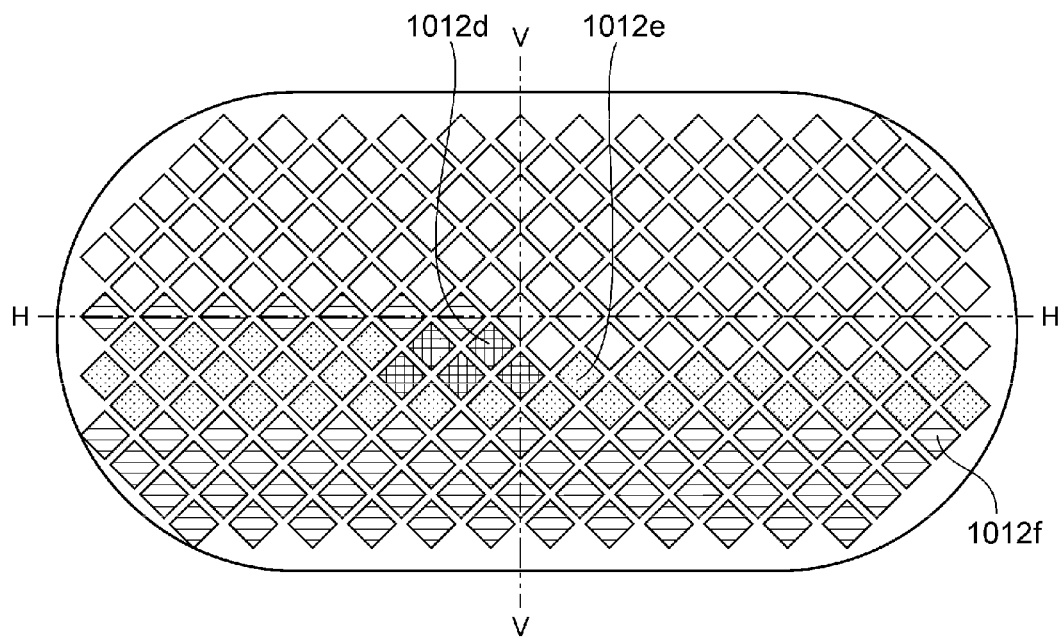
FIG. 25A is a diagram indicating that the matrix LEDs are lit when forming a basic beam (BL)
Figure 25B:
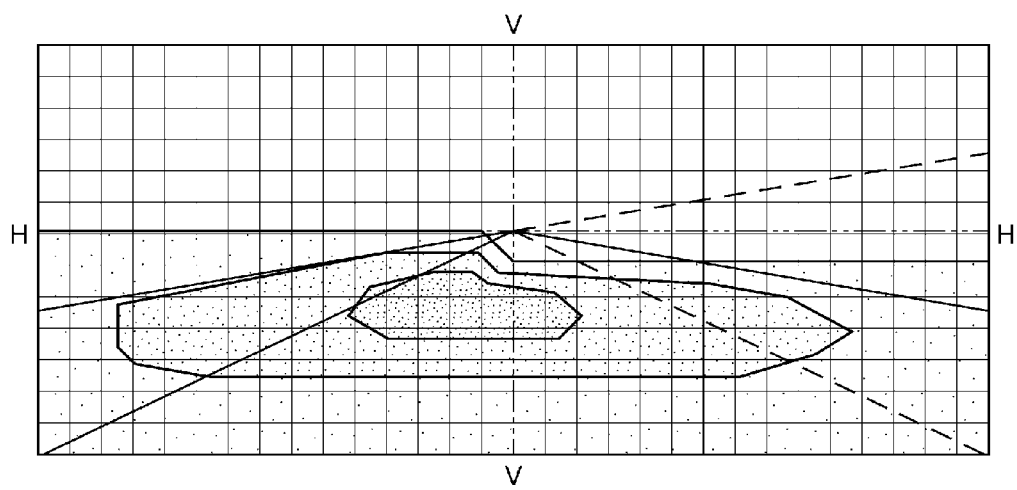
FIG. 25B shows a light distribution pattern formed by the matrix LEDs that are in the lighting status shown in FIG. 25A.

FIG. 25A is a diagram indicating that the matrix LEDs are lit when forming a basic beam (BL). FIG. 25B shows a light distribution pattern formed by the matrix LEDs that are in the lighting status shown in FIG. 25A. The light distribution pattern shown in FIG. 25B is a basic beam in the AFS and has almost the same light distribution performance as that of a presently used low beam. Also, the LED chips corresponding to those above the H line are turned off for the purpose of forming a clear light-dark boundary line. Also, in order to secure the visibility of the rod surface in the distance, the high-luminance LED chips 1012d near the HV region and below the H line are turned on at a high output power.

Figure 26A:
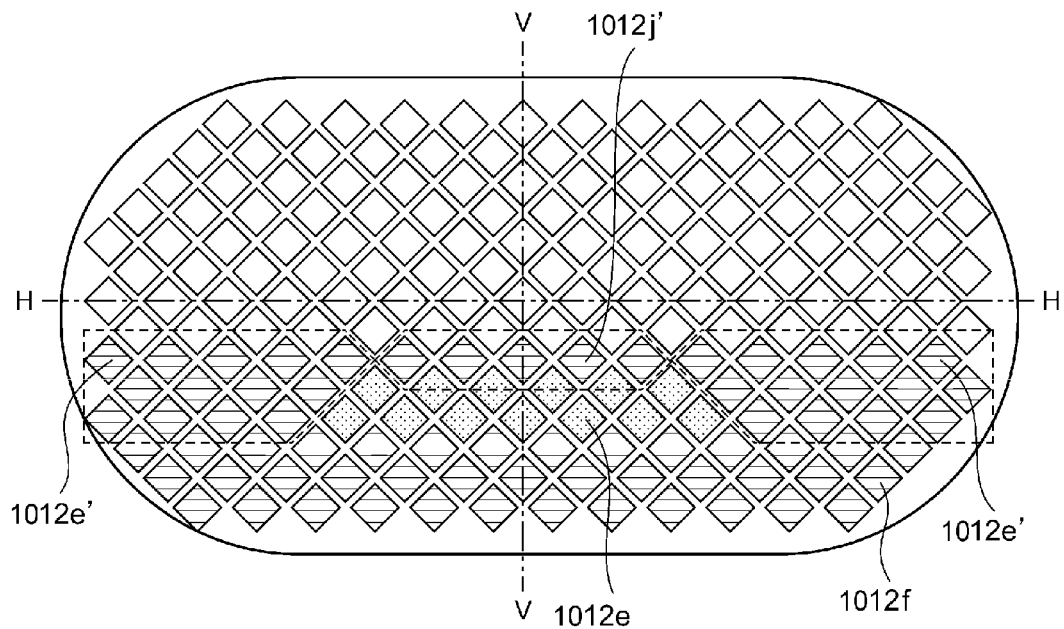
FIG. 26A is a diagram indicating that the matrix LEDs are lit when forming a town beam (TL)
Figure 26B:
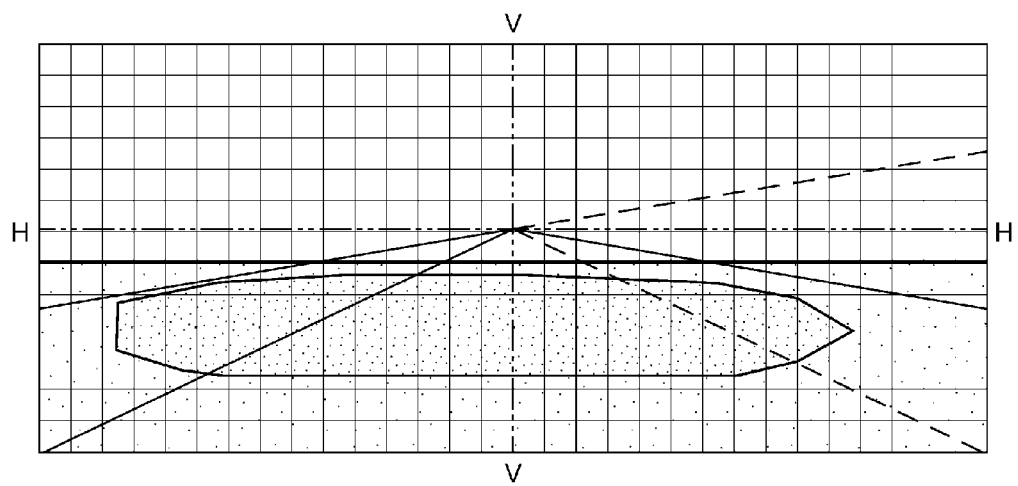
FIG. 26B shows a light distribution pattern formed by the matrix LEDs that are in the lighting status shown in FIG. 26A.

FIG. 26A is a diagram indicating that the matrix LEDs are lit when forming a town beam (TL). FIG. 26B shows a light distribution pattern formed by the matrix LEDs that are in the lighting status shown in FIG. 26A. The light distribution pattern shown in FIG. 26B is a town beam in the AFS and used in a city street where there are bright road illuminations. To prevent the glare, the luminous intensity of the basic beam above the H line is suppressed. Also, in order to lower the luminous intensity, LED chips 1012d' and LED chips 1012e', located below the H line, which have functioned as the high-luminance LED chips and the medium-luminance LED chips, are dimmed and turned on.

Figure 27A:
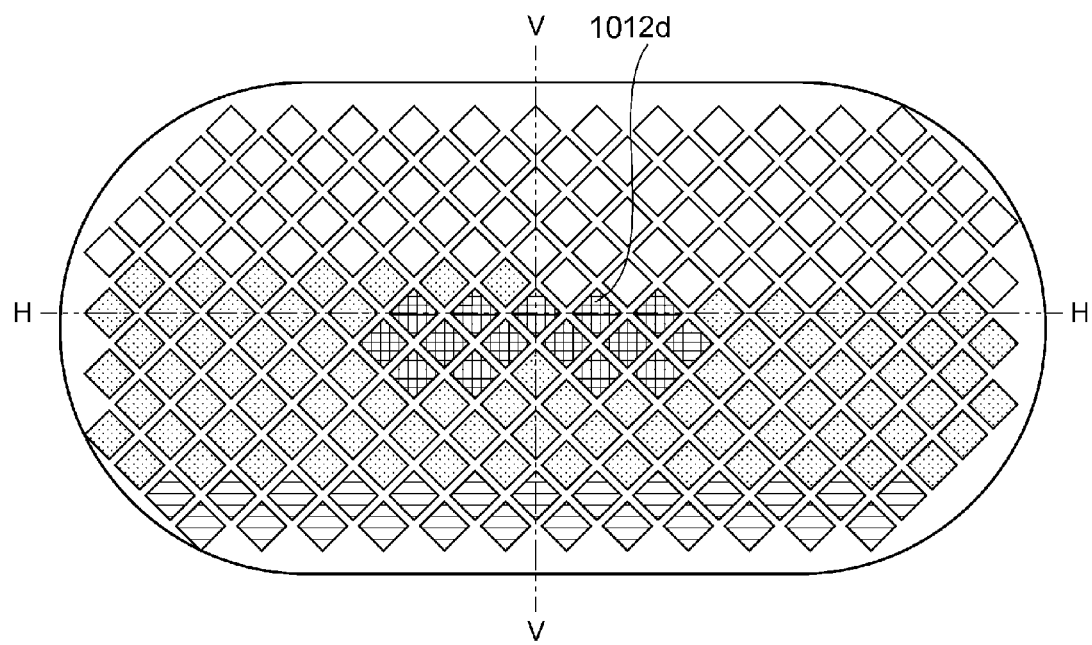
FIG. 27A is a diagram indicating that the matrix LEDs are lit when forming a motorway beam (ML)
Figure 27B:
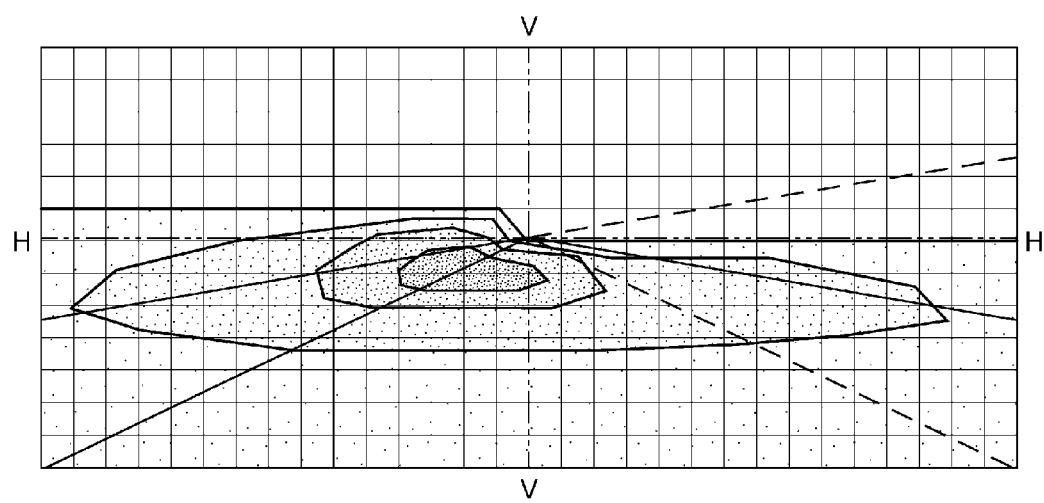
FIG. 27B shows a light distribution pattern formed by the matrix LEDs that are in the lighting status shown in FIG. 27A.

FIG. 27A is a diagram indicating that the matrix LEDs are lit when forming a motorway beam (ML). FIG. 27B shows a light distribution pattern formed by the matrix LEDs that are in the lighting status shown in FIG. 27A. The light distribution pattern shown in FIG. 27B is a motorway beam in the AFS and used when the vehicle is running on an expressway with the anti-glare fences and the like. In order to secure the visibility in the distance, the high-luminance LED chips 1012d near the HV region are turned on under maximum power, similarly to the case of the high beam. Also, in order to improve the visibility in the distance over that in the basic beam, the clear light-dark boundary line on a forerunning vehicle side and an oncoming vehicle side is raised by about 0.5 degrees. Also, in the matrix LEDs, LED chips placed one row above those LED chips, which are turned on in the case of the basic beam, are additionally turned on, as compared to the case of the basic beam.

Figure 28A:
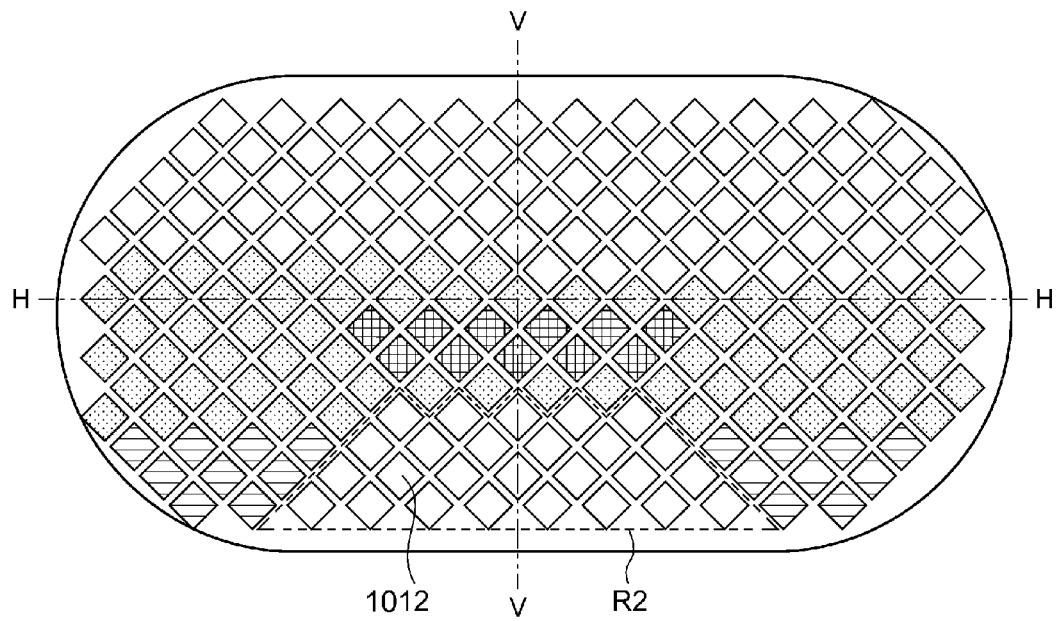
FIG. 28A is a diagram indicating that the matrix LEDs are lit when forming a wet beam (WL)
Figure 28B:
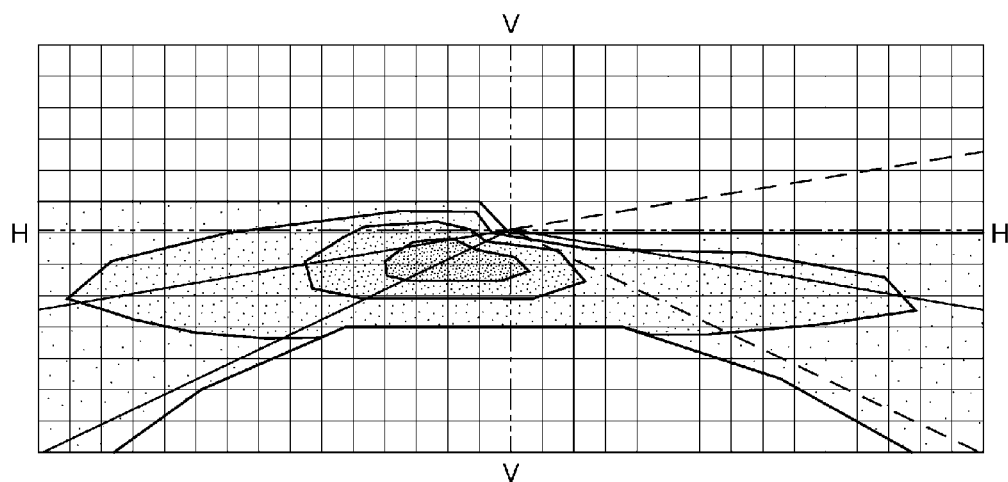
FIG. 28B shows a light distribution pattern formed by the matrix LEDs that are in the lighting status shown in FIG. 28A.

FIG. 28A is a diagram indicating that the matrix LEDs are lit when forming a wet beam (WL). FIG. 28B shows a light distribution pattern formed by the matrix LEDs that are in the lighting status shown in FIG. 28A. The light distribution pattern shown in FIG. 28B is a wet beam in the AFS and is used when the vehicle is running in the rain. The wet-beam distribution pattern shown in FIG. 28B has almost the same distribution performance level as that of the motorway beam shown in FIG. 27B but makes a road surface part in front of the vehicle dark. Thereby, a flux of light that mirror-reflects on the road surface and then becomes the glare as experienced by the oncoming vehicle is suppressed from occurring. Thus, LED chips 1012 arranged in a region R2 located in a central part of a lower part of the matrix LEDs are dimmed or turned off.

Figure 29A:
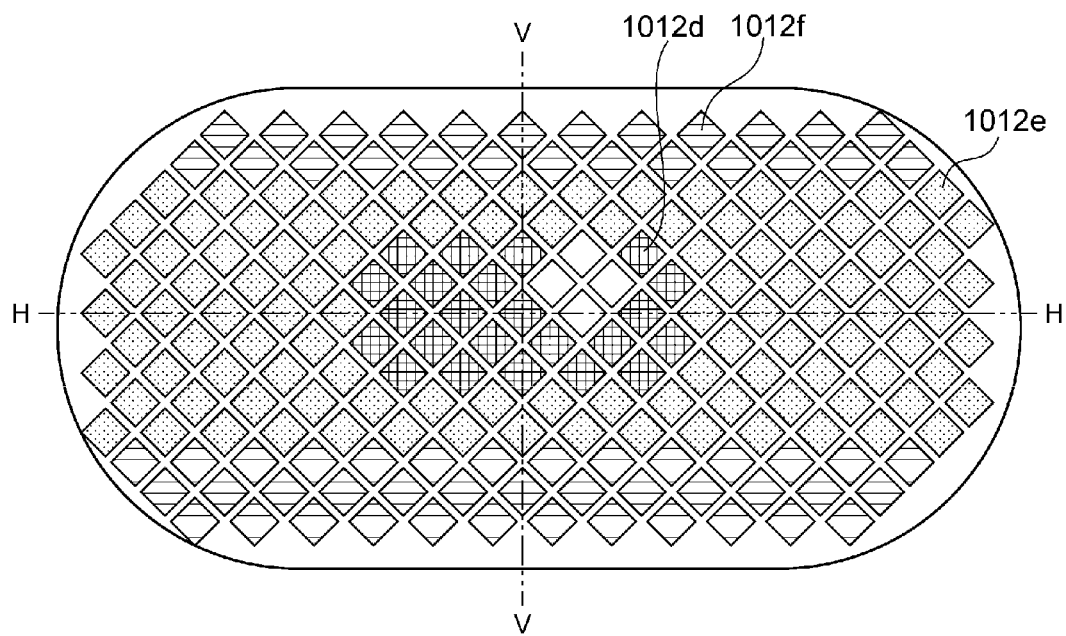
FIG. 29A is a diagram indicating that the matrix LEDs are lit when forming an ADB.
Figure 29B:
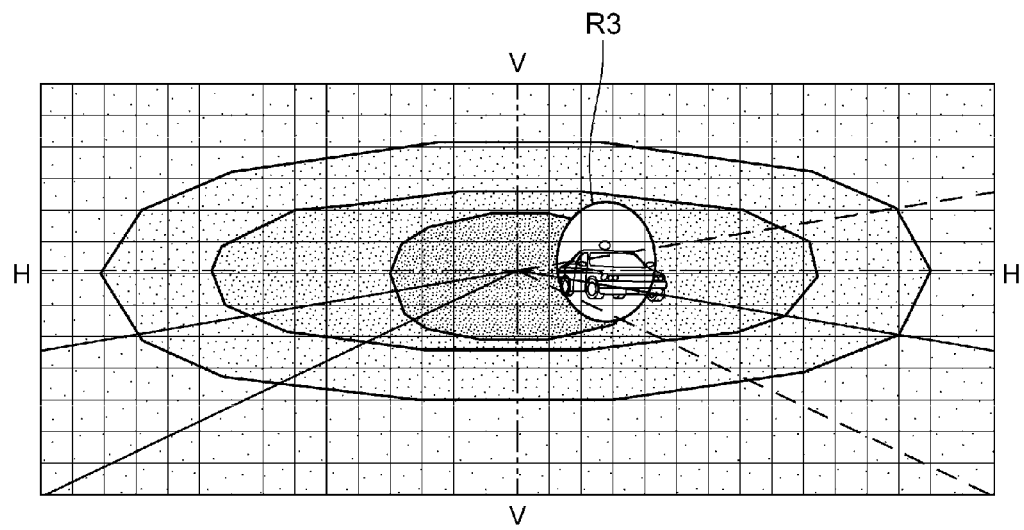
FIG. 29B shows a light distribution pattern formed by the matrix LEDs that are in the lighting status shown in FIG. 29A.

FIG. 29A is a diagram indicating that the matrix LEDs are lit when forming an ADB. FIG. 29B shows a light distribution pattern formed by the matrix LEDs that are in the lighting status shown in FIG. 29A. A basic light distribution of the ADB, which has the same performance as that of the high beam, is a beam used to mask the position of an oncoming vehicle and/or a forerunning vehicle for the purpose of avoiding glare when an oncoming vehicle and/or a forerunning vehicle is/are present. As illustrated in FIG. 29B, the oncoming vehicle or the forerunning vehicle moves in the horizontal direction near the H line. A glare zone in the vertical direction near the H line lies in a range of 0.5 degrees to 2.0 degrees below the H line. Thus, turning off a part of the high-luminance LED chips 1012d forms a non-illuminated region R3, as shown in FIG. 29B, according to the position of the vehicle, thereby almost preventing the glare as experienced by oncoming vehicle and the forerunning vehicle.

(Combined Light Distribution Patterns with a Multifunctional Lamp)

A description is now given of light distribution patterns when the DRL and the fog lamp are shared in the automotive headlamp according to the second.

Figure 30A:
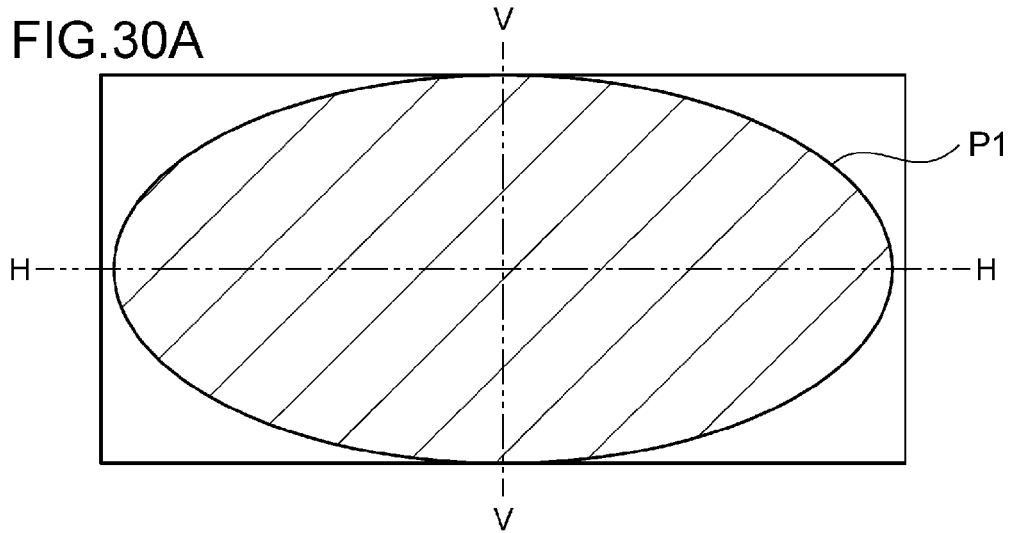
FIG. 30A shows a DRL light distribution pattern.
Figure 30B:
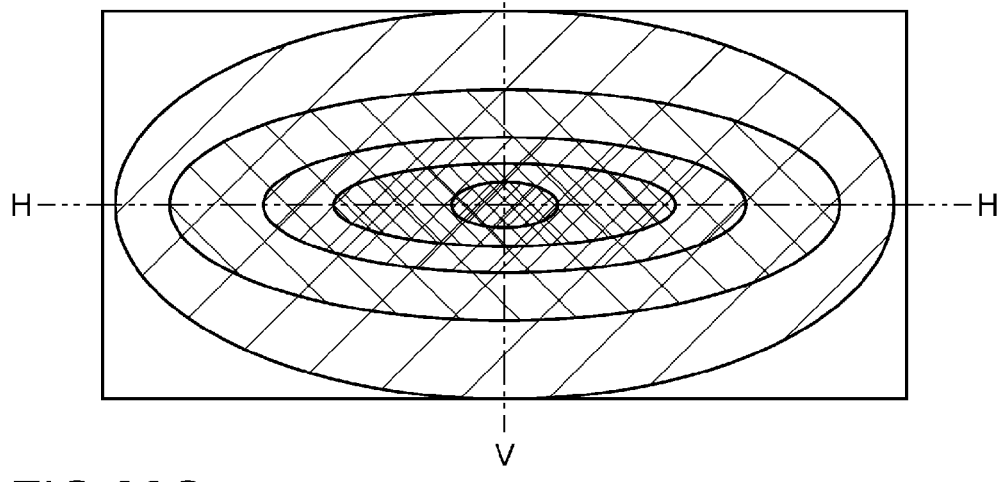
FIG. 30B is a normal high-beam distribution pattern.
Figure 30C:
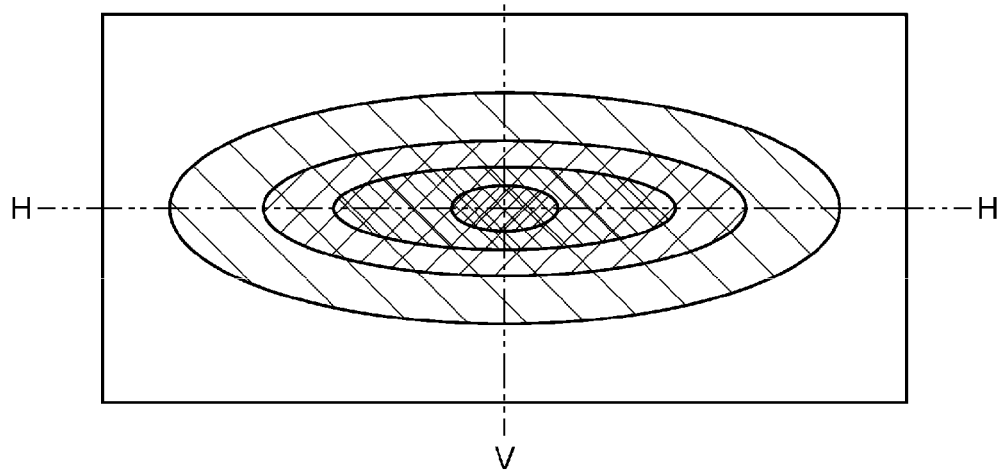
FIG. 30C shows a high-beam distribution pattern required when the DRL is shared.

FIG. 30A shows a DRL light distribution pattern. FIG. 30B is a normal high-beam distribution pattern. FIG. 30C shows a high-beam distribution pattern required when the DRL is shared.

The DRL is a lamp used to facilitate or increase the conspicuity of the vehicle when seen from other vehicles and pedestrians during running in the daylight. In its light distribution standard ECE, the luminous intensity is regulated at 400 cd or above in the HV region and at 1200 cd or below outside the HV region. As illustrated in FIG. 30A, a DRL light distribution pattern P1 is a wide light distribution having a low luminous intensity. This meets the requirements for the light distribution of high beam and low beam in the peripheral visual field portion. Thus, if the DRL light distribution is set to a wide light distribution as shown in FIG. 30A and if the DRL is used as a lamp that assists (or is shared with) the night-time high beam, the light distribution of high beam can function as a light distribution, as shown in FIG. 30C, where the luminous intensity of the peripheral visual field portions (the zones Z2 and Z3 shown in FIG. 18) is reduced. This means that the number of LED chips in the peripheral visual field of block B3 of the matrix LEDs can be reduced. It is to be noted here that the DRL light distribution shown in FIG. 30A can be shared with the night-time low beam.

Figure 31A:
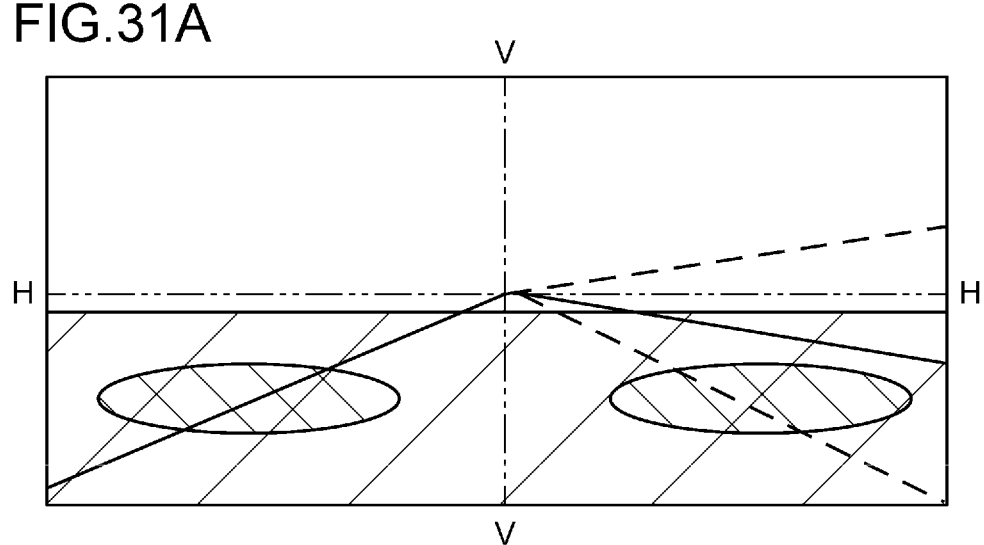
FIG. 31A shows a light distribution pattern of a fog lamp.
Figure 31B:
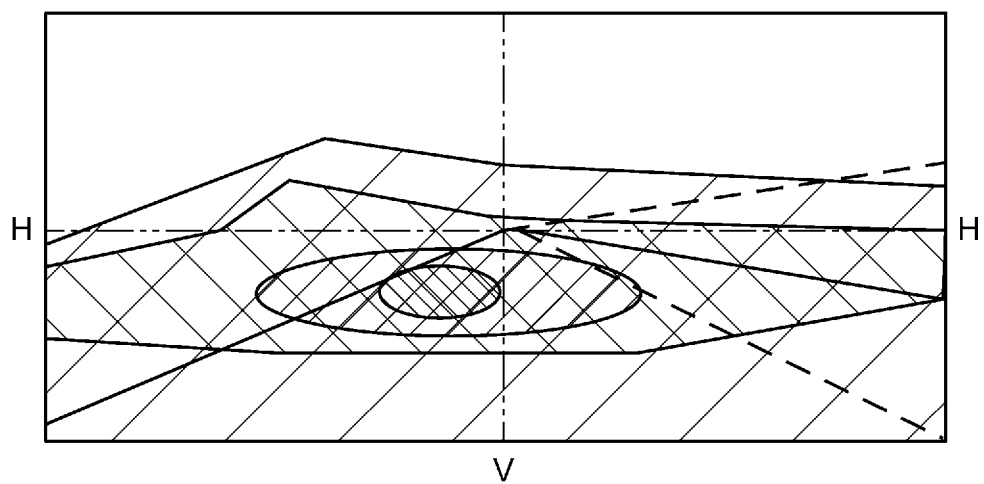
FIG. 31B is a normal low-beam distribution pattern.
Figure 31C:
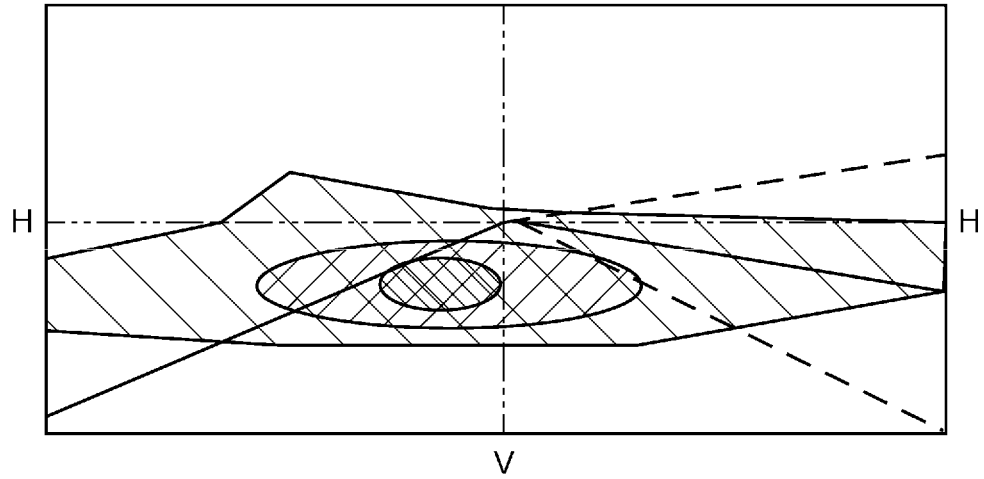
FIG. 31C shows a low-beam distribution pattern required when the fog lamp is shared.

FIG. 31A shows a light distribution pattern of a fog lamp. FIG. 31B is a normal low-beam distribution pattern. FIG. 31C shows a low-beam light distribution pattern required when the fog lamp is shared.

The fog lamp forms a beam that illuminates the road surface below the H line and, as illustrated in FIG. 31A, the extent of spread and diffusion of the fog lamp beam is wider than that of the low beam. Thus, when shared with the fog lamp, the light distribution of the low beam can be a light distribution, as shown in FIG. 31C, where the luminous intensity of the peripheral visual field portion (the zones Z3 shown in FIG. 18) is reduced. That is, the number of LED chips corresponding to the peripheral visual field portion (the zones Z3) of the matrix LEDs can be reduced.

(Control Flowchart)

Figure 32:
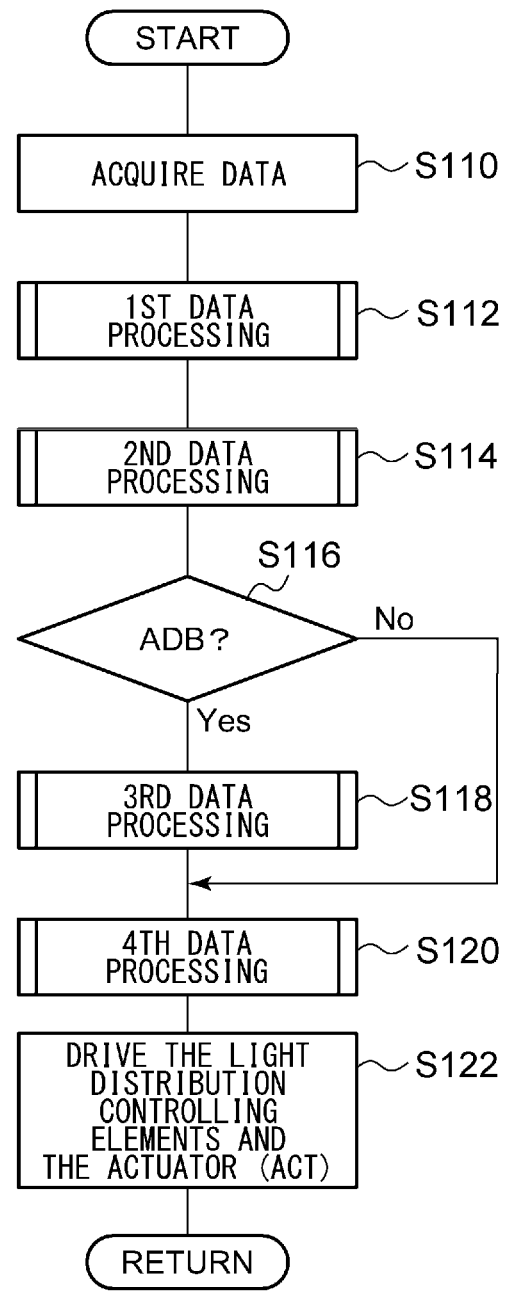
FIG. 32 is a flowchart showing an exemplary control performed by a headlamp system according to the second embodiment.

FIG. 32 is a flowchart showing an exemplary control performed by a headlamp system according to the second embodiment.

When a selection is made by the headlamp switch or when a predetermined condition (night ride or traveling in a tunnel) is recognized based on the information sent from various sensors, the processing shown in FIG. 32 is repeatedly carried out at predetermined intervals.

First, the light distribution control ECU 1102 and/or the front monitoring ECU 1104 acquires/acquire necessary data from the camera, the various sensors, the switches and the like (S110). The data may be data regarding an image of a front area of the vehicle, the vehicle speed, the inter-vehicular distance, the shape of a road, the rudder angle of a steering wheel, and a light distribution pattern selected by the headlamp switch, for instance.

The front monitoring ECU 1104 carries out a first data processing, based on the acquired data (S112). The first data processing calculates or figures out the data regarding the attributes of bright objects in a front area of the vehicle (signal lamps, illuminating lamps, delineators, etc.), the attributes of vehicles (oncoming vehicle, forerunning vehicle), the inter-vehicular distance, the brightness of bright objects, the shape of a road (lane width, straight road, winding road), and so forth.

Then, the light distribution control ECU 1102 carries out a second data processing, based on the data calculated in the first data processing (S114), and selects an appropriate light distribution pattern. A control light distribution pattern to be selected is a low beam distribution pattern, a high beam distribution pattern or the ADB, for instance. Also, the turning on/off of each LED chip and the control amount of the electric power to be applied thereto are determined according to the selected light distribution pattern.

If the ADB is selected (Yes of S116), a third data processing will be carried out by the light distribution control ECU 1102 (S118). For example, an illumination area, a shaded area, an illumination light quantity and an illumination direction by an ADB control are determined in the third data processing. Also, the AFS control can be performed, based on the data calculated in the first data processing in addition to these items of information. The AFS control is a control whereby the light distribution is controlled according to a winding road, a traveling area (city streets, suburbs, expressway) and the weather. If the ADB is not selected (No of S116), Step S118 will be skipped.

Then, in a fourth data processing, the light distribution control ECU 1102 converts the data into another data for use by a driver (S120) and drives the light distribution control elements and the actuator (ACT) (S122) and thereby controls the ADB and the swiveling.

[Third Embodiment]

Figure 33:
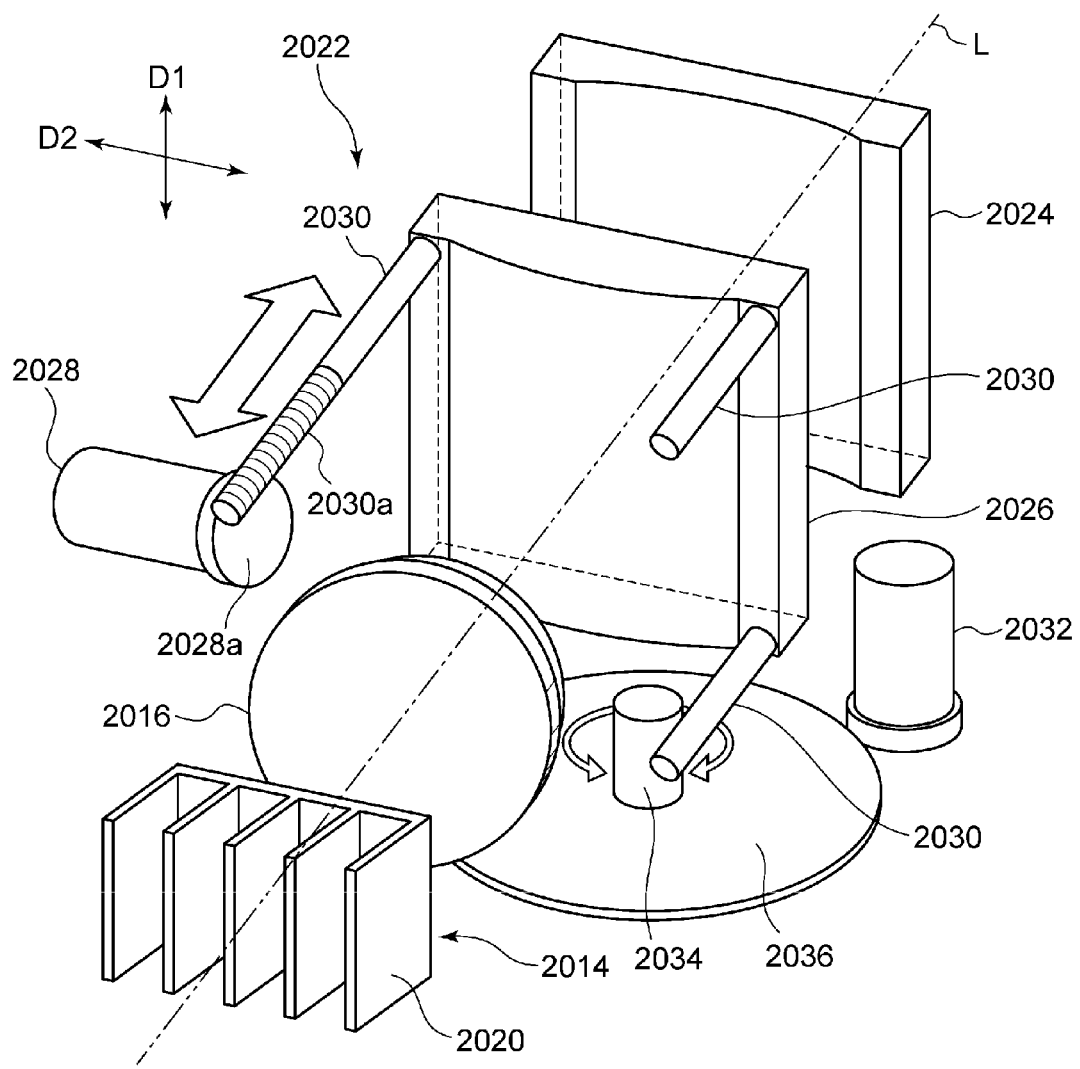
FIG. 33 is a perspective view schematically showing a structure of an automotive headlamp apparatus according to a third embodiment.
Figure 34:
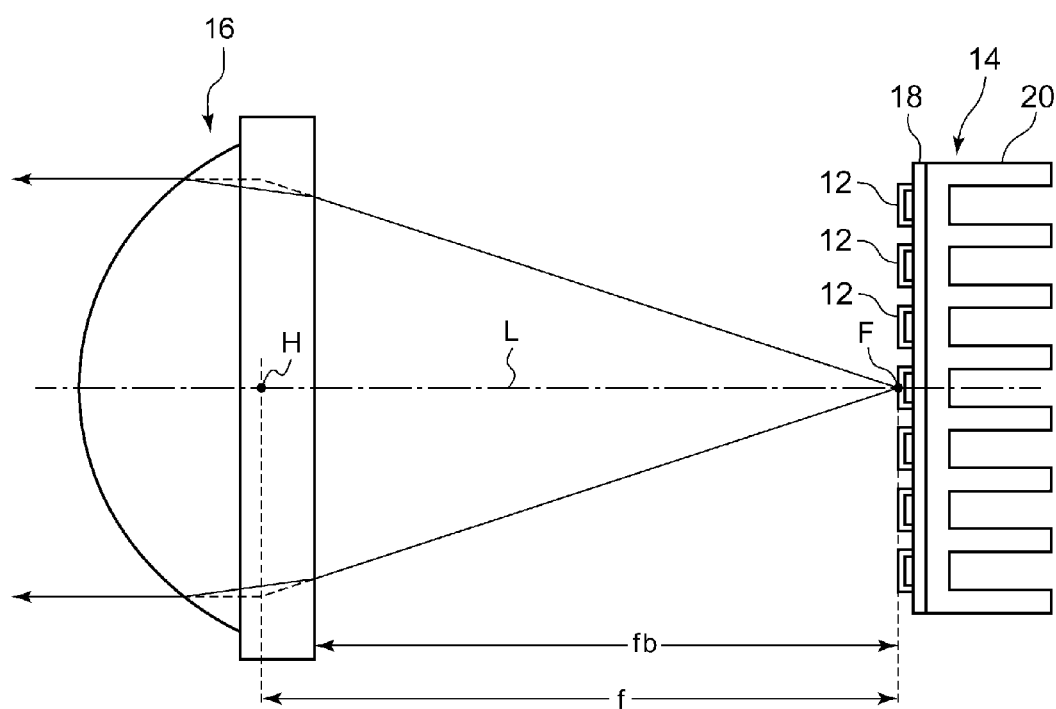
FIG. 34 is a side view showing essential parts of an automotive headlamp apparatus where a plurality of semiconductor light-emitting elements are arranged in a matrix as a light source.

Recent years have seen continuing development of apparatuses using a plurality of semiconductor light-emitting elements, such as LEDs, as a light source for a headlamp unit (headlight or headlamp) of a vehicle and the like. FIG. 33 is a perspective view schematically showing a structure of an automotive headlamp apparatus according to a third embodiment. FIG. 34 is a side view showing essential parts of the automotive headlamp apparatus where a plurality of semiconductor light-emitting elements are arranged in a matrix as a light source.

An automotive headlamp apparatus 2010 is comprised of a light source 2014 in which LED chips 2012, serving as a plurality of semiconductor light-emitting elements, are arranged at intervals from each other, a projection lens 2016 that projects light, emitted from the light source 2014, toward a front area of the vehicle as a light source image, and a magnification varying mechanism 2022, provided on the projection lens at a front side of the vehicle, which varies the magnifying power of the light source image.

The light source 2014 has an LED circuit board 2018 and a heatsink 2020. A plurality of LED chips 2012 are arranged near a focal point F of the projection lens 2016. In FIG. 34, a plurality of LED chips 2012 are arranged on a plane perpendicular to a light axis L, and one of the LED chips 2012 contains the focal point F of the projection lens 2016. In FIG. 34, "H" denotes a principal point of the projection lens, "f" denotes a focal length, and "fb" denotes a back focal length.

In general, a light distribution in a projection-type optical system is determined by the focal length of the projection lens and the size and the magnification of the light source image. If, therefore, the basic light distribution is to be enlarged without having to change the optical-system parameters such as the focal length of the lens and size of the light source, a method will be employed in which the magnification only is changed. More specifically, the position of the light source is changed in the forward and backward directions. However, when the magnification is changed by moving the light source, an LED-chip image of the light source becomes visually conspicuous and, for this reason, a different method is required.

In the light of this, the automotive headlamp apparatus 2010 according to the present embodiment is provided with the magnification varying mechanism 2022, for the purpose of varying the magnifying power (magnification) of the light source image while the distance between the light source 2014 and the projection lens 2016 is kept constant.

The magnification varying mechanism 2022 is comprised of a concave lens 2024 and a convex lens 2026, constituting an anamorphic lens system, which are arranged in front of the projection lens 2016, and an actuator 2028 for moving the convex lens 2026 in a direction parallel to the light axis L. Of the concave lens 2024 and the convex lens 2026, the convex lens 2026 is located on a projection lens 2016 side. The convex lens 2026 is of a shape such that thickness thereof does not change in a vertical direction D1 and the thickness thereof changes in a horizontal direction (vehicle width direction) D2. Also, the concave lens 2024 is of a shape such that thickness thereof does not change in the vertical direction D1 and the thickness thereof changes in the horizontal direction D2. That is, the concave lens 2024 and the convex lens 2026 each has a lens surface identical or approximate to a part of a cylindrical surface.

Guide pins 2030 are provided at the four corners of the convex lens 2026, and a screw 2030a is formed in one of the guide pins 2030. The actuator 2028 has a gear 2028a that is engaged with the screw 2030a. As the actuator 2028 is operated, the convex lens 2026 is moved in a light axis direction along the guide pins 2030. Thereby, the space between the convex lens 2026 and the concave lens 2024 is adjusted.

An actuator 2032 that horizontally swivels a not-shown lamp housing is placed on bottom of the automotive headlamp apparatus 2010. Here, the lamp housing houses components such as the light source 2014, the projection lens 2016, the convex lens 2026, the concave lens 2024 and the actuator 2028. The actuator 2032 rotates and drives a stage 2036 to which a shaft 2034 supporting the entire lamp housing is fixed. Thereby, the entire beams irradiated by the automotive headlamp apparatus 2010 can be swiveled.

Figure 35A:
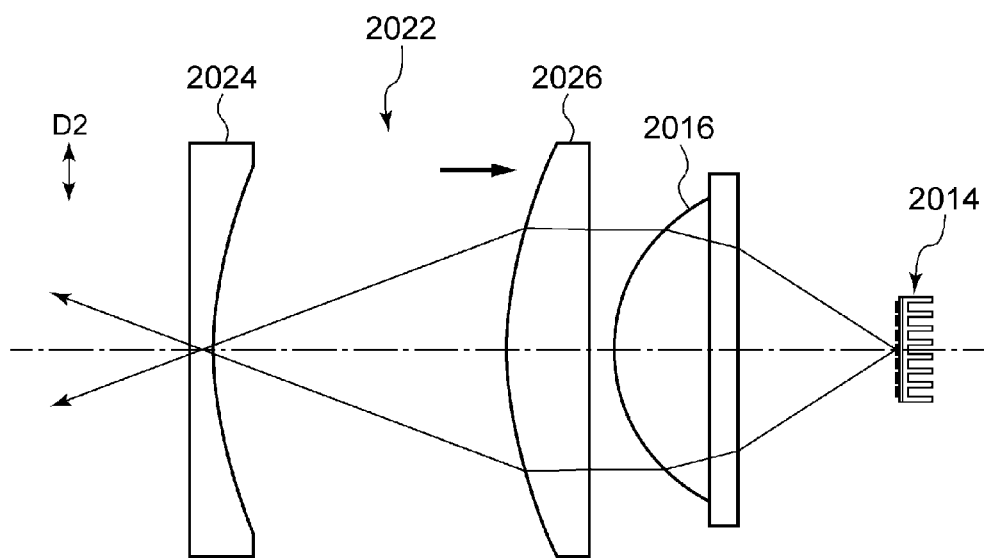
FIG. 35A schematically shows light paths in a case when a diffusion light distribution pattern is formed in an optical system according to a third embodiment.
Figure 35B:
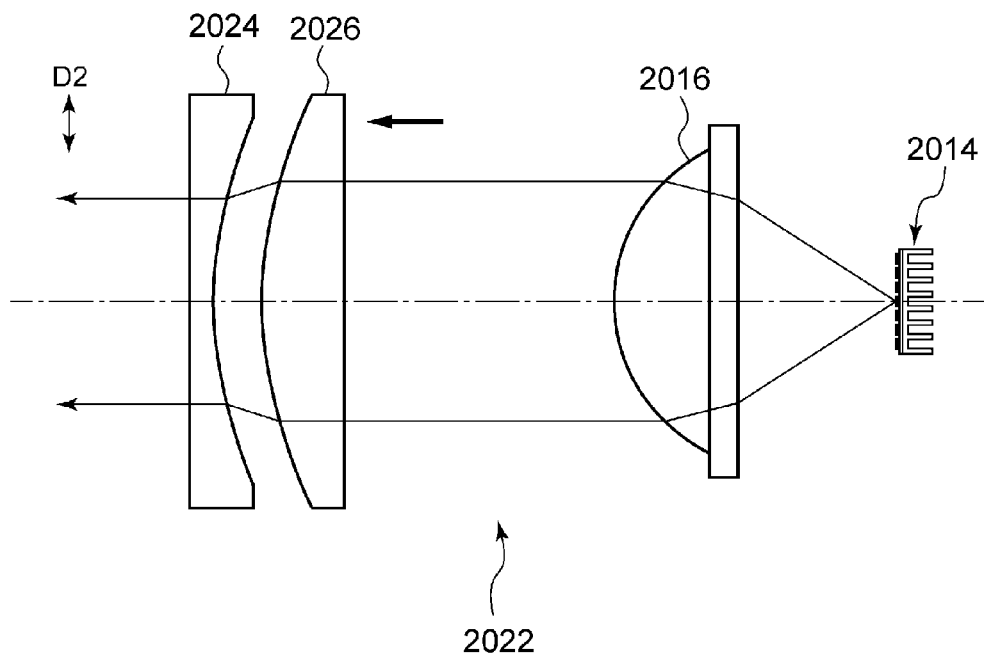
FIG. 35B schematically shows light paths in a case when a condensing light distribution pattern is formed in an optical system according to a third embodiment.

FIG. 35A schematically shows light paths in a case when a diffusion light distribution pattern is formed in the optical system according to the third embodiment. FIG. 35B schematically shows light paths in a case when a condensing light distribution pattern is formed in the optical system according to the third embodiment.

It is desired that the automotive headlamp apparatus is configured as follows. That is, when the vehicle speed is low, a diffusion light distribution pattern is formed in order to illuminate a wide range of area; when the vehicle speed is high, a condensing light distribution pattern is formed in order to illuminate a distant area. In a normal automotive headlamp apparatus, it is desired that the light is not diffused in the vertical direction and it is condensed/diffused in the horizontal (side to side) direction only.

Thus, the automotive headlamp apparatus 2010 according to the present embodiment forms the condensing and diffusion light distribution patterns by varying the space between the concave lens 2024 and the convex lens 2026 by the magnification varying mechanism 2022. When the radius of curvature R of the concave lens 2024 is identical to that of the convex lens 2026, the light rays emitting from the concave lens 2024 become parallel rays with the concave lens 2024 and convex lens 2026 placed in contact with each other. Suppose, on the other hand, that the radius of curvature R of the concave lens 2024 is not identical to that of the convex lens 2026. Then, a condensing state is created if the light-condensing point of rays emitting from the convex lens 2026 is matched with the focal position of the concave lens 2024; a diffusion state is created if the space between the concave lens 2024 and the convex lens 2026 is broadened from the above position.

When, for example, as shown in FIG. 35A, the convex lens 2026 is spaced apart from the concave lens 2024 by the actuator 2028, the beams emitting from the projection lens 2016 is such that the magnification in the vertical direction is unchanged and the beams are enlarged in the horizontal direction (vehicle width direction) D2 only. When, on the other hand, as shown FIG. 35B, the convex lens 2026 is moved closer to the concave lens 2024 by the actuator 2028, the beams emitting from the projection lens 2016 is such that the magnification in the vertical direction is unchanged and the beams are condensed in the horizontal direction (vehicle width direction) D2 only. Note that the magnification varying mechanism 2022 may be configured such that the magnification of the light source image in the vertical direction is larger than the actual size.

Figure 36A:
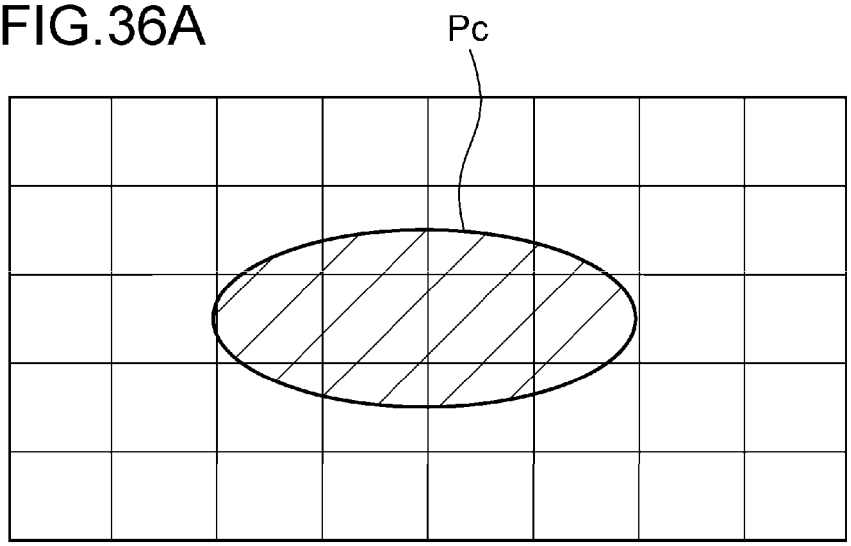
FIG. 36A to FIG. 36C show light distribution patterns formable by an automotive headlamp apparatus according to a third embodiment.
Figure 36B:
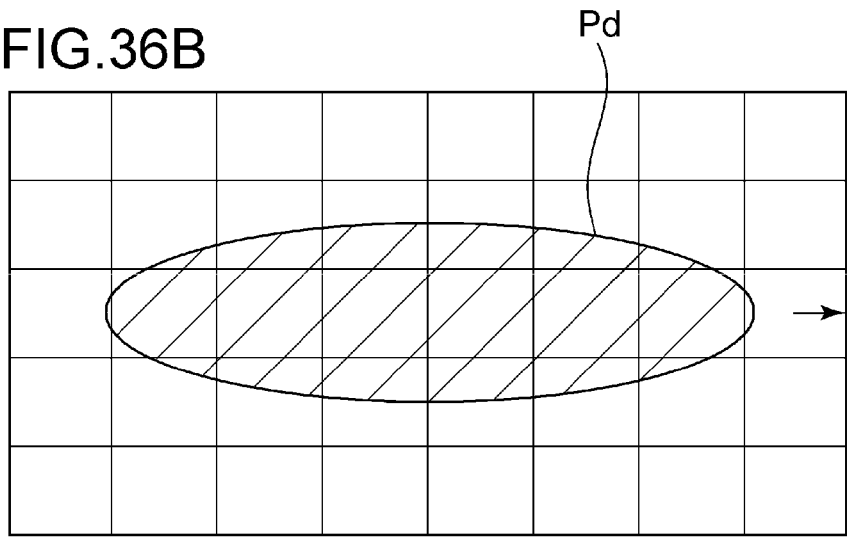
Figure 36C:
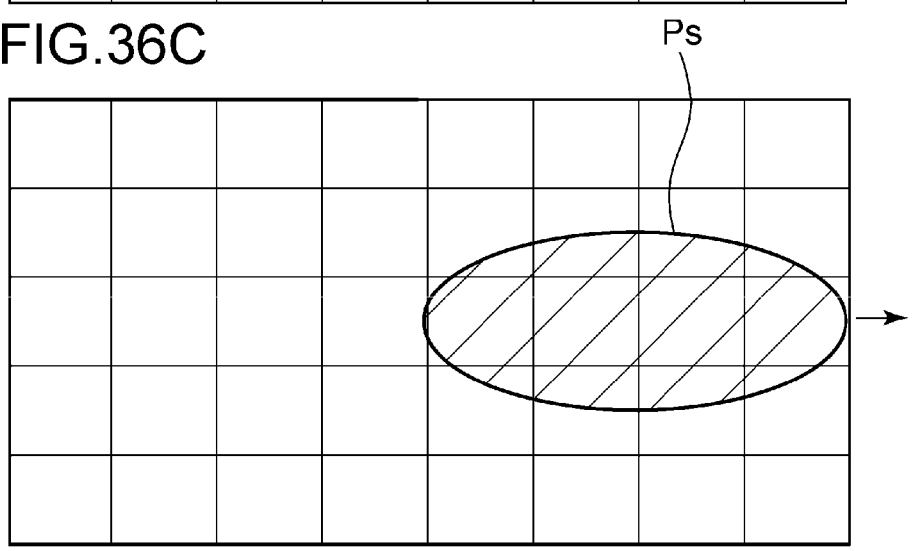

FIG. 36A to FIG. 36C show light distribution patterns formable by the automotive headlamp apparatus according to the third embodiment. A light distribution pattern Pc shown in FIG. 36A is a condensing light distribution pattern. A light distribution pattern Pd shown in FIG. 36B is a diffusion light distribution pattern. A light distribution pattern Ps shown in FIG. 36C is a light distribution pattern where the condensing light distribution pattern has been swiveled.

As described above, the automotive headlamp apparatus 2010 can vary the magnification of the light source image without changing the positions of the projection lens 2016 and the light source 2014 and can form the condensed and diffused light distribution patterns. Also, the magnification varying mechanism 2022 may be an optical system configured such that a magnifying power change in the vehicle width direction of the light source image is larger than a magnifying power change in a vertical direction thereof. This allows the formation of condensing/diffusion light distribution patterns used to cover a wide range along the vehicle width direction. Also, in the present embodiment, an anamorphic lens system is used as the optical system. This allows the formation of light distribution patterns condensed and diffused by use of the optical system having a simple structure. It is to be noted here that the optical system is not limited to the anamorphic lens and other various types of optical systems may be used within the scope of the present invention.

A description is now given of further preferred modes to carry out the present invention with regard to the structure and the position of the light source.

Figure 37:
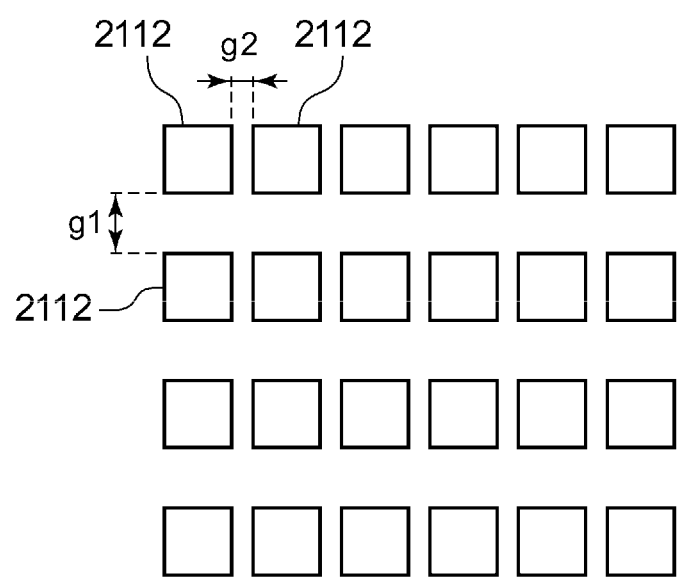
FIG. 37 is a front view of a plurality of LED chips arranged in a matrix.

FIG. 37 is a front view of a plurality of LED chips arranged in a matrix. The light source comprised of a plurality of LED chips (hereinafter referred to as "matrix LEDs" or "matrix LED"), which are arranged in a matrix as illustrated in FIG. 37, face a front area of the vehicle. An optical system, having the aforementioned light source, in which the projection lens is provided in front of this light source, is configured such that the luminance distribution of the LED chips on the plane containing the focal point F is projected in a frontward direction. Thus, the luminance distribution of a group of LED chips is projected onto a screen if the LED chips are provided in plurality. However, the headlamp using such matrix LEDs still has room for improvement in the following respects (1) and (2).

(1) Dark regions between the LED chips, which correspond to gaps g1 and g2 shown in FIG. 37, are visually conspicuous on the screen. These dark regions partially deteriorate a driver's visibility. If, for example, there is a panel or screen in a road ahead, a rectangular pattern may appear on the panel or screen. Also, there may be cases where a striped pattern appears on the road surface.

(2) It is difficult to form a Z-shape light distribution of a sloping (45 degrees) cutoff line required for a low beam distribution pattern. Also, a region near the cutoff line cannot be shaded off or made obscure.

Figure 38A:
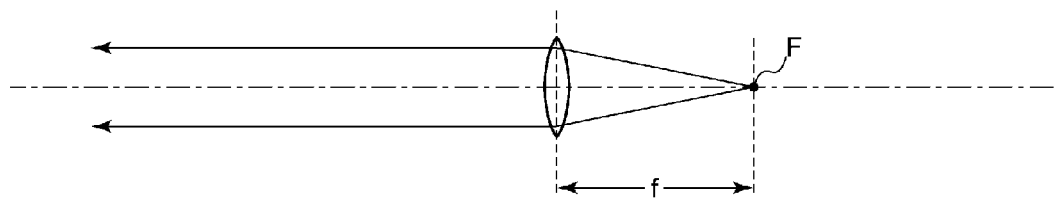
FIG. 38A shows light paths in a case where rays emanating from a focal point enters a projection lens.
Figure 38B:
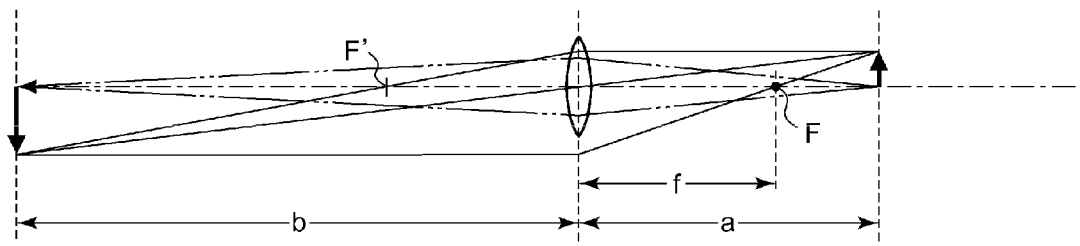
FIG. 38B shows light paths in a case where rays emanating from behind the focal point enters the projection lens.
Figure 38C:
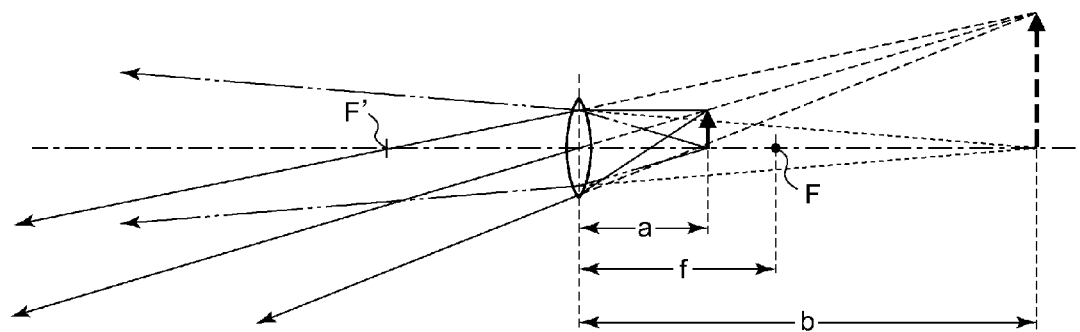
FIG. 38C shows light paths in a case where rays emanating from within a focal point enters a projection lens.

A description is now given of an image formation by the projection lens. FIG. 38A shows light paths in a case where rays emanating from a focal point enters the projection lens. FIG. 38B shows light paths in a case where rays emanating from behind the focal point enters the projection lens. FIG. 38C shows light paths in a case where rays emanating from within the focal point enters the projection lens.

As illustrated in FIG. 38A, when a light source (object) is placed at the focal point F, the image of the light source or the object is formed at infinity. The focal length of the actual projection lens is in a range of about 30 mm to about 50 mm. As compared to such a focal length, the distance to an image forming screen, namely 10 m or 25 m, is said to be infinity. Accordingly, the luminance distribution of the light source is almost directly projected onto the screen and therefore the dark regions between the LED chips are visually conspicuous on the screen.

As illustrated in FIG. 38B, when the light source is placed behind the focal point F, the image of the light source is a real image whose magnification is b/a and therefore the dark regions between the LED chips are still visually conspicuous on the screen.

As illustrated in FIG. 38C, when, on the other hand, the light source is placed within the focal point F, the image of the light source is a virtual image and therefore the image thereof is not formed on the screen. If the light source is placed too close to the projection lens, the projection lens will not function as such, thereby making it difficult to form a desired light distribution.

Through his diligent investigations, the inventor of the present invention had come to recognize the following points, based on the above knowledge. That is, it is preferable that, for the purposes of preventing the luminance nonuniformity from becoming visually conspicuous, the LED chips be positioned within the focal point and as close to the focal point as possible so that the image of the light source can be a virtual image. The inventor had also come to recognize that the magnification of the virtual image be preferably as large as possible.

As shown in FIG. 38C, if the distance between an object (light source) and the projection lens is denoted by "a" and if the focal length is denoted by "f", an image location (image distance "b") will be expressed by the following Equation (2) that is an image formation equation for paraxial optical system.

$$1/f = 1/a - 1/b$$ Equation (2)

Table 1 shows the image distances "b" of a virtual image and the magnifications b/a, when the distances "a" are f/2, 2f/3, 3f/4, 4f/5, 9f/10, and 19f/20, respectively.

TABLE 2

| OBJECT DISTANCE a | IMAGING DISTANCE b | MAGNIFICATION RATIO b/a |
|---|---|---|
| f/2 | f | 2 |
| 2f/3 | 2f | 3 |
| 3f/4 | 3f | 4 |
| 4f/5 | 4f | 5 |
| 9f/10 | 9f | 10 |
| 19f/20 | 19f | 20 |

As illustrated in FIG. 38C, rays emitting from the light source advance and travel in such a manner that as if the rays were emitted from a virtual image position. Thus, the luminance distribution on the screen is such that a plurality of semiconductor light-emitting elements (LED chips) are overlapped with each other as the magnification gets larger. As a result, the luminance nonuniformity or luminance unevenness on the screen will be visually inconspicuous.

Figure 39:
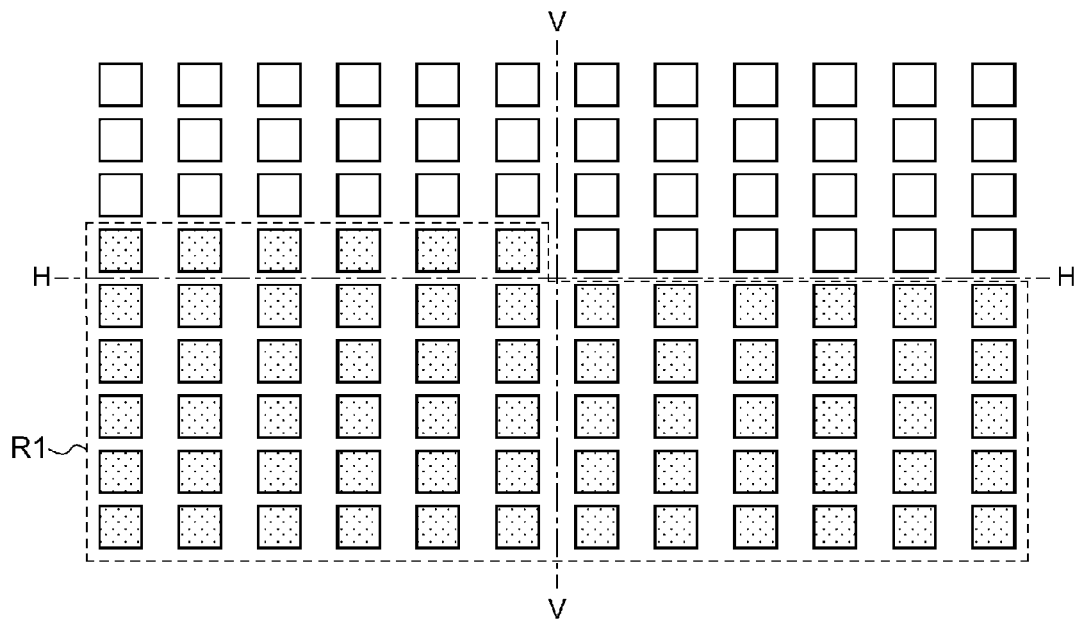
FIG. 39 is a schematic diagram showing an arrangement of matrix LEDs where each side of rectangular LED chips is placed parallel to a horizontal direction.

A description is next given why it is difficult to form the light distribution of a sloping cutoff line required for a low beam distribution pattern and why a region near the cutoff line cannot be shaded off. FIG. 39 is a schematic diagram showing an arrangement of matrix LEDs where each side of rectangular LED chips is placed parallel to the horizontal direction.

In the case of the matrix LEDs as shown in FIG. 39, the Z-shape light distribution having the 45-degree sloping cutoff line cannot be formed even if LED chips in the region R1 enclosed by dotted lines are turned on and LED chips in the region other than the region R1 are turned off. In order to achieve the Z-shape light distribution in the arrangement of LED chips as shown in FIG. 39, the sloping cutoff line needs to be artificially achieved by further increasing the number of LED chips. In this case, however, the size of the matrix LEDs increases and therefore the focal length of the projection lens must be made longer with the result that the lamp size is enlarged. In the light of this, the inventor of the present invention had come to recognize, through his diligent investigations into these problems, that matrix LEDs described later be used.

A description is given hereunder of modifications where the position of the light source and the arrangement of the LED chips in the above-described automotive headlamp apparatus are further improved.

Figure 40:
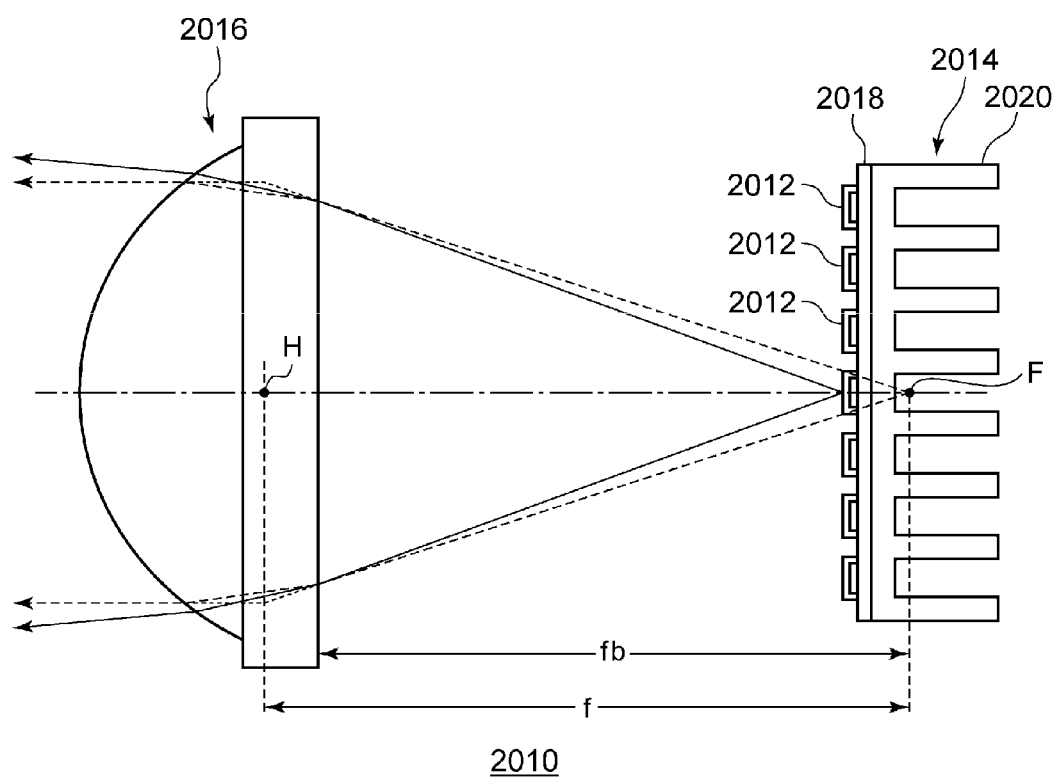
FIG. 40 schematically shows a structure of an automotive headlamp apparatus, according to a modification of a third embodiment, viewed laterally.

FIG. 40 schematically shows a structure of an automotive headlamp apparatus 2010, according to a modification of the third embodiment, viewed laterally. In a light source 2014 shown in FIG. 40, a plurality of LED chips 2012 are located within the focal point F of a projection lens 2016.

Thus, as described earlier, in the automotive headlamp apparatus 2010 according to the present embodiment, the light source image is projected as a virtual image in a front area of the automotive headlamp apparatus 2010. As a result, the dark region between adjacent LED chips 2012 is visually inconspicuous in the projected light source image. Note that the plurality of LED chips 2012 are arranged such that the light emitting surface of each of the LED chips 2012 faces the front area of the vehicle. This eliminates provision of a reflective member such as a reflector.

Figure 41:
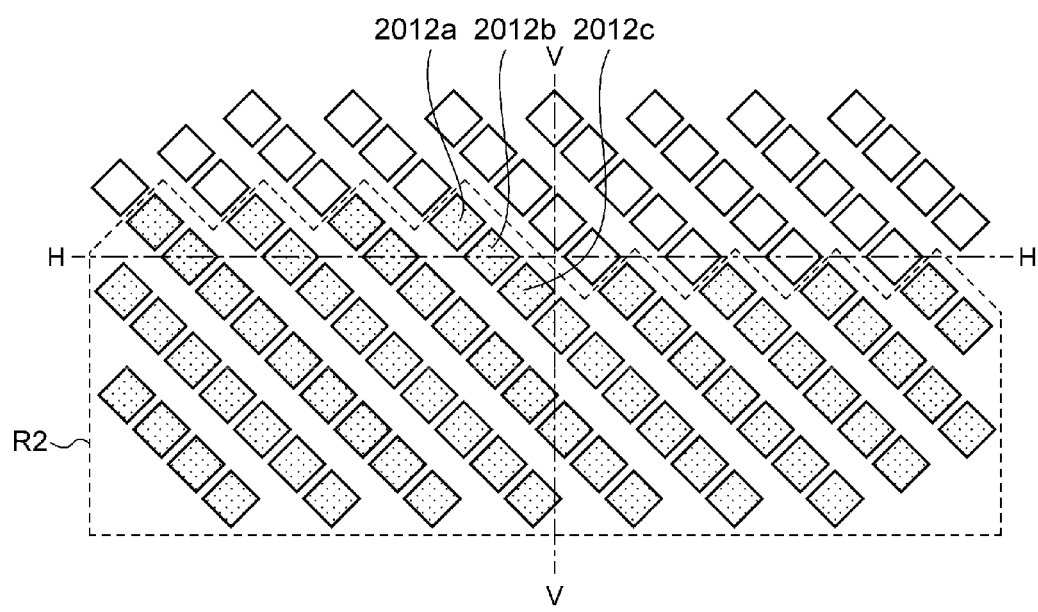
FIG. 41 is a schematic diagram showing an arrangement of matrix LEDs and is a front view of the light source shown in FIG. 40.

FIG. 41 is a schematic diagram showing an arrangement of matrix LEDs and is a front view of the light source shown in FIG. 40. In the matrix LEDs shown in FIG. 41, each LED chip, whose light emitting surface is of a rectangular shape, is arranged such that the light emitting surface thereof is tilted (by 45 degrees relative to a horizontal direction) relative to the horizontal direction (vehicle width direction).

In the case of the matrix LEDs as shown in FIG. 41, a clear 45-degree sloping cutoff line is formed by LED chips 2012a to 2012c, which are being lit, when LED chips in the region R2 enclosed by dotted lines are turned on and LED chips in the region other than the region R2 are turned off. An upper edge of the region R2 of the LED chips, which are being lit, has a sawtooth shape, so that the horizontal cutoff line can be shaded off.

Figure 42A:
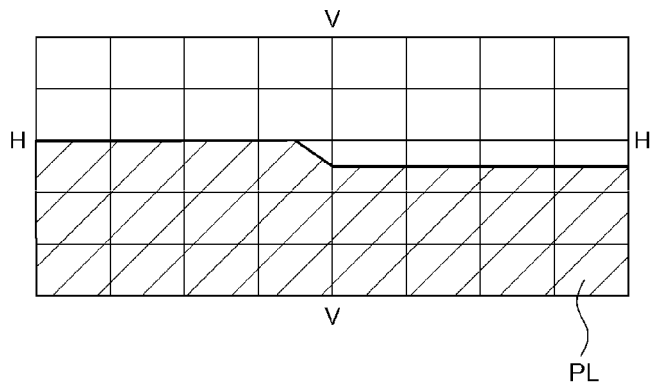
FIG. 42A shows a low beam distribution pattern formed by an automotive headlamp apparatus according to a third embodiment.
Figure 42B:
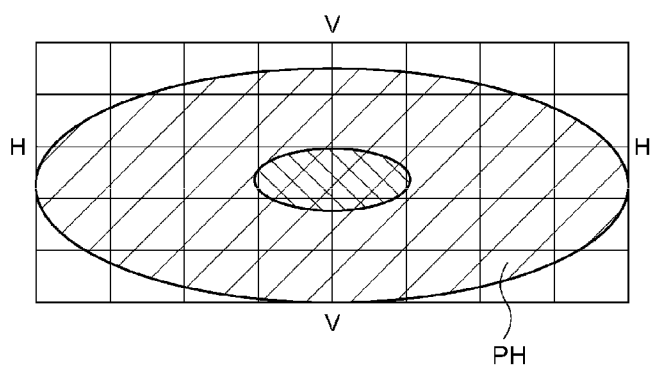
FIG. 42B shows a high beam distribution pattern formed by an automotive headlamp apparatus according to a third embodiment.

FIG. 42A shows a low beam distribution pattern formed by the automotive headlamp apparatus according to the third embodiment. FIG. 42B shows a high beam distribution pattern formed by the automotive headlamp apparatus according to the third embodiment. When the LED chips arranged in the region R2 among the matrix LEDs shown in FIG. 41 are turned on, a low beam distribution pattern PL of Z-shape light distribution is formed as shown in FIG. FIG. 42A. When all of the matrix LEDs shown in FIG. 41 are turned on, a high beam distribution pattern PH as shown in FIG. FIG. 42B is formed.

Figure 43:
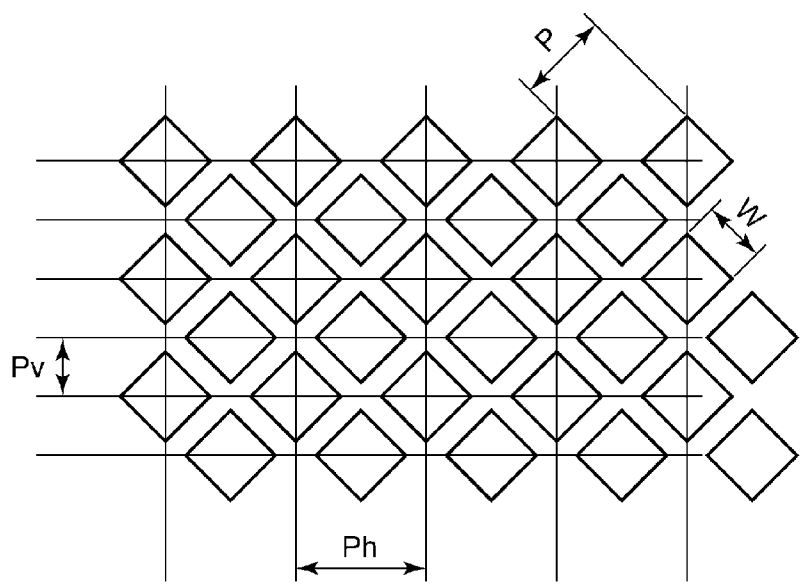
FIG. 43 is an enlarged view of part of matrix LEDs according to a third embodiment.

A description is next given of an appropriate magnification of a virtual image according to the size of LED chips and gaps between each LED chip. FIG. 43 is an enlarged view of part of matrix LEDs according to the third embodiment. In FIG. 43, "W" denotes the size of each LED chip, "P" denotes a pitch interval between adjacent LED chips, "Ph" denotes a pitch interval between LED chips in the horizontal direction, and "Pv" denotes a pitch interval between LED chips in the vertical direction.

In this case, the magnification of a virtual image must be at least a factor of P/W. If, for example, the chip size W is a 1-mm square and the pitch is 3 mm, then P/W will be "3" and therefore the image forming magnification of the projection lens must be at least a factor of "3". According to Table 2, an object location (distance) to achieve this is "2f/3".

Thus, the LED chips need to be installed in between ⅔ of the focal length f and the focal point F, away from the projection lens. However, when the LED chip is placed on the focal point F, the luminance nonuniformity starts to become conspicuous on the screen.

In the light of this, the LED chips are preferably arranged such that the distance between the LED chips and the projection lens 2016 is greater than or equal to ((P−W)/P)×f. Here, the focal length of the projection lens 2016 is denoted by f [mm], a side length of the light emitting surface of an LED chip is denoted by W [mm], and the pitch between one LED chip and another LED chip adjacent to said one LED chip is denoted by P [mm].

If, in the case of P/W being 3, an installation error S of the LED chips is taken into consideration, the LED chips will be preferably installed at any position between 2f/3 and f−S, away from the projection lens. Practically, the light source is preferably installed in a position such that the magnification is greater than the actual factor of P/W, in consideration of mass production. Also, the installation error S may be set appropriately in consideration of a standard deviation o of production accuracy.

As described above, the matrix LEDs are preferably installed such that the matrix LEDs are located closer to the front than the focal position F, namely located on a projection lens side. The matrix LEDs are preferably installed in a positional range such that the magnification of a virtual image by the projection lens is greater than a factor of P/W and less than a factor of 50. Here, the size of each LED chip is denoted by "W" and the pitch (the installation interval of the chips) is denoted by "P". Note that when f=50, a=49.

To be more specific, the LED chips are preferably arranged such that the distance between the LED chips 2012 and the projection lens 2016 is less than or equal to 0.98f where f [mm] denotes the focal length of the projection lens 2016. As a result, the dark regions between the matrix LED chips can be made visually inconspicuous. If, in the matrix LEDs, the interval between adjacent LED chips differs in the vertical direction and in the horizon direction, the pitch interval P will be the larger of the two different ones in the vertical direction and in the horizon direction.

The matrix LEDs are preferably arranged such that the pitch interval Ph between the LED chips in the horizontal direction is greater than or equal to the pitch interval Pv between the LED chips in the vertical direction. This allows the Z-shape light distribution to be made clearer. Also, since the luminous flux density can be enhanced in the vertical direction, a horizontally-long light distribution pattern suitable for the headlamps is easily formed.

In this manner, the automotive headlamp apparatus 2010 according to the present embodiment is a projection-type headlamp using the matrix LEDs as the light source. In this automotive headlamp apparatus 2010 according to the present embodiment, specific locations of the matrix LEDs, which are to be lit, or the lighting current can be set based on the presence status of a vehicle-in-front detected by the front monitoring sensor. Also, various types of light distribution patterns can be achieved in addition to the commonly-used low beam distribution pattern and high beam distribution pattern.

Figure 44A:
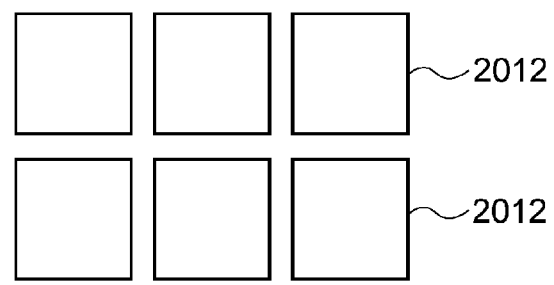
FIGS. 44A and 44B are illustrations to describe a modification of a matrix LEDs according to a third embodiment.
Figure 44B:
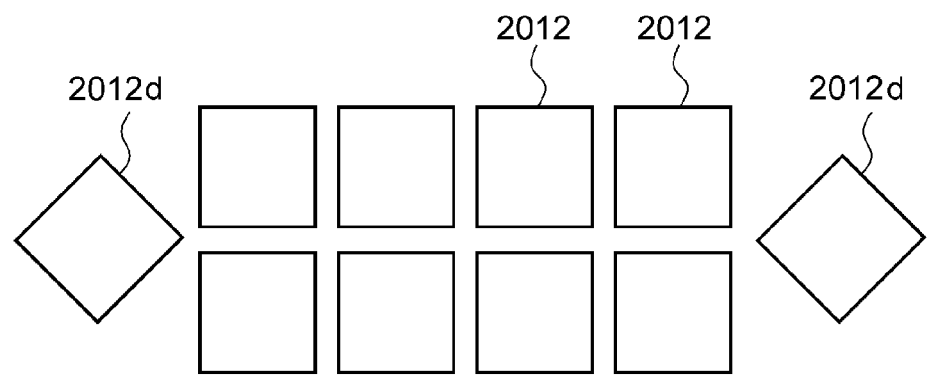
Figure 45A:
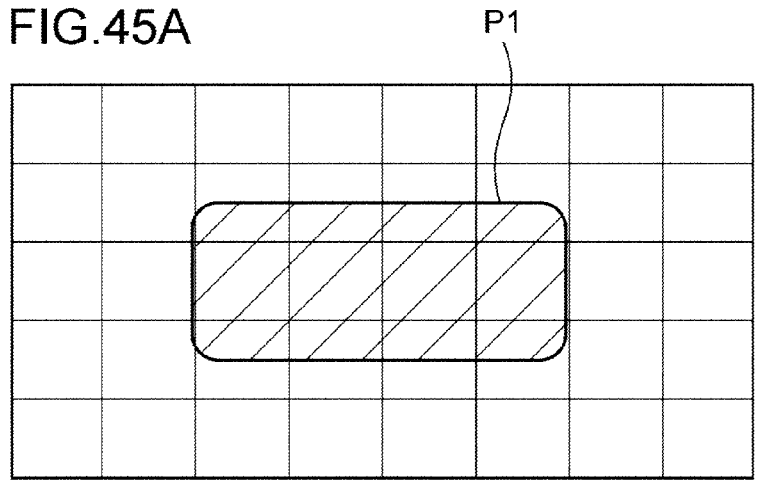
FIG. 45A to FIG. 45C show spot-beam-like light distribution patterns formed by the matrix LEDs.
Figure 45B:
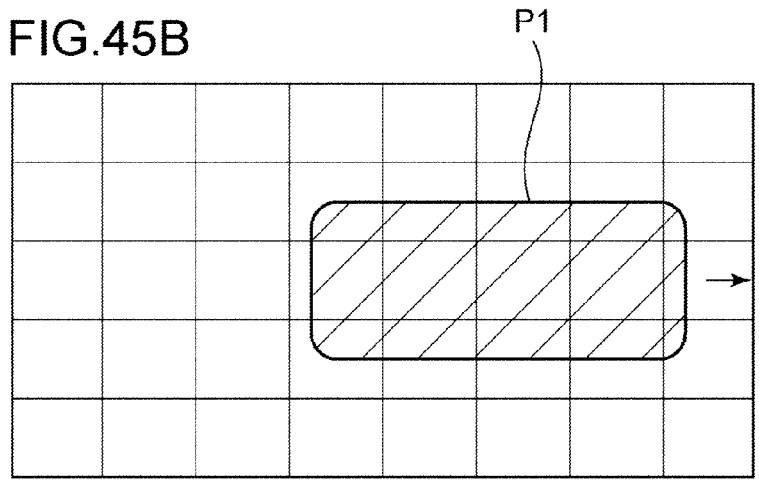
Figure 45C:
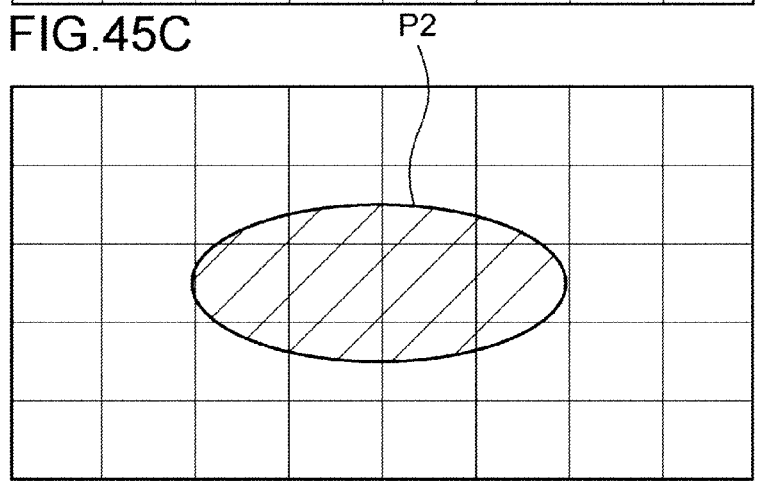

A description is now given of modifications of a head lamp system of variable light distribution type using the matrix LEDs. FIGS. 44A and 44B are illustrations to describe a modification of the matrix LEDs according to the third embodiment. FIG. 45A to FIG. 45C show spot-beam-like light distribution patterns formed by the matrix LEDs.

As illustrated in FIGS. 44A and 44B, the matrix LEDs according to the modification use about four to about ten LED chips. For example, the matrix LEDs are arranged as illustrated in FIG. 44A and is so configured as to form a spot-beam-like light distribution pattern. In this case, a rectangular spot-beam-like light distribution pattern P1 as shown in FIG. 44A is formed. As illustrated in FIG. 45B, this light pattern P1 may be moved to a horizontal direction along a winding road.

As illustrated in FIG. 44B, the matrix LEDs may be arranged such that part of the LED chips 2012d are disposed in a rhomboidal formation and may be so configured as to form a spot-beam-like light distribution pattern. In this case, a spot-beam-like light distribution pattern P2 of a horizontally long elliptic shape as illustrated in FIG. 45C is easily formed.

Figure 46:
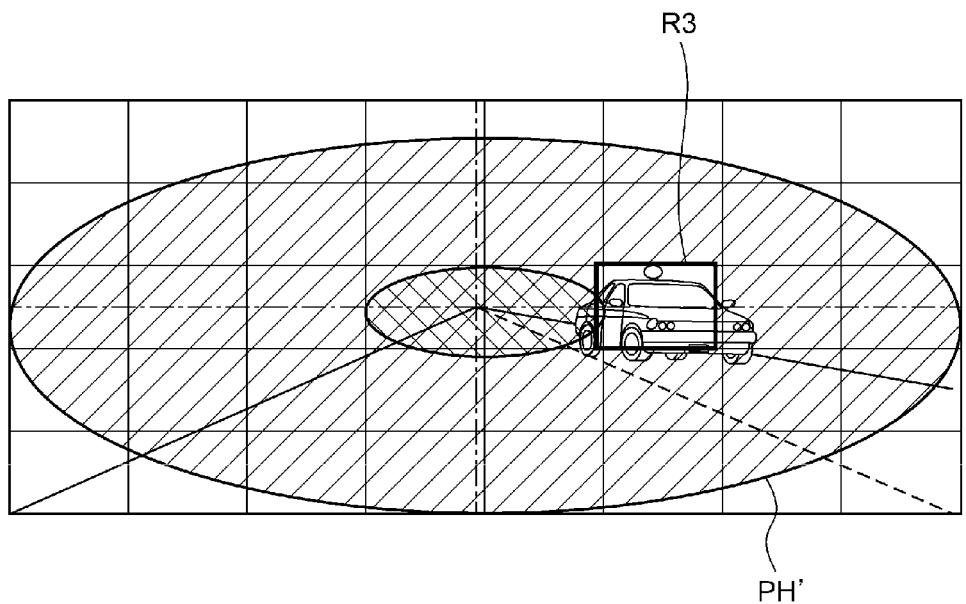
FIG. 46 shows an exemplary light distribution pattern formed by the automotive headlamp apparatus according to a third embodiment.

FIG. 46 shows an exemplary light distribution pattern formed by the automotive headlamp apparatus according to the third embodiment. As illustrated in FIG. 46, the automotive headlamp apparatus 2010 according to the present embodiment can form a light distribution pattern PH' where a partial region R3 is not illuminated. This can ensure a visibility of the road ahead of the driver while avoiding glare as experienced by oncoming vehicles and forerunning vehicles.

(Structure of Control System)

Figure 47:
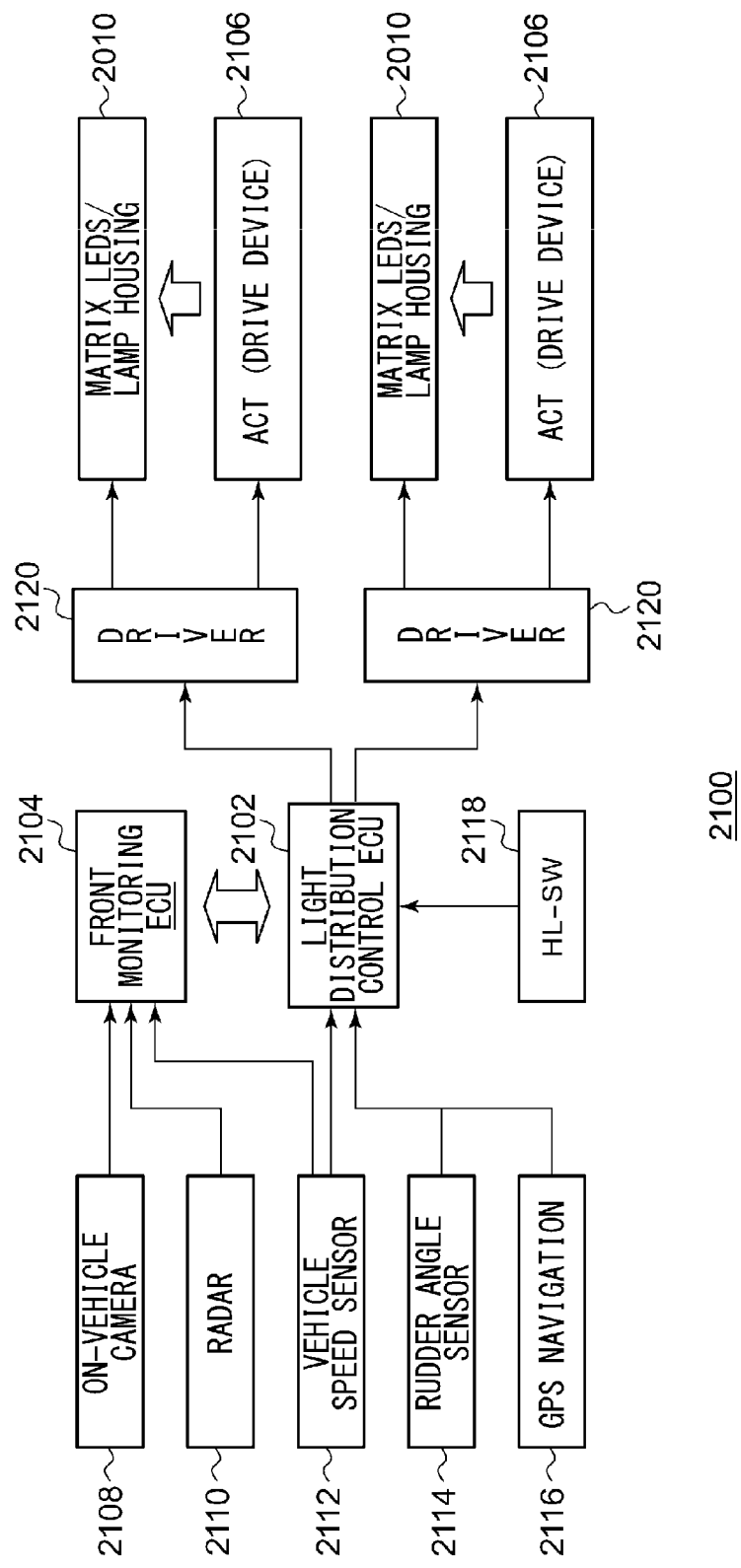
FIG. 47 is a block diagram showing schematically a structure of a headlamp system.

A description is now given of a structure of a control system for headlamps. FIG. 47 is a block diagram showing schematically a structure of a headlamp system.

A headlamp system 2100 is comprised of a pair of left and right automotive headlamp apparatuses 2010, a light distribution control ECU (electronic control unit) 2102, a front monitoring ECU 2104 and so forth. As described earlier, the automotive headlamp apparatus 2010 has the light source 2014, constituted by the matrix LEDs, the projection lens 2016, and a lamp housing that houses the light source 2014 and the projection lens 2016. Also, a drive device (ACT) 2106 that moves the convex lens 2026 and swivels the lamp housing is connected to each automotive headlamp apparatus 2010. The drive device 2106 corresponds to the actuator 2028 or actuator 2032 described above.

Various sensors, such as an on-vehicle camera 2108, a radar 2110 and a vehicle speed sensor 2112, are connected to the front monitoring ECU 2104. The front monitoring ECU 2104 performs image processing on the image-captured data acquired from the sensors, then detects vehicles-in-front (oncoming vehicles and forerunning vehicles), other bright objects on the road and lane marks, and thereby calculates data, such as their attributes and positions, required for the light distribution control. The thus calculated data is transmitted to the light distribution control ECU 2102 and various on-vehicles units via the in-vehicle LAN and the like.

Connected to the light distribution control ECU 2102 are a vehicle speed sensor 2112, a rudder angle sensor 2114, a GPS navigation 2116, a headlamp switch 2118 and so forth. The light distribution control ECU 2102 determines a light distribution pattern associated with the then traveling scene and/or condition, based on the attributes (oncoming vehicle, forerunning vehicle, reflector, or road illumination) of the bright objects on the road, their positions (frontward or lateral), and the vehicle speed sent out from the front monitoring ECU 2104. For example, as a light distribution pattern to be formed, the light distribution control ECU 2102 determines a condensing light distribution pattern when the vehicle speed is high, whereas the light distribution control ECU 2102 determines a diffusion light distribution pattern when the vehicle speed is low. And the light distribution control ECU 2102 determines a control amount (controlled variables) of a headlamp of variable light distribution type required for the achievement of the light distribution pattern. Here, the control amount (controlled variables) represents an amount of beam movement in the vertical and horizontal directions, the position and range of a masked portion (shaded region), and an amount of movement of the convex lens 2026, for instance.

Also, the light distribution control ECU 2102 determines control contents of the drive device 2106 and each LED chip of the matrix LEDs. Here, the control contents represent the turning on/off of each LED chip, the electric power to be applied to each LED chip, and so forth. Note here that a mechanical type drive device, which drives the lamp unit of variable light distribution type in the vertical and horizontal directions, for example, can be used for the drive device 2106. A driver 2120 converts the information regarding the control amount fed from the light distribution control ECU 2102 into instructions corresponding to operations of the drive device 2106 and the light distribution control elements, and controls said instructions.

(Control Flowchart)

Figure 48:
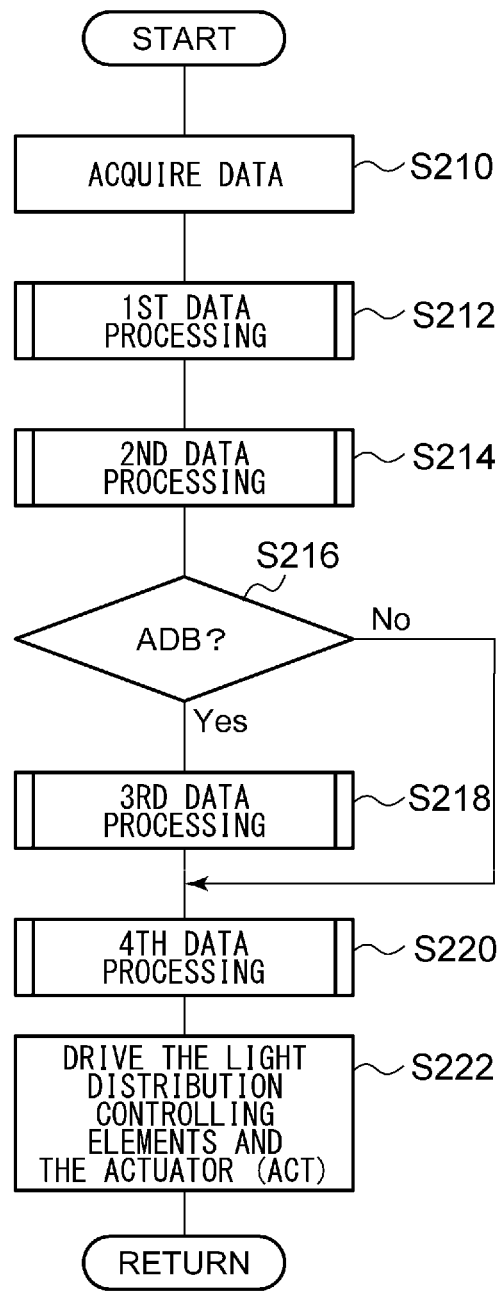
FIG. 48 is a flowchart showing an exemplary control performed by a headlamp system according to a third embodiment.

FIG. 48 is a flowchart showing an exemplary control performed by a headlamp system according to the third embodiment.

When a selection is made by the headlamp switch or when a predetermined condition (night ride or traveling in a tunnel) is recognized based on the information sent from various sensors, the processing shown in FIG. 48 is repeatedly carried out at predetermined intervals.

First, the light distribution control ECU 2102 and/or the front monitoring ECU 2104 acquires/acquire necessary data from the camera, the various sensors, the switches and the like (S210). The data may be data regarding an image of a front area of the vehicle, the vehicle speed, the inter-vehicular distance, the shape of a road, the rudder angle of a steering wheel, and a light distribution pattern selected by the headlamp switch, for instance.

The front monitoring ECU 2104 carries out a first data processing, based on the acquired data (S212). The first data processing calculates or figures out the data regarding the attributes of bright objects in a front area of the vehicle (signal lamps, illuminating lamps, delineators, etc.), the attributes of vehicles (oncoming vehicle, forerunning vehicle), the inter-vehicular distance, the brightness of bright objects, the shape of a road (lane width, straight road, winding road), and so forth.

Then, the light distribution control ECU 2102 carries out a second data processing, based on the data calculated in the first data processing (S214), and selects an appropriate light distribution pattern. A control light distribution pattern to be selected is a low beam distribution pattern, a high beam distribution pattern or an adaptive driving beam (ADB), for instance. Also, the turning on/off of each LED chip and the control amount of the electric power to be applied thereto are determined according to the selected light distribution pattern.

If the ADB is selected (Yes of S216), a third data processing will be carried out by the light distribution control ECU 2102 (S218). For example, an illumination area, a shaded area, an illumination light quantity and an illumination direction by an ADB control are determined in the third data processing. Also, an AFS (Adaptive Front-Lighting System) control can be performed, based on the data calculated in the first data processing in addition to these items of information. The AFS control is a control whereby the light distribution is controlled according to a winding road, a traveling area (city streets, suburbs, expressway) and the weather. If the ADB is not selected (No of S216), Step S218 will be skipped.

Then, in a fourth data processing, the light distribution control ECU 2102 converts the data into another data for use by a driver (S220) and drives the light distribution control elements and the actuator (ACT) (S222) and thereby controls the ADB and the swiveling.

The present invention has been described by referring to each of the above-described embodiments. However, the present invention is not limited to the above-described embodiments only, and those resulting from any appropriate combination or substitution of components in the embodiments are also effective as embodiments. Also, it is understood by those skilled in the art that modifications such as changes in the order of combination or processings made as appropriate in each embodiment or various changes in design may be added to the embodiments based on their knowledge and that the embodiments added with such modifications are also within the scope of the present invention.

EXPLANATION OF REFERENCE NUMERALS

10 Automotive headlamp apparatus
12 LED chip
14 Light source
16 Projection lens
100 Head light system
102 Light distribution control ECU
104 Front monitoring ECU

INDUSTRIAL APPLICABILITY

The present invention is applicable to automotive headlamps.

The invention claimed is:

1. An automotive headlamp apparatus comprising:
   a light source in which a plurality of semiconductor light-emitting elements are arranged at intervals from each other; and
   a projection lens configured to project light, emitted from the light source, toward a front area of a vehicle as a light source image,
   wherein the semiconductor light-emitting elements are located in front of a focal point of the projection lens.

2. An automotive headlamp apparatus according to claim 1, wherein the semiconductor light-emitting elements are arranged such that a light emitting surface of the semiconductor light-emitting element faces the front area of the vehicle.

3. An automotive headlamp apparatus according to claim 1, wherein the light emitting surface of the semiconductor light-emitting element is of a rectangular shape, and the semiconductor light-emitting element is arranged such that a side thereof is tilted with respect to a vehicle width direction.

4. An automotive headlamp apparatus according to claim 1, wherein the semiconductor light-emitting element and the projection lens are positioned such that a distance between the semiconductor light-emitting element and the projection lens is less than or equal to 0.98f, where f [mm] denotes a focal length of the projection lens.

5. An automotive headlamp apparatus according to claim 1, wherein the semiconductor light-emitting element and the projection lens are positioned such that a distance between the semiconductor light-emitting element and the projection lens is greater than or equal to $$((P-W)/P) \times f,$$

where f [mm] denotes a focal length of the projection lens, W [mm] denotes a side length of a light emitting surface of the semiconductor light-emitting element, and P [mm] denotes a pitch between the adjacent semiconductor light-emitting elements.

6. An automotive headlamp apparatus comprising:
   a light source in which a plurality of semiconductor light-emitting elements are arranged in a matrix, the light source being configured to irradiate light toward a front area of a vehicle; and
   a control unit configured to control the turning on and off of the plurality of semiconductor light-emitting elements included in the light source,
   the plurality of semiconductor light-emitting elements including:
      a plurality of first semiconductor light-emitting elements for emitting light to a first section contained in an illumination region in the front area of the vehicle; and
      a plurality of second semiconductor light-emitting elements for emitting light to a second section, which is different from the first section, contained in the illumination region, wherein the second semiconductor light-emitting element has a characteristic different from that of the first semiconductor light-emitting element,
   the control unit including:
      a first drive unit for driving, per group, the plurality of first semiconductor light-emitting elements, which are divided into groups, wherein the number of groups is smaller than the number of first semiconductor light-emitting elements; and
      a second drive unit for driving, per group, the plurality of second semiconductor light-emitting elements, which are divided into groups, wherein the number of groups is smaller than the number of second semiconductor light-emitting elements.

7. An automotive headlamp apparatus according to claim 6, wherein the first semiconductor light-emitting element is constituted by an element whose luminance differs from that of the second semiconductor light-emitting element when the same current is supplied thereto.

8. An automotive headlamp apparatus according to claim 6, wherein the first semiconductor light-emitting element is constituted by an element whose maximum forward current rating differs from that of the second semiconductor light-emitting element.

9. An automotive headlamp apparatus according to claim 6, wherein the first semiconductor light-emitting elements are arranged such that the first section contains a central portion of the illumination region, and
   wherein a control unit controls the turning on and off of the first semiconductor light-emitting elements and the second semiconductor light-emitting elements such that the luminance of the first semiconductor light-emitting elements is higher than that of the second semiconductor light-emitting elements.

10. An automotive headlamp apparatus according to claim 6, wherein the plurality of semiconductor light-emitting elements are arranged such that light emitting surfaces of the semiconductor light-emitting elements face the front area of the vehicle.

11. An automotive headlamp apparatus according to claim 6, wherein a light emitting surface of each of the plurality of semiconductor light-emitting elements is of a rectangular shape, and each of the plurality of semiconductor light-emitting elements is arranged such that a side thereof is tilted with respect to a vehicle width direction.

12. An automotive headlamp apparatus according to claim 6, wherein
   the plurality of first semiconductor light-emitting elements are arranged in a first block of a region where the semiconductor light-emitting elements are arranged in a matrix; and
   the plurality of second semiconductor light-emitting elements are arranged in a second block of the region where the semiconductor light-emitting elements are arranged in the matrix, the second block being different from the first block.

13. An automotive headlamp apparatus comprising:
   a light source in which a plurality of semiconductor light-emitting elements are arranged at intervals from each other;
   a projection lens configured to project light, emitted from the light source, toward a front area of a vehicle as a light source image; and
   a magnification varying mechanism configured to vary a magnifying power of the light source image, the magnification varying mechanism being provided on the projection lens at a front side of the vehicle.

14. An automotive headlamp apparatus according to claim 13, wherein the plurality of semiconductor light-emitting elements are located in front of a focal point of the projection lens.

15. An automotive headlamp apparatus according to claim 13, wherein the semiconductor light-emitting elements are arranged such that a light emitting surface of the semiconductor light-emitting element faces the front area of the vehicle.

16. An automotive headlamp apparatus according to claim 13, wherein the light emitting surface of the semiconductor light-emitting element is of a rectangular shape, and the semiconductor light-emitting element is arranged such that a side thereof is tilted with respect to a vehicle width direction.

17. An automotive headlamp apparatus according to claim 13, wherein the magnification varying mechanism is an optical system configured such that a magnifying power change in the vehicle width direction of the light source image is larger than a magnifying power change in a vertical direction thereof.

18. An automotive headlamp apparatus according to claim 17, wherein the optical system is an anamorphic lens system.

* * * * *